United States Patent [19]

Azuma et al.

[11] Patent Number: 5,524,112
[45] Date of Patent: Jun. 4, 1996

[54] **INTERFACE APPARATUS FOR TRANSFERRING K*N-BIT DATA PACKETS VIA TRANSMISSION OF K DISCRETE N-BIT PARALLEL WORDS AND METHOD THEREFORE**

[75] Inventors: Daisuke Azuma, Souraku-gun; Tsuyoshi Muramatsu, Tenri, both of Japan

[73] Assignee: Sharp Kabushiki Kaisha, Osaka, Japan

[21] Appl. No.: 83,281

[22] Filed: Jun. 29, 1993

[30] Foreign Application Priority Data

Jun. 29, 1992 [JP] Japan ................................ 4-171201
Jun. 23, 1993 [JP] Japan ................................ 5-152281

[51] Int. Cl.⁶ ........................ H04L 12/40; H04J 3/02
[52] U.S. Cl. ..................... 370/85.13; 370/85.11; 370/100.1; 395/307
[58] Field of Search .................. 370/85.1, 85.9, 370/85.11, 85.13, 85.14, 110.1, 100.1; 395/200, 325, 275, 500, 550, 307, 308, 200.1; 375/106, 354; 371/47.1, 48, 57.1, 67.1

[56] References Cited

U.S. PATENT DOCUMENTS

| | | |
|---|---|---|
| 3,988,716 | 10/1976 | Fletcher et al. . |
| 4,831,514 | 5/1989 | Turlakov et al. ................. 395/500 |
| 4,864,496 | 9/1989 | Triolo et al. . |
| 5,113,369 | 5/1992 | Kinoshita ........................ 395/325 |
| 5,191,581 | 3/1993 | Woodbury et al. ................ 370/85.13 |

Primary Examiner—Hassan Kizou

[57] ABSTRACT

An interface device includes a data transmitter provided with a multiplexer for dividing k×n bits of data (k is an integer satisfying k≧2) applied from a transmitting side data terminal equipment into k groups for time sequential output, and a data receiver provided with a data latch circuit for taking the first k-1 data groups transmitted from the data transmitter and a data latch circuit for taking the outputs from the k-1 data latch circuits and the last transmitted data group. In a period corresponding to one transmission, two data groups are supplied in time sequence from the data transmitter to the data receiver. There may be provided k data latch circuits so that the inputs of data latch circuit are all passed through the data latch circuits.

91 Claims, 55 Drawing Sheets

INTERFACE APPARATUS FOR TRANSFERRING K*N-BIT DATA PACKETS VIA TRANSMISSION OF K DISCRETE N-BIT PARALLEL WORDS AND METHOD THEREFORE

BACKGROUND OF THE INVENTION

1. Field of the Invention

The present invention relates to an interface apparatus and, more specifically, to a data transmitting apparatus which can increase an amount of data transmission per unit time.

2. Description of the Background Art

Information processed or to be processed by information processing apparatuses such as computers and facsimiles are transmitted to and from such information processing apparatuses which are remote from each other by utilizing a data transmission system, including a transmission path provided between the information processing apparatuses and a transmitter which is called a data circuit terminating equipment (DCE).

The data circuit terminating equipment is provided between the transmission path and a computer, an input/output device or the like (hereinafter referred to as a data terminal equipment) constituting the information processing apparatus to be connected by the data transmission system, and carries out mutual conversion of signal conditions between the data terminal equipment and the transmission path.

The method of data transmission by the data transmission system includes a serial transmission method in which plural bits of data are transmitted bit by bit in time sequence through one transmission path, and a parallel transmission method in which the plural bits of data are transmitted over the transmission path at one time.

The serial transmission method does not require a plurality of signal lines as the transmission path, while the parallel transmission method requires, as the transmission path, signal lines the number of which is the same as the number of bits of data to be transmitted at one time.

In the data transmission system, the transmission path and the data circuit terminating equipment constitute an interface apparatus for connection between information processing apparatuses.

Generally, data is divided into groups each having a predetermined bit length, which are called packets, and transmitted/received packet by packet.

In the data transmission system, transmission is controlled in accordance with a so called handshaking system, a synchronous system or the like. In the handshaking system, at the time of transmission of each packet, a control signal indicative of the start of transmission is sent from the transmitter on the transmitting side to the transmitter of the receiving side. When the packet is received by the transmitter on the receiving side, a control signal indicative of the reception of this packet is sent from the transmitter on the receiving side to the transmitter on the transmitting side, and thus data transmission/reception between data terminal equipments is acknowledged. In the synchronous system, a clock signal having a predetermined frequency which corresponds to the length of time period allotted to each bit of the data to be transmitted is used between the transmitters of the receiving side and the transmitting side, so that the timing of transmission and reception of data is synchronized.

FIG. 53 is a schematic block diagram showing a structure of a conventional interface apparatus in which transmission is controlled in accordance with the handshaking system. Referring to FIG. 53, the interface apparatus is provided between two data terminal equipments each having a CPU (Central Processing Unit) as an apparatus for effecting data processing, and transmits data of n bits in parallel between the data terminal equipments.

FIG. 54 is a timing chart showing data transmission timing of the interface apparatus shown in FIG. 54.

The structure and operation of the conventional interface apparatus will be described with reference to FIGS. 53 and 54.

Referring to FIG. 53, the interface apparatus 900 includes a transmitting side data transmitter 920 connected to a transmitting side data terminal equipment 902, a receiving side data transmitter 922 connected to a receiving side data terminal equipment 904, and n data signal lines DL1 to DLn and control signal lines CL1 and CL2 connected between the transmitting side data transmitter 920 and the receiving side data transmitter 922. These data signal lines DL1 to DLn and control signal lines CL1 and CL2 constitute a transmission path 300.

The transmitting side data transmitter 920 includes a data holding mechanism 930 for temporarily storing n bits of data applied at one time from transmitting side data terminal equipment 902 and for supplying the data to data signal lines DL1 to DLn, and a transfer control mechanism 932 responsive to a control signal supplied through control signal line CL2 and a control signal supplied from the transmitting side data terminal equipment 902 for controlling data holding mechanism 930.

The receiving side data transmitter 922 includes a data holding mechanism 950 for temporarily storing n bits of data supplied at one time through data signal lines DL1 to DLn and for supplying the data to the receiving side data terminal equipment 904, and a transfer control mechanism 952 responsive to a control signal supplied through control signal line CL1 and a control signal supplied from the receiving side data terminal equipment 904 for controlling data holding mechanism 950.

It is assumed that the CPU 906 in the transmitting side data terminal equipment 902 and CPU 908 in the receiving side data terminal equipment are capable of processing n bits of data at one time.

When data which is to be transmitted to data terminal equipment 904 is generated in data terminal equipment 902, the data is applied to the transmitting side data transmitter 920 on the basis of n bits by n bits under the control of CPU 906.

In the following description, the data group including n bits is called a word.

When data transmitter 920 is capable of taking one word of data transmitted from data terminal equipment 902, that is, when a control signal SRO to the transmitting side data terminal equipment 902 indicates a transmission permitting state, CPU 906 of transmitting side data terminal equipment 902 generates a transmission request so that one word is supplied to data transmitter 920 and at the same time, a control signal SSO is input from data terminal equipment 902 to transfer control mechanism 932 of data transmitter 920.

Transfer control mechanism 932 sets the control signal SRO at a receiving state so as to indicate reception of data to data terminal equipment 902 in response to control signal SSO. This change of the control signal SRO is referred to as ACKNOWLEDGE signal (hereinafter simply referred to as "ACK" signal).

The control signal SRO indicates, at the receiving state, that it is now receiving the data transmitted from the data terminal equipment 902, and signals the data terminal equipment 902 that transmission of the next data is inhibited as it is receiving data. More specifically, control signal SRO assumes a transmission permitting state which shows the transmitter side circuit that the receiving side circuit is permitted to take data in, and a receiving state (which is also referred to as transmission inhibited state) which shows the transmitting side circuit that the receiving side circuit is now receiving data and the transmission of the next data is inhibited.

Similarly, a control signal /RI applied from the receiving side data transmitter 922 through control signal line CL2 to data transmitter 920 assumes a transmission permitting state indicating that the data transmitter 922 is capable of taking data from data transmitter 922, and a receiving state indicating that the data transmitter 922 is receiving data and transmission of the next data from data transmitter 920 is inhibited.

In the specification, "/" added to a reference character indicative of a signal means that the signal is low active. This corresponds to the reference character with an over bar in the drawings.

Transfer control mechanism 932 controls data holding mechanism 930 such that data transmission from data transmitter 920 to data transmitter 922 starts in response to the control signal /R1 from data transmitter 922 which has changed to the transmission permitting state.

In this manner, transfer control mechanism 932 instructs data holding mechanism 930 to take and store n bits of data, when control signal /RI from data transmitter 922 is at the transmission permitting state, in response to control signal SSO, outputs a control signal /CO indicative of the start of data transmission to data transmitter 922, and changes control signal SRO from the receiving state to transmission permitting state so that the data transmitter 920 is set to a standby state in which data from data equipment 902 can be received. Thus, data holding mechanism 930 outputs one word from data terminal equipment 902 to an output buffer 934, n bits of data constituting one word are transmitted to n data signal lines DL1 to DLn at one time through output buffer 934, and a transmission signal is transmitted through output buffer 936 to control signal line CL1. In the following, control signals SSO, SSI, /CI and /CO are also referred to as transmission signals.

In this example, the transmission signal is a low active signal, and indicates, when it attains the low level, that the data is transmitted from transmitting side equipment to the receiving side equipment.

The n bits of data DO transmitted over data signal lines Dl1 to DLn are input to data holding mechanism 950 through an input buffer 954 at the receiving side transmitter 922. Meanwhile, the transmission signal /CO transmitted over control signal line CL1 is input to transfer control mechanism 952 through input buffer 956 at the receiving side data transmitter 922.

Transfer control mechanism 952 sets the control signal /RO (/RI) to transmitting side data transmitter 920 at a receiving state, in response to the transmission signal /CI from input buffer 956 (that is, an output signal /CO of output buffer 936 of the transmitting side data transmitter 920).

Therefore, when n bits of data from data transmitter 920 are received by data transmitter 922, the control signal /RI is switched to the transmission inhibiting state in the transmitting side data transmitter 920. The transmitting side transfer control mechanism 932 detects, upon switching of control signal /RI to the transmission inhibited state, the fact that the data transmitter 922 has received the data from the data transmitter 920, and terminates the transmission signal.

When control signal SRI from data terminal equipment 904 is at the transmission permitting state, the receiving side transfer control mechanism 952 outputs to data terminal equipment 904, in response to transmission signal CI, control signal SSI indicative of the start of data transmission from data transmitter 920 to data terminal equipment 904. Transfer control mechanism 952 switches control signal /RO to data transmitter 920 from transmission inhibiting state to transmission permitting state, so that the data transmitter 922 is set to a standby state allowing reception of the next data from data transmitter 20. Approximately at the same time, transfer control mechanism 952 instructs data holding mechanism 950 to take and store n bits of data from input buffer 954.

CPU 908 in data terminal equipment 904 recognizes, in response to control signal SSI, that data transmitter 920 has received one word of data from data transmitter 920, and operates such that while data from data transmitter 922 is being received, the control signal SRI at the receiving state is input to receiving side transfer control mechanism 952. In this manner, control signal SRI assumes a transmission permitting state indicating that the data terminal equipment 904 is capable of receiving data from data transmitter 922, and a receiving state which indicates that the data terminal equipment 904 is now receiving data and transmission of the next data from data transmitter 922 is inhibited. In the following, control signals SRI, SRO, /RI and /RO are also referred to as reception signals.

When the reception signal SRI changes to the receiving state, the receiving side transfer control mechanism 952 recognizes that one word of data transmitted from data transmitter 920 are input through data signal lines DL1 to DLn to data transmitter 922 and to data terminal equipment 904 through data holding mechanism 950, and terminates data output from data holding mechanism 950 to data terminal equipment 904.

Data terminal equipment 904 switches reception signal SRI to data transmitter 922 from transmission inhibiting state to transmission permitting state in response to termination of reception and taking of data from data transmitter 922 so as to permit transmission of the next data from data transmitter 922, and enters the standby state, allowing reception of the next data.

In this example, the reception signal is also a low active signal. The reception signal attaining the low level shows the circuit receiving this reception signal that the data output from this circuit has been received by the circuit of the next stage, and that transmission of next data from this circuit should be inhibited. When the data is received by the circuit of the next stage and the circuit of the next stage becomes ready for the next data transmission, the reception signal attains to the high level. Therefore, the circuit on the transmitting side recognizes that the transmission of the next data is permitted as the reception signal is at the high level. Consequently, when there is a transmission request of new data from the circuit of the preceding stage, it can transmit the new data in response In this manner, data transmission/reception is carried out in response to the control signals SSO and SRO between the transmitting side data terminal equipment 902 and the transmitting side data transmitter 920. Data transmission/ reception is carried out in response to transmission signal /CO (/CI) and reception signal /RI RO between the transmitting side data transmitter 920 and the reception side data transmitter 922, and data transmission/reception is carried out in response to control signals SSI and SRI between the receiving side data transmitter 922 and the receiving side data terminal equipment 904.

More specifically, since data transmission/reception is carried out independently between the components on the transmitting side, between the transmitting side data transmitter and the receiving side data transmitter and between the receiving side components, data generated on the data terminal equipment 902 can be taken and processed word by word successively in the receiving side data terminal equipment 904.

After the lapse of a time period necessary for one word of data to be received and taken by data terminal equipment 904 from data terminal equipment 902 through data transmitters 920 and 922, and in a period (called one cycle time) until the start of transmission of the next one word of data from data terminal equipment 902, transmission signal /CO (/CI) attains at first to the low level at the start of data transmission from data transmitter 920 as shown in FIG. 54(a). During the time period $\tau 1$, the transmission signal /CO (/CI) is maintained at the low level until it returns to the high level in response to the reception signal /RI (/RO) attaining the low level, indicating that the data has been received and taken in data transmitter 922.

Reception signal /RI (/RO) attains to the low level by the operation of data transmitter 922 and data terminal equipment 904 in response to the low level transmission signal /CO (/CI), and maintained at the low level during the period $\tau 3$, until the data transmitter 922 starts transmission of data received from data transmitter 920 to the data terminal equipment 904 of the next stage, as shown in FIG. 54(b).

Transmission signal /CO (/CI) attains to the high level in response to a low level reception signal /RI (/RO) indicating that the data output from data transmitter 920 has been received by data transmitter 922. Thereafter, transmission signal /CO (/CI) is maintained at the high level during the period in which reception signal RI (/RO) returns to the high level allowing transmission of the next data from data transmitter 920 as the data transmitter 922 starts transmission of data to data terminal equipment 904. Transmission signal /CI (/CO) is at the high level during the period $\tau 2$ until the generation of the next data transmission request at the data terminal equipment 902 when the data transmitter 922 is at the standby state and ready for the reception of the next data from data transmitter 920.

More specifically, transmission signal /CO is kept at the low level during the period $\tau 1$ in which data transmitter 920 starts data transmission and a low level reception signal /RI (/RO) is returned from data transmitter 922, every time n bits of data, that is, one word is supplied from data terminal equipment 902 to data transmitter 920, or every time the control signal SSO is applied to transfer control mechanism 932. When it is recognized that data is transmitted from data transmitter 920 and the data is surely received by data transmitter 922, the transmission signal /CO is returned to the high level to be ready for the transmission of the next word from data transmitter 920 to data transmitter 922. Since reception signal /RO to data transmitter 920 is also returned to the high level simultaneously with the start of data transmission from data transmitter 922 to the data terminal equipment 904 of the next stage, data transmitter 920 starts transmission of the next data in response to any data transmission request from data terminal equipment 902 thereafter.

Transmission of data signals from data transmitter 920 to data signal lines DL1 to DLn is carried out in response to the fall of transmission signal /CO. Therefore, when a plurality of words to be transmitted to data terminal equipment 904 are continuously generated in data terminal equipment 902, data DO (DI) on data signal lines DL1 to DLn are switched to n bits of data constituting the next word in response to the fall of the transmission signal /CO, as shown in FIG. 54(c).

More specifically, at every one cycle time of transmission signal /CO, the first, the second . . . , kth, k+1th word, . . . appear on data signal lines DL1 to DLn.

Meanwhile, reception signal /RI attains to the low level in response to the application of the low level transmission signal /CO to transfer control mechanism 952 on the receiving side data transmitter 922, indicating that the data transmitter 922 has received one word of data from data transmitter 920. Therefore, as shown in FIG. 54(b), the reception signal /RI attains to and kept at the low level for a time period $\tau 3$, delayed from the fall of transmission signal /CO by the time period determined by the signal time on the control signal line CL1 and the time for signal processing in the data transmitter 922.

In the transmitting side data transmitter 920, transfer control mechanism 932 sets the control signal /CO back to the high level in response to the reception signal RI from input buffer 938 attaining the low level. Consequently, the transmitting side data transmitter 920 is ready for the transmission of the next word.

In the foregoing description, the interface apparatus 900 is provided between two data terminal equipments 902 and 904 which are distant from each other. Therefore, data transmitters 920 and 922 constituting the interface apparatus 900 are provided independent from the corresponding data terminal equipments 902 and 904 and the transmission path 300 is constituted by a cable 924 including at least (n+2) signal lines. The interface apparatus having such structure is used for data transmission between any circuits and apparatuses having data processing function, and the manner of provision of the data transmitters and the transmission path between these circuits or apparatuses is determined correspondingly to the specific application.

As an example, assume that interface apparatus 900 of FIG. 53 is provided for data transmission between 1 chip semiconductor integrated circuit devices having data processing function. Namely, referring to FIG. 53, each of the data terminal equipments 902 and 904 is consisting formed on one semiconductor substrate. Data transmitter 920 is formed on the same semiconductor substrate as the circuitry constituting the data terminal equipment 902. Similarly, data transmitter 920 is formed on the same semiconductor substrate as the circuitry constituting the data terminal equipment 904. Namely, the transmitting side data terminal equipment 902 and the transmitting side data transmitter 920 are formed by one chip IC and the receiving side data terminal equipment 904 and the receiving side data transmitter 922 are formed by another one chip IC. Consequently, the transmission path 300 is formed by output pins of these ICs. Each of the data signal lines DL1 to DLn and each of the control signal lines CL1 and CL2 correspond to one output pin of the IC.

As described above, in the conventional interface apparatus, data transmission between two apparatuses (or circuits) having data processing function in accordance with the parallel transmission system is carried out on the basis of data unit each having a predetermined bit length over a plurality of data signal liens, the number of which is the same as the number of bits of data constituting one unit. In addition, transmission of data of each of the bits constituting one unit is carried out in a predetermined constant time period.

For this reason, if the amount of data transmitted in a unit time between apparatuses (or circuits having data processing function) is to be increased, the number of data signal lines between the data transmitters constituting the interface apparatus must be increased, or the speed of signal processing by the data transmitter itself must be improved.

Referring to FIG. 53, as methods for increasing the amount of data transmission per unit time between data terminal equipments 902 and 904, a method in which the number of bits which can be transmitted at one time from data transmitter 920 to data transmitter 922 is increased, and a method in which the time required for each bit of data to reach the data transmitter 922 through corresponding signal liens DL1 to DLn is reduced, have been proposed.

In order to increase the amount of data transmission per a unit time period by the former method, what is necessary is to increase the number n of data signal lines DL1 to DLn and to increase the number n of the input signal lines and the output signal lines of each of the data holding mechanism 930 and 950 for transmitting one word of data from data transmitter 920 to data transmitter 922 at one time.

If the number of such signal lines is increased to m times that of the prior art (m>1), it becomes possible to transmit, in one cycle time of the transmission signal CO, (m×n) bits of data, that is, m words of data (assuming that the bit length of one word is n bits) at one time from data transmitter 920 to data transmitter 922. Therefore, the amount of data transmission per a unit time can be increased to m times that of the prior art.

In order to increase the amount of data transmission in unit time by the latter method, what is necessary is to reduce the time period ($\tau 1+\tau 2$) in which n bits of data constituting one word are on the data signal lines DL1 to DLn, by reducing one cycle time of the transmission signal /CO, as shown in FIG. 40.

For example, when the length of one cycle time of transmission signal /CO is reduced to 1/m (m>1) that of the prior art, 1 word of data constituted by n bits can be transmitted from data transmitter 920 to data transmitter 922 for (m×k) times in the period (k×($\tau 1+\tau 2$)) required in the prior art for transmitting one word of data constituted by n bits for k times from data transmitter 920 to data transmitter 922. Therefore, the amount of data transmission in a unit time can be increased to m times that of the prior art.

However, the speed of data transmission from data transmitter 920 to data transmitter 922 is determined by the characteristics of data signal lines DL1 to DLn, speed of data output and speed of signal processing in the transmitting side data transmitter 920, speed of processing the input data in the receiving side data transmitter 922 and so on, there is a limit in increasing the speed of data transmission.

More specifically, if one cycle time of transmission signal CO is reduced to be shorter than the time required for the 1 bit of data output from data holding mechanism 930 to be taken in the data holding mechanism 950 through output buffer 934, corresponding data signal lines DL1 to DLn and through the input buffer 954, then each bit of data transmitted from data transmitter 920 to data signal lines DL1 to DLn in response to the fall of transmission signal /CO cannot be completely taken in the receiving side data transmitter 922 by the next fall of the transmission signal /CO. Therefore, the length of 1 cycle time of transmission signal /CO must be the same or longer than this time period.

As described above, two approaches, that is, increase of the number of bits of data which can be transmitted at one time and reduction of time necessary for one data transmission between data transmitters have been taken in order to improve the amount of data transmitted in a unit time between apparatuses (or circuits) having data processing function.

However, if the amount of data transmission per unit time is to be increased by the former approach, the number of signal lines in and between data transmitters must be increased.

Accordingly, in the system employing an interface apparatus having increased amount of data transmission per unit time from this approach, the number of interconnections connecting the apparatuses (circuits), the number of signal lines in the apparatuses (circuits), the number of input/output terminals of the apparatuses (circuits) are increased, the scale of apparatuses (circuits) including IO drivers is increased incidentally, and therefore such system becomes large and expensive.

For example, referring to FIG. 39, assume that the data transmitter 920 is an integrated circuit device formed on the same chip as the data terminal equipment 902 and that the data transmitter 922 is an integrated circuit device formed on the same chip as the data terminal equipment 904. The number of IO pins of these integrated circuit device packages constituting the data signal lines DL1 to DLn is increased. Accordingly, since the number of signal lines between data holding mechanism 930 and output buffer 934 is increased, the area of the integrated circuit chip on which the transmitting side data transmitter 920 is formed is increased, and as the number of signal lines between data holding mechanism 950 and input buffer 950 is increased, the chip area of the integrated circuit in which the receiving side data transmitter 922 is formed is increased.

However, such increase in the chip area and in the number of input/output pins is not preferable as it goes against the recent demand of smaller and less expensive integrated circuit devices.

If the amount of data transmission per unit time is to be increased by the latter approach, it is necessary to increase the speed of data transmission between data transmitters. However, the speed of transmission is determined, as mentioned above, by the characteristics of data signal lines connecting data transmitters, the speed of signal processing in the transmitter side and receiver side data transmitters, the speed of data output from the transmitting side data transmitter and the speed of reception of data in the receiving side data transmitter.

Therefore, it becomes necessary to fabricate circuitry for generating various control signals, for example a clock signal, for controlling data transmission between data transmitters by using circuits which realize highly precise operation at higher speed. In addition, circuit condition such as impedance inductance and the like in the internal circuitry of the data transmitter must be more severely defined.

Accordingly, it becomes necessary to introduce elaborate and special circuit design technique and process technique. Therefore, it is not easy to increase the amount of data transmission per unit time by this approach.

As the data processing capability of information processing apparatuses used as data terminal equipment has been improved, the amount of data which can be processed at one time by the data terminal equipment has been increased. Therefore, when data transmission is carried out between such data terminal equipments having high data processing capability by using the conventional interface apparatus, the data terminal equipments cannot fully exhibit the inherent processing capability.

For example, referring to FIG. 53, assume that the CPUs 906 and 908 of data terminal equipments 902 and 904 are structured such that they can at one time process twice the data amount (n bits) which is transmitted at one time between data transmitters 920 and 922.

In that case, even if 2n bits of data are generated in CPU 906 of transmitting side data terminal equipment 902 to be transmitted to data terminal equipment 904, the 2n bits of data cannot be transmitted to data transmitter 922 from data transmitter 920 at one time but transmitted twice, n bits by n bits. Therefore, the 2n bits of data are transmitted by the interface apparatus 900 to data terminal equipment 904 consuming a time period corresponding to 2 cycle times of the transmission signal /CO.

Meanwhile, the CPU 908 on the receiving side data terminal equipment 904 is also structured to process at one time 2n bits of input data. Therefore, it can carry out data processing operation only at every time period corresponding to 2 cycle times of the transmission signals /CO.

More specifically, the receiving side data terminal equipment 904 cannot carry out the data processing operation from the supply of one word of data from the receiving side data transmitter 922 until the supply of the next one word of data and kept in the standby state. Therefore, the speed of data processing of the receiving side data terminal equipment 904 is, seemingly, about one half of the inherent speed of processing. Consequently, the speed of data processing of the entire system including the data terminal equipments 902 and 904 as well as the interface apparatus 900 is not much improved, though the capability of data processing of data terminal equipments 902 and 904 has been improved.

Therefore, in order to improve the speed of data processing of the entire system, it is desirable to much increase the amount of data transmission per unit time of the interface apparatus. In addition, even when the amount of data transmission per unit time is increased, the reliability of data transmission must be kept high.

SUMMARY OF THE INVENTION

Therefore, an object of the present invention is to provide an interface apparatus that is compact and easy to manufacture which realizes data transfer between data processing apparatuses to take place at speed higher than in the prior art.

Another object of the present invention is to provide an interface apparatus which can transmit data at higher speed between data processing apparatuses without much increasing the size of the circuitry necessary for transmission too much and which can be manufactured easily.

A still further object of the present invention is to provide an interface apparatus which can transmit data between data processing apparatuses at higher speed than in the prior art without increasing the number of pins for transmission or the bit widths of transmission path and which can be manufactured easily.

An additional object of the present invention is to provide an interface apparatus which can transmit approximately twice or approximately four times as much data as in the prior art per unit time without increasing the number of pins for transmission or increasing the bit width of the transmission path between data processing apparatuses and which can be manufactured easily.

A still further object of the present invention is to provide a compact interface apparatus allowing data transmission at higher speed than in the prior art between data processing apparatuses which can be manufactured by using existing manufacturing technique.

A still further object of the present invention is to provide a compact interface apparatus which allows more reliable data transmission between data processing apparatuses at higher speed than in the prior art, which can be manufactured by using existing manufacturing technique.

The interface apparatus in accordance with the present invention transmits data having the width of a first plurality of bits output at one time from a transmitting side data processing apparatus and applies the data to a receiving side data processing apparatus at one time, by using a transmission path having smaller bit width. The interface apparatus receives a first data transmission control signal for controlling data transmission from the transmitting side data processing apparatus. The first data transmission control signal assumes a first value and a second value alternately. The interface apparatus includes a data transmitter and a data receiver.

The transmitter is provided at the data output side of the transmitting side data processing apparatus. The transmitter receives, in response to the first transmission control signal, the data having the width of the first plurality of bits at one time from the transmitting side data processing apparatus, and divides the data into a second plurality of data groups each having the width of a plural bits. The transmitter successively outputs the data groups together with the second transmission control signal, in a reception period which corresponds to the period of successive two transitions of the first transmission control signal from the second value to the first value. The second transmission control signal changes, delayed by a prescribed period from the first transmission control signal, and assumes a first value and a second value alternately.

The data receiver is provided at the data input side of the receiving side data processing apparatus. The receiver successively receives, in response to the second transmission control signal, the second plurality of data groups outputted from the transmitter, and reconstruct the data having the width of the first plurality of bits. The receiver supplies the reconstructed data having the width of the first plurality of bits to the receiving side processing apparatus together with a third transmission control signal which indicates the timing for batch data supply at every reception period.

The transfer of data having the width of the first plurality of bits between the transmitting side and the receiving side data processing apparatuses can be carried out by using a transmission path having the width of smaller number of bits than the first plural, in a period corresponding to one cycle of the first transmission control signal. Therefore, high speed data transmission is made possible without increasing the number of pins for transmission or increase of the area occupied by the signal lines interconnections.

In a preferred embodiment of the present invention, synchronous transfer system is employed, and the first transmission control signal is a clock signal having a prescribed period. The transmitter includes a circuit for generating a timing signal by multiplying the frequency of the clock signal, a dividing circuit, and a selection circuit. The dividing circuit receives, in response to the clock signal, the data having the width of the first plurality of bits at one time from the transmitting side data processing apparatus, and divides the same into a second plurality of data groups each having the width of a third plurality of bits. In response to the timing signal, the selection circuit successively selects the second plurality of data groups one by one and outputs the same. The timing signal is applied to the receiver circuit as the second transmission control signal. The receiver includes a circuit responsive to the timing circuit for receiving the data group and reconstructing the original data having the width of the first plurality of bits. The data thus reconstructed are stored in a holding circuit in response to the third transmission control signal obtained by frequency-division of the timing signal, and applied as a batch to the receiving side data processing apparatus.

In another preferred embodiment of the present invention, the interface apparatus further operates in accordance with a handshaking system in response to a first reception control signal. The first reception control signal is applied from the receiving side data processing apparatus to the receiver in response to the third transmission control signal. The receiver generates a second reception control signal in response to the first reception control signal and to the second transmission control signal. The transmitter includes a transmission control circuit, a dividing circuit and a selection circuit.

The transmission control circuit generates, in response to the first transmission control signal and the second reception control signal, a second transmission control signal, a third reception control signal, a first timing signal and a second timing signal. The second timing signal defines a second plurality of timings in one reception period. In response to the first timing signal, the dividing circuit receives at one time the data having the width of the first plurality of bits from the first data processing apparatus, and divides the data into a second plurality of data groups each having the width of a predetermined third plurality of bits. The selecting circuit selects one by one, the second plurality of data groups at a second plurality of timings defined by the second timing signal, in response to the second timing signal, and outputs the same to the receiver.

The receiver includes a reconstructing circuit, an integrating circuit and a transmission control circuit. In response to the second transmission control signal, the reconstructing circuit successively receives and rearranges the second plurality of data groups within a receiving period and reconstructs the data having the width of the first plurality of bits. In response to the second transmission control signal, the integrating circuit integrates the data groups into the data having the width of the first plurality of bits, and applies the data as a batch in every reception period to the receiving side of the data processing apparatus. In response to the second transmission control signal, the transmission control circuit generates the third transmission control signal and applies this signal to the receiving side data processing apparatus. The transmission control circuit generates a timing signal defining a second plurality of timings for the reception period, and an integrating timing signal defining one timing at which the integrating circuit integrates the data groups for one reception period.

In a still another preferred embodiment of the present invention, each data group includes an identifier signal which has a different value from the next group's identifier signal even if two data groups are selected successively by the selection circuit. Alternatively, a circuit for adding such an identifier signal to each data group is provided in the transmitter. Selecting circuit includes a timing signal generating circuit and a multiplexer circuit. The timing signal generating circuit receives the first transmission control signal, or the first transmission control signal and the first reception control signal, and generates a timing signal. The multiplexer circuit successively selects any of the second plurality of data groups and outputs the selected one to the receiver, in response to the timing signal. At this time, the identifier signal is also selected. The identifier signal may be applied to the receiver. The transmitter further includes an identifier signal detecting circuit and the identifier signal detecting circuit detects whether or not the identifier signal provided from the multiplexer circuit has a correct value, and provides a detection signal. Based on this detection signal, a second transmission control signal is output to the receiver. The data is not received to be taken in the receiving side unless the detection signal is correctly detected, and therefore data transmission can be carried out with high reliability.

More preferably, the receiver includes an identifier signal detecting circuit. The identifier signal detecting circuit detects whether or not the identifier signal input to the receiver has a correct value, and provides a detection signal. The timing for taking each data group is controlled on the receiver side based on the detection signal. The data group is not taken in until the detection of the correct identifier signal, and thus each data can be reliably transmitted.

In a still another preferred embodiment of the present invention, the receiver further includes an identifier signal confirmation circuit. This enables continuous data transmission only when all the identifier signals added to the received data groups are correct, thus improving the reliability of data transmission.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
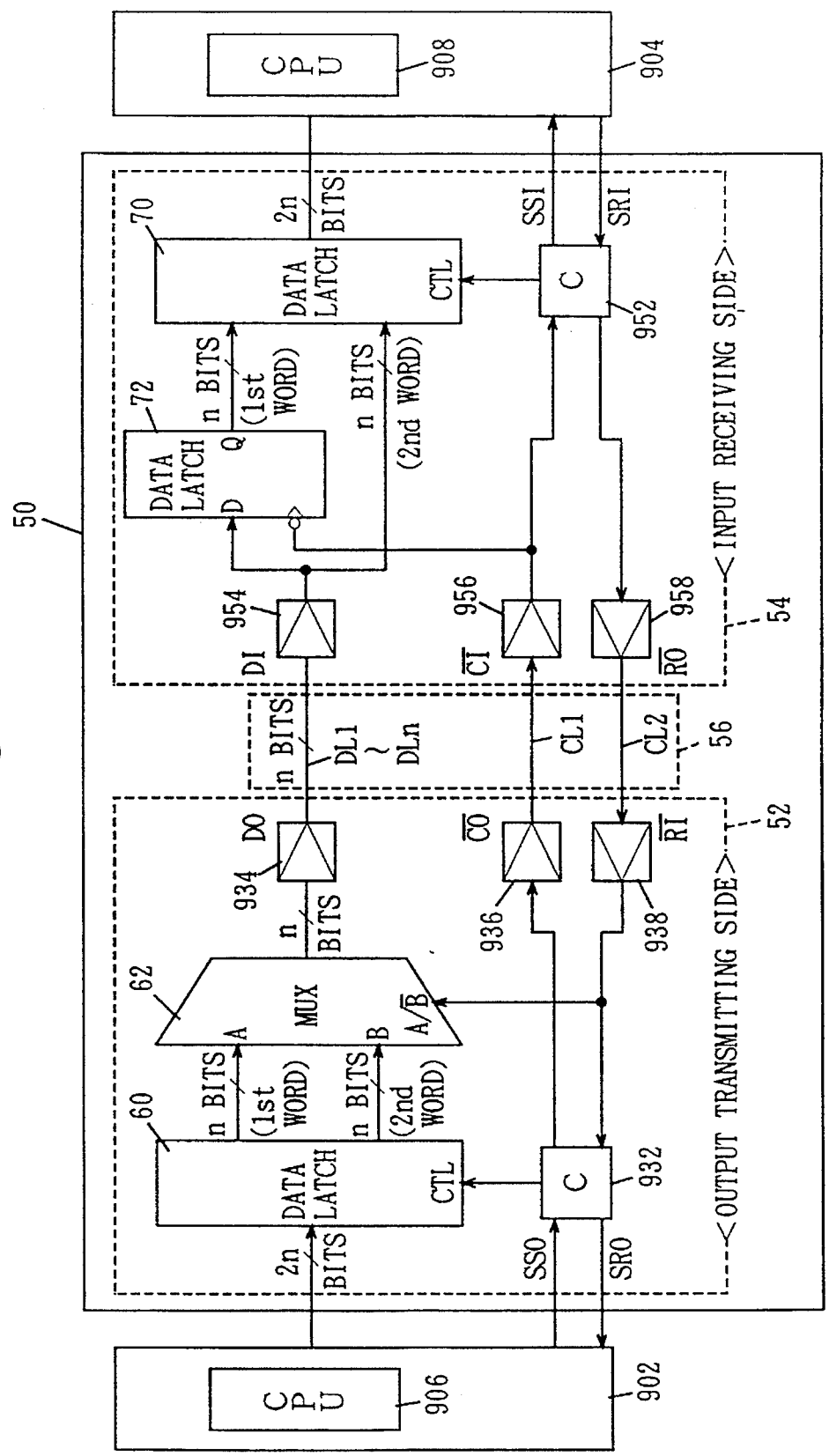
FIG. 1 is a block diagram schematically showing the structure of the interface apparatus in accordance with one embodiment of the present invention.

FIG. 1 is a schematic block diagram showing the structure of the interface apparatus in accordance with one embodiment of the present invention.

FIG. 1 shows the interface apparatus 50 of this embodiment provided between two data terminal equipments 902 and 904.

Figure 2:
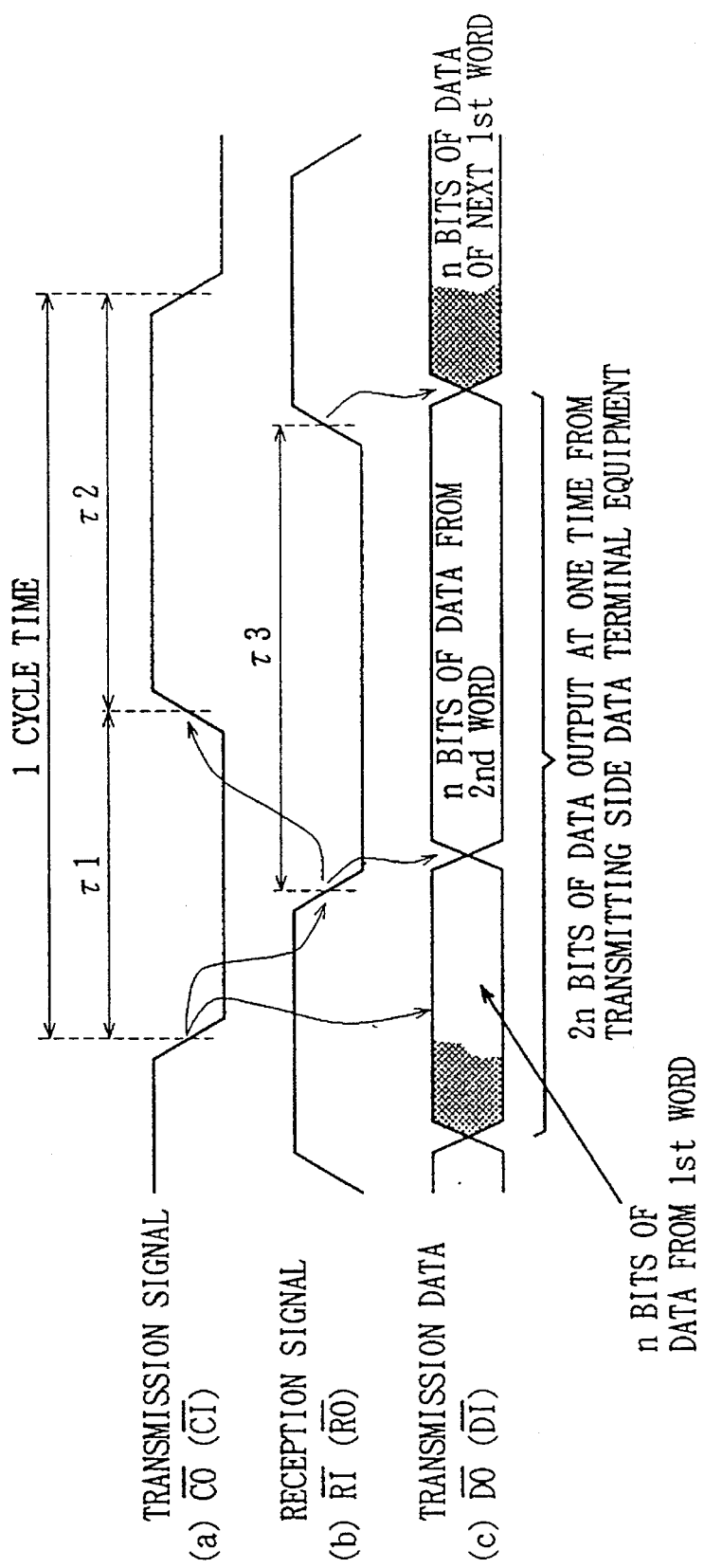
FIG. 2 is a timing chart showing basic data transmission timing by the interface apparatus of the embodiment of the present invention.

FIG. 2 is a timing chart showing basic data transmission timings of the interface apparatus of this embodiment.

The structure and operation of the interface apparatus in accordance with this embodiment will be briefly described with reference to FIGS. 1 and 2.

Referring to FIG. 1, the interface apparatus 50 of the present embodiment is connected between transmitting side data terminal equipment 902 and receiving side data terminal equipment 904. Interface apparatus 50 includes a transmitting side data transmitter 52, a receiving side data transmitter 54 and a data transmission path 56 connecting these two. Transmitting side data transmitter 52 is used connected to an output portion of transmitting side data terminal equipment 902. Receiving side data transmitter 54 is used connected to an input portion of receiving side data terminal equipment 904. These two data transmitters 52 and 54 are connected to each other by transmission path 56.

Figure 39:
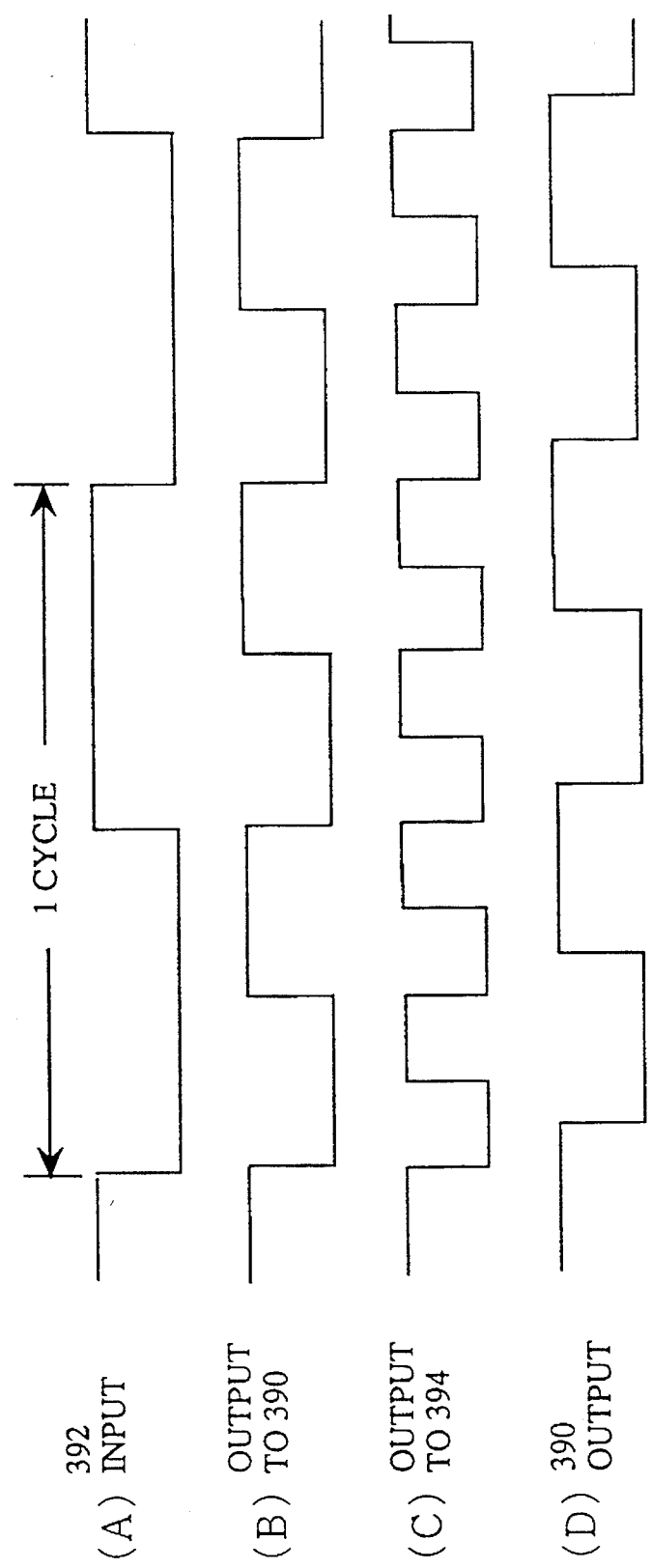
FIG. 39 is a diagram of waveform showing the operation of the frequency multiplier circuit 392.

Transmission side data transmitter 52 includes a data latch circuit 60 having the width of 2n bits and two outputs (n bits each); a multiplexer 62 having its input connected to two outputs of data latch circuit 60 for selecting and outputting either one of the signals each including n bits in response to a selection signal input to a control terminal; an output buffer 934 for the n bits of data output from multiplexer 62; a transfer control mechanism 932; an output buffer 936 for the transmission signal output from transfer control mechanism 932; and an input buffer 938 for applying the reception signal input from receiving side data transmitter 54 to data transfer mechanism 932. In FIGS. 1 and 39, the same portions are referred to by the same name and denoted by the same reference characters. Therefore, detailed description thereof is not repeated. Throughout the specification, the same portions are denoted by the same label and the same reference characters.

Receiving side data transmitter 54 includes an input buffer 954 for temporarily storing n bits of data input from transmitting side data transmitter 52; a data latch circuit 72 of n bits having its input connected to an output of input buffer 954; a data latch circuit 70 of 2n bits which has two inputs each including n bits, one of which is connected to an output of data latch circuit 72 and the other is connected to an output of input buffer 954; a transfer control mechanism 952; an input buffer 956 for the transmission signal; and an output buffer 958 for the reception signal. The output of data latch circuit 72 has the width of 2n bits and is connected to the receiving side data terminal equipment 904.

Data transmission path 56 has the same structure as data transmission path 924 shown in FIG. 39. It should be noted here that although the data transmitted between transmitting side data terminal equipment 902 and the receiving side data terminal equipment 904 is of the width of 2n bits, the data transmission path DL1 to DLn connecting the transmitting side data transmitter 52 and the receiving side data transmitter 54 has the width of only n bits.

Multiplexer 62 is controlled by the reception signal /RI from input buffer 938.

Data latch circuit 72 is controlled by the transmission signal /CI from input buffer 956.

The structures of the data terminal equipments 902 and 904 are the same as those of FIG. 39.

It should be noted that the CPU 906 of transmitting side data terminal equipment 902 and the CPU 908 of the receiving side data terminal equipment 904 are structured to allow processing of 2 words of data at one time. Here, one word of data includes n bits of data, as in the above described prior art.

Therefore, when data is transmitted from data terminal equipment 902 to data terminal equipment 904, 2n bits of data are simultaneously supplied from CPU 906 to data latch circuit 60 of the transmitting side data transmitted 52.

Different from the conventional data holding mechanism 930 (including a data latch circuit and the like), data latch circuit 60 temporarily stores the 2n bits of data supplied at one time from data terminal equipment 902, divides the data into units of words and applies n bits of data constituting the first word and n bits of data constituting the second word to different input terminals A and B of multiplexer 62, respectively. Each of the divided words is also called a data group in the following.

Different from the data holding mechanism 950, data latch circuit 70 takes collectively the n bits of data applied from data latch circuit 72 and n bits of data applied from input buffer 954 at the same time, and outputs the data to receiving side data terminal equipment 904. The CPU 908 of the receiving side data terminal equipment 904 collectively processes these 2n bits of data applied at one time from data latch circuit 70.

When data to be transmitted to data terminal equipment 904 is generated in transmitting side data terminal equipment 902, the data is applied on the 2n bits by 2n bits basis from data terminal equipment 902 to data transmitter 52, and at the same time, a control signal SSO indicative of the generation of data to be transmitted is applied.

In the transmitting side data transmitter 52, transfer control mechanism 932 sets the control signal SRO to the receiving state in response to the control signal SSO. Transfer control mechanism 932 instructs the data latch circuit 60 to take, store and output the input data and starts data transmission to the receiving side data transmitter 54, provided that the receiving side data transmitter 54 is available for data reception from the transmitting side data transmitter 52, that is, when it is in the transmission permitting state (that is, when the reception signal /RI applied from transfer control mechanism 952 of the receiving side data transmitter 54 to transfer control mechanism 932 of transmitting side data transmitter 52 is at the transmission permitting state). Consequently, 2n bits of data applied from data terminal equipment 902 to data transmitter 52 are divided into two data groups (words) and applied to multiplexer 62.

Multiplexer 62 selects either the n bits of data applied to input terminal A or n bits of data applied to input terminal B in response to the reception signal /RI from input buffer 938 and applies the selected data to output buffer 934.

For example, when the output signal /RI of input buffer 938 is at the high level, multiplexer 62 selects n bits of data applied to input terminal A, that is, the first word of data and, when the output signal /RI from input buffer 938 is at the low level, it selects n bits of data applied to input terminal B, that is, the second word of data.

Therefore, data DO (DI) applied on data signal lines DL1 to DLn connecting the data transmitters 52 and 54 are switched to the first word of data in response to the rise of the reception signal /RI (see FIG. 2(b)) and to the second word of data in response to the fall of the reception signal /RI.

The n bits of data DI input at one time to data transmitter 54 through data signal lines DL1 to DLn are applied to the input of data latch circuit 72 and one input (lower n bits) of data latch circuit 72 through input buffer 954.

Data latch circuit 72 is controlled by a transmission signal /CI (/CO) applied from input buffer 956 to a clock terminal such that it stores only those of the data output from input buffer 954 which are input through one input terminal A of multiplexer 64 on n bits by n bits basis.

For example, data latch circuit 72 operates such that it takes, stores and outputs n bits of data output at one time from input buffer 956 at the rising edge of the output signal /CI from input buffer 956 (or in the period when the signal /CI is at the low level).

Data latch circuit 70 is controlled y transfer control mechanism 952 and takes and stores n bits of data output from data latch circuit 72 and n bits of data output from input buffer 954 simultaneously in one cycle time of the transmission signal /CI from input buffer 956, and outputs the data collectively to data terminal equipment 904.

Meanwhile, when a low level transmission signal /CI indicating that the data has been transmitted from data transmitter 52 to data transmitter 54 is input to transfer control mechanism 952, the reception signal /RO to the transfer control mechanism 932 of data transmitter 52 is set to the low level so as to show the data transmitter 52 that the data transmitter 54 has received the data from data transmitter 52. Consequently, as in the prior art, the reception signal /RO attains to the low level after a prescribed delay from the fall of the transmission signal /CI as shown in FIG. 2(b). The transfer control mechanism 932 of data transmitter 52 recognizes that the data transmitter 54 has received the data by referring to the low level reception signal /RI from transfer control mechanism 952 of data transmitter 54, sets the transmission signal /CO to transfer control mechanism 952 of data transmitter 54 to the high level, whereby data transmission from data transmitter 52 to data transmitter 54 is completed.

Therefore, in the transmitting side data transmitter 52, while the reception signal /RI is at the high level, multiplexer 62 selects the first word of n bits, and at the time when the transmission signals/CO attains to the low level, it transmits the data to data signal lines DL1 to DLn. In the receiving side data transmitter 54, data latch circuit 72 takes and outputs the first word of n bits in response to the low level transmission signal /CI from data transmitter 52, and thus setting up of input to the data latch circuit 70 is carried out.

When the low level reception signal /RO is output from data transmitter 54, in data transmitter 52, multiplexer 62 selects the second word of n bits in response to the low level reception signal /RI and transmits the data through data signal lines DL1 to DLn to data transmitter 54.

When data transmitter 52 receives the low level reception signal /RI from data transmitter 54, transfer control mechanism 932 sets the transmission signal /CO to the high level, and therefore in the receiving side data transmitter 54, the transmission signal /CI rises to the high level.

After the transmission signal /CI from transmitting side data transmitter 54 rises to the high level, when the reception signal SRI from data terminal equipment 904 is at the transmission permitting state, data transmission from data transmitter 54 to data terminal equipment 904 is started by the operation of the receiving side transfer control mechanism 952. Namely, the first word of n bits from data latch circuit 72 as well as the second word of n bits from input buffer 954 which have been input to data latch circuit 70 are collectively taken in the data latch circuit 70 at one time as 2n bits of data, and transmitted to data terminal equipment 904. At the same time, the control signal SSI to data terminal equipment 904 attains to the low level, showing the data terminal equipment 904 that the data is now being transmitted from data transmitter 54 to data terminal equipment 904.

By the low level transmission signal SSI, the data terminal equipment 904 recognizes that the data have been transmitted from data transmitter 54 to data terminal equipment 904, and outputs a low level reception signal SRI. By this low level reception signal SRI, the data transmitter 54 recognizes that the data from data transmitter 54 have been surely received by data terminal equipment 904, and sets the control signal SSI to the high level.

When the data terminal equipment 904 completely takes in the data received from data transmitter 54 and enters the standby state allowing reception of the next data from data transmitter 54, it sets the reception signal SRI to the high level, so as to show the data transmitter 54 that the next data transmission is possible.

Consequently, 2n bits of data applied at one time to data latch circuit 60 in transmitting side data transmitter 52 are transmitted in the order of the first word and second word over the data signal liens DL1 to DLn in response to the fall of the transmission signal /CO.

In one cycle time of the transmission signal CO (/CI), the signal is at the low level in the former half τ1 and it is at the high level in response to the fall of the reception signal /RI in the latter half τ2. Therefore, the first word of data and the second word of data constituting 2n bits of data applied at one time from data terminal equipment 902 to the transmitting side data transmitter 52 are respectively transmitted over data signal lines DL1 to DLn to data transmitter 54 in the former half in which the reception signal /RI is at the high level and in the latter half in which the reception signal /RI is at low level, of the continuous time period having the same length as one cycle time of the reception signal /CO.

In this manner, in this embodiment, 2 words of data are transmitted from data transmitter 52 to data transmitter 54 in the time period which corresponds to one cycle time of the transmission signal /CO.

In the receiving side data transmitter 54, the first word of data which have been successively transmitted through data signal lines DL1 to DLn are taken in data latch circuit 72, and thereafter, when the reception signal SRI from data terminal equipment 904 is at the high level indicative of the transmission permitting state, the first word of data as well as the second word of data from input buffer 954 are output at one time from data latch circuit 70 in response to the rise of the transmission signal /CI from transmitting side data transmitter 52.

When a plural packets of data to be transmitted to data terminal equipment 904 are generated in the transmitting side data terminal equipment 902 (1 packet is assumed to include 2 words), the above described circuit operation is repeated, and the data of respective packets are transmitted continuously from data terminal equipment 902 to data terminal equipment 904 through the interface apparatus 50.

As described above, according to the present embodiment, in the time period which corresponds to one cycle time of the control signal /CO for controlling data transmission between data transmitters 52 and 54, different from the prior art, one word of data can be transmitted twice from data transmitter 52 to data transmitter 54. For this reason, when the speed of input/output and the speed of signal processing in data transmitters 52 and 54 are the same as in the prior art and the length of one cycle time of the transmission signal /CO (/CI) is the same as that of the prior art, the amount of data transmitted in a unit time between data terminal equipments 902 and 904 becomes twice that of the prior art example using the conventional interface apparatus shown in FIG. 39.

The number of data signal lines DL1 to DLn connecting the transmitting side data transmitter 52 and the receiving side data transmitter 54 is the same as that of the prior art. Therefore, the above described disadvantage of the increased number of input/output terminals of data transmitters 52 and 54 and problems derived therefrom can be avoided.

In this embodiment, the amount of data transmitted in a unit time is increased as the data having the bit length which can be processed at one time by data terminal equipments 902 and 904 is divided into two by the transmitting side data transmitter 52 and continuously transmitted to receiving side data transmitter 54. Similar effects as in this embodiment can be obtained when data having the bit length which can be processed at one time in data terminal equipments 902 and 904 are divided into three or more data groups each having the same bit length in the transmitting side data transmitter 54 and these groups are transmitted to the receiving side data transmitter 54 in time sequence in a time period corresponding to one cycle time of the transmission signal CO (/CI), for example. Examples of such embodiment will be described later. The number of data groups should preferably be the power of two, for the simplicity of circuit structure.

When data terminal equipments 902 and 902 are structured such that each can process at one time K×n (K is an integer not smaller than 3) bits of data, the K×n bits of data output at one time from the transmitting side data terminal equipment 902 are divided into K groups in the transmitting side data transmitter 52. These K groups are transmitted to the receiving side data transmitter 54 in time sequence in a time period which corresponds to 1 cycle time of the transmission signal /CO (/CI), for example, and the K groups are supplied at one time to the receiving side data terminal equipment 904 as the original K×n bits of data in the receiving side data transmitter 54. In this manner, the amount of data transmission in a unit time between data terminal equipments 902 and 904 by using the interface apparatus 50 can be increased to K times that of the prior art.

Therefore, the amount of data transmission in a unit time of the interface apparatus 50 can be arbitrarily adapted to follow the improvement of data processing capability of the information processing apparatuses used as data terminal equipments 902 and 904, and therefore the data processing capability of the data terminal equipments 902 and 904 can be fully exhibited.

In this manner, by using the concept of this embodiment, the amount of data transmission in a unit time can be sufficiently improved to meet the data processing capability of the data terminal equipments 902 and 904, without increasing the number of data signal lines between data transmitters 52 and 54 constituting an interface apparatus 50 or improving the speed of signal processing in the data transmitters 52 and 54 by introducing special design or process technique of the data transmitters 52 and 54.

Consequently, data transmission at high speed with high performance can be realized without increasing the cost of the entire system.

Figure 3:
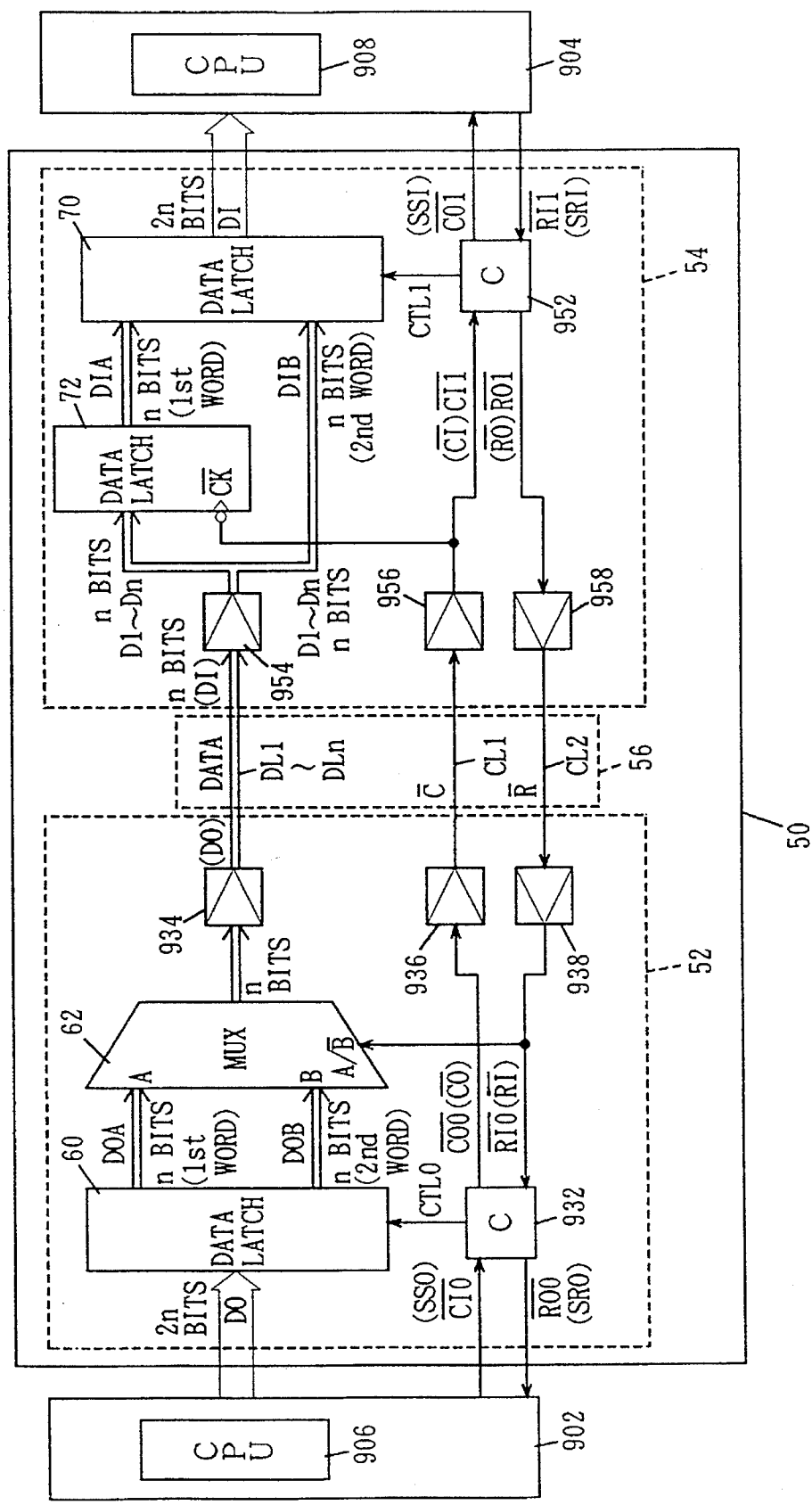
FIG. 3 is a schematic block diagram showing a specific example of the structure of the interface apparatus in accordance with the embodiment.
Figure 4:
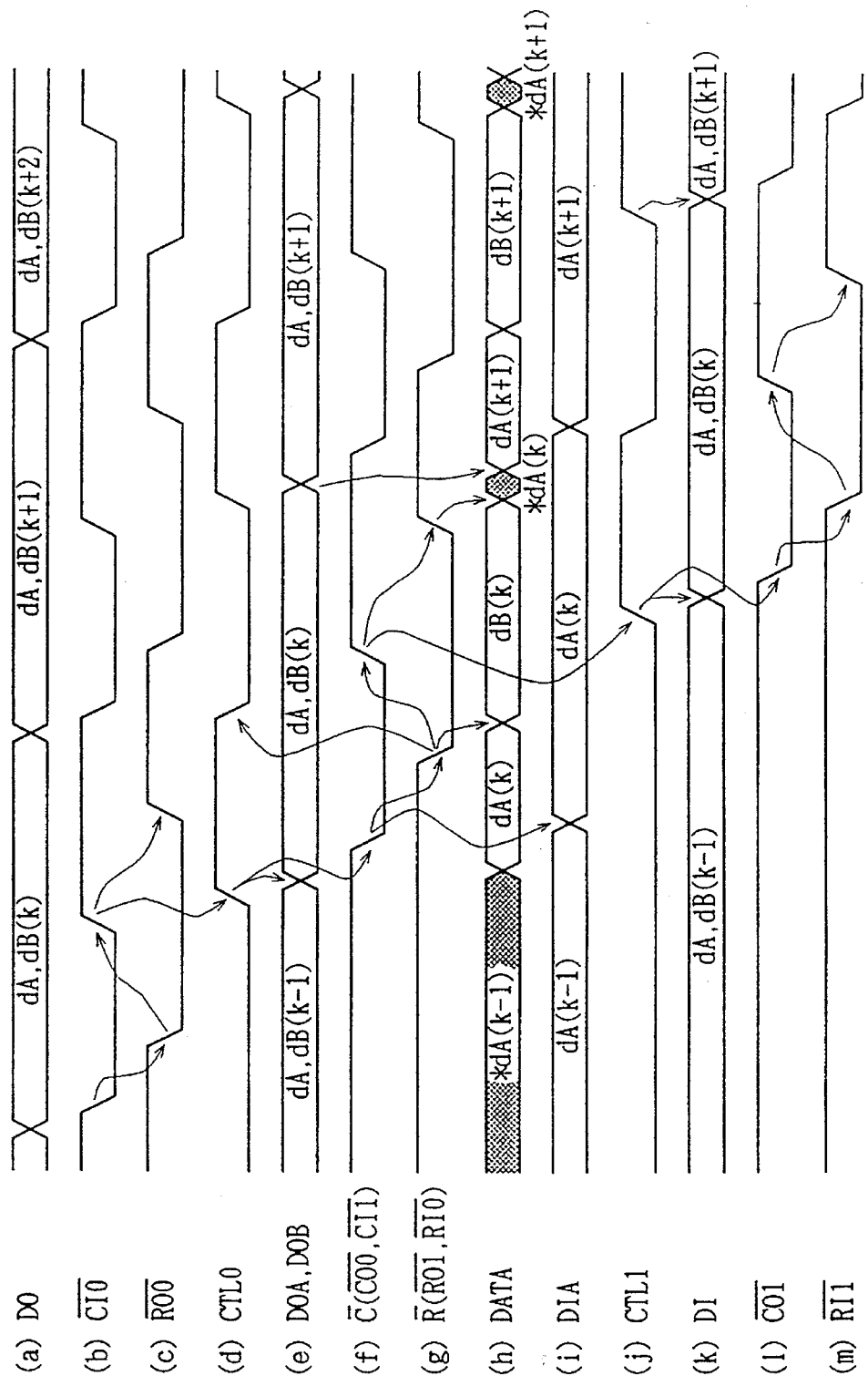
FIG. 4 is a timing chart showing timings of data transmission in the interface apparatus of FIG. 3.
Figure 5A:
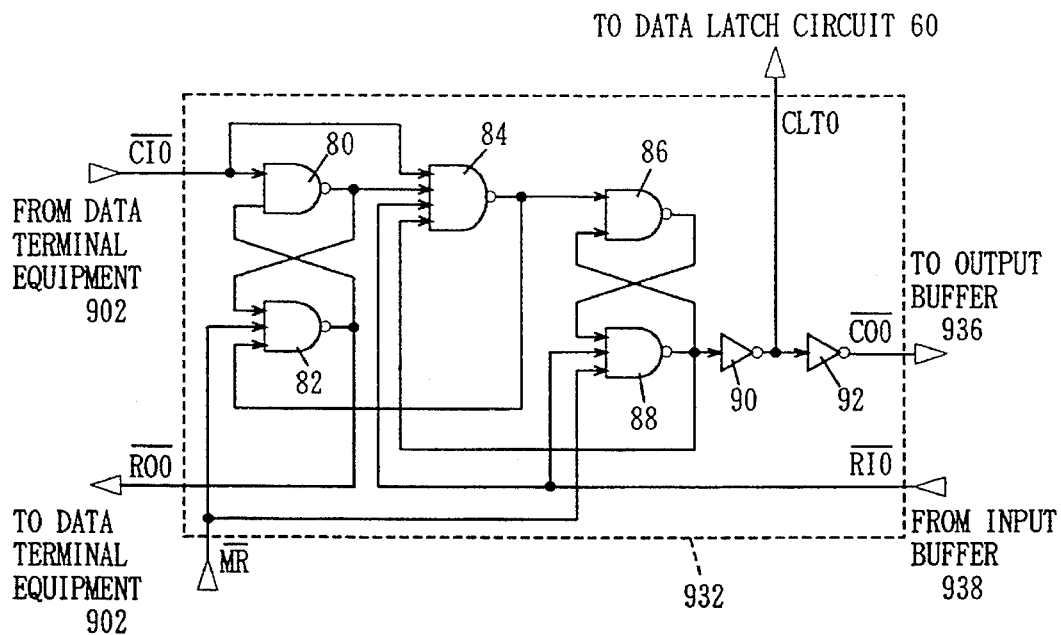
FIG. 5(a) and FIG. 5(b) are schematic diagrams showing examples of the structure of transfer control mechanisms 932 and 952 of FIG. 3.

FIG. 3 shows more specifically the structure of the interface apparatus of the above described embodiment. FIG. 4 is a timing chart showing in detail the timings of data transmission by the interface apparatus shown in FIG. 3. FIG. 4 shows an example in which plural groups of 2n bits of data to be supplied to data terminal equipment 904 are continuously output from transmitting side data terminal equipment 902. Referring to FIG. 4, the first word of data dA and the second word of data dB constituting 2n bits of data D0 input in kth order to the transmitting side data latch circuit 60 are respectively represented as dA (k) and dB (k). FIGS. 5(a) and (b) show examples of the structures of transfer control mechanisms 932 and 952 of FIG. 3.

Figure 6A:
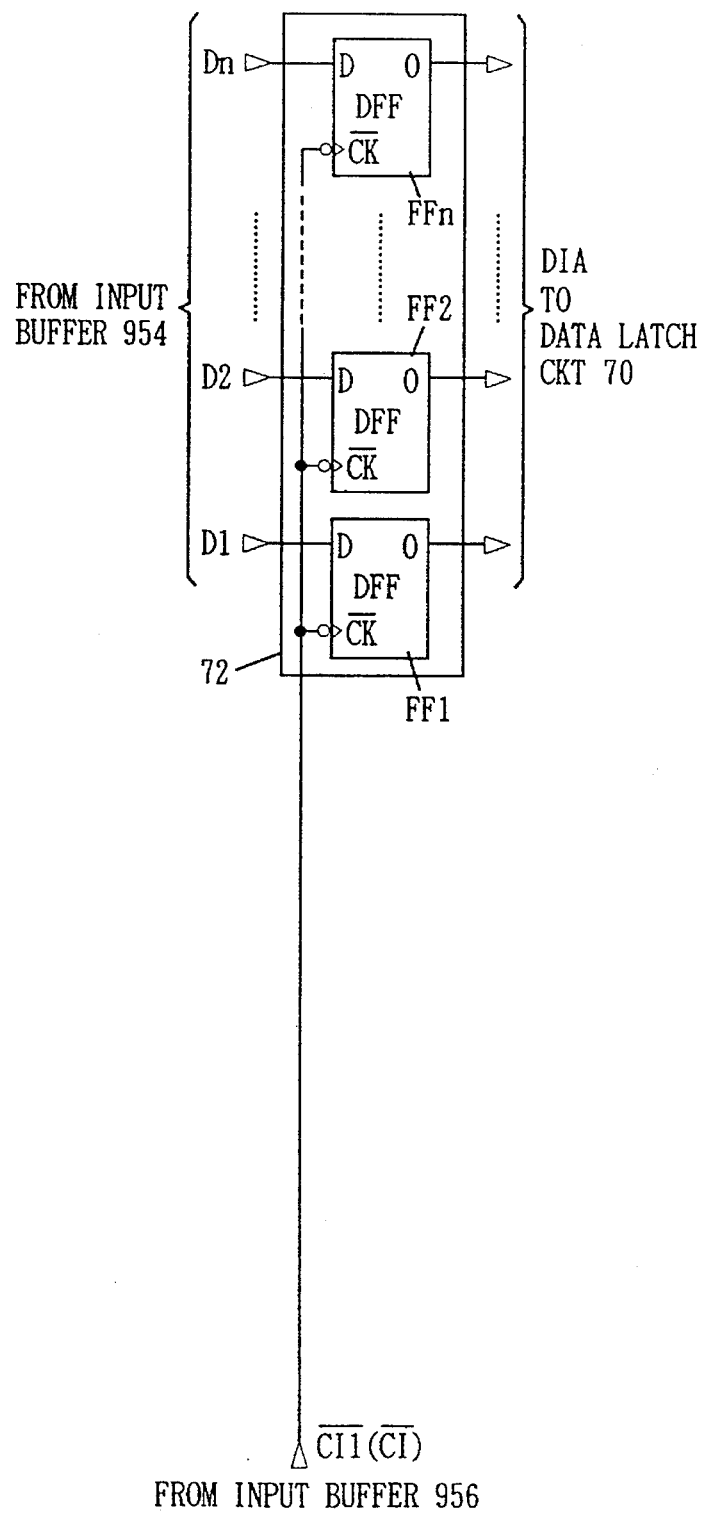
FIG. 6(a) and FIG. 6(b) are schematic diagrams showing examples of structures of data latch circuits 60, 70 and 72 of FIG. 3.

FIGS. 6(a) and (b) are schematic diagrams showing examples of structures of data latch circuits 60, 70 and 72 of FIG. 3.

The structure and operation of various portions of the interface apparatus in accordance with this embodiment will be described in detail with reference to FIGS. 3 to 6.

Referring to FIG. 3, the reference character shown in parenthesis "( )" indicates the corresponding control signal or data signal shown in FIG. 1.

Each of the transfer control mechanisms 932 and 952 shown in FIG. 3 includes, for example, 2-input NAND gate 80 and 3-input NAND gate 82 cross coupled to each other; a 4-input NAND gate 84; a 2-input NAND gate 86 and a 3-input NAND gate 88 cross coupled to each other; and two inverters 90 and 92.

Referring to FIG. 5(a), noting the transfer control mechanism 932 of the transmitting side data transmitter 52 for example, the control signal /CI0 from data terminal equipment 902 and an output signal from NAND gate 82 are input to NAND gate 80. The control signal /CI0, an output signal from NAND gate 80, an output signal from NAND gate 88 and the reception signal /RI0 from input buffer 938 are input to NAND gate 84. An output signal from NAND gate 86, the reception signal /RI0 from input buffer 938 and a master reset signal /MR are input to NAND gate 88. An output signal from NAND gate 82, an output signal of inverter 90 and an output signal of inverter 92 are used as the control signal /RO0 to data terminal equipment 902, a signal CTL0 for controlling data latch circuit 60 and the transmission signal /CO0 to output buffer 936, respectively.

Figure 5B:
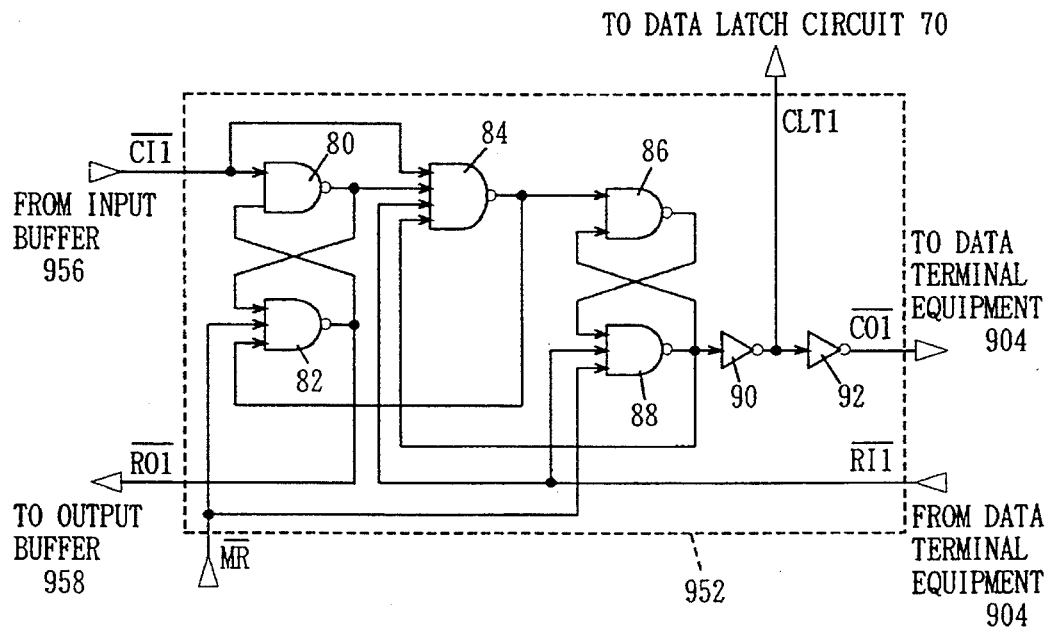

Referring to FIG. 5(b), in the transfer control mechanism 952 of the receiving side data transmitter 54, a transmission signal /CI1 from input buffer 956 and an output signal from NAND gate 82 are input to NAND gate 80. A transmission signal /CI1, an output signal from NAND gate 80, an output signal from NAND gate 88 and the control signal /RI1 from data terminal equipment 904 are input to NAND gate 84. An output signal from NAND gate 86, the control signal /RI1 from data terminal equipment 904 and the master reset signal /MR are input to NAND gate 88. An output signal from NAND gate 82, an output signal from inverter 90 and an output signal from inverter 92 are used as the control signal /CO1 for the data terminal equipment 904, a signal CTL1 for controlling the data latch circuit 70 and the reception signal /RO1 for the output buffer 958, respectively. In either of the transfer control mechanisms 932 and 952 of the transmitting side and the receiving side data transmitters 52 and 54, the master reset signal /MR clears the stored content of the set reset type flipflop constituted by NAND gates 82 and 80 and the set reset type flipflop constituted by the NAND gates 82 and 86, and fixes the output signal of NAND gate 82 and the NAND gate 88 at the high level, which is the initial state, regardless of the logic level of the external signals /CI0, CI1, RI0 and RI1. Therefore, a signal such as a master reset signal input once at the power on of the system including the interface apparatus, a clear signal or a power on reset signal, which is conventionally used for initialization of the system, may be used as the master reset signal /MR. The function of the master reset signal /MR is the same in the second and the following embodiments.

At the time of data transmission from data terminal equipment to data terminal equipment 904, 2n bits of data D0 (FIG. 4(a)) including the first word dA and the second word dB are applied from data terminal equipment 902 to the transmitting side data latch circuit 60 and at the same time, the control signal /CI0 (FIG. 4(b)) applied to the transmitting side transfer control mechanism 932 falls from the high level to the low level.

Referring to FIG. 5(a), at the initial state, if there is neither a data transmission request from data terminal equipment 902 nor the data which is being transmitted, the control signal /CI0 and the reception signal /RO0 from data terminal equipment 902 are both fixed at the high level. The control signal /RO0, the control signal CTL0 to the data latch circuit 60 and the transmission signal /CO0 to the output buffer 936 are respectively fixed at the high level, low level and the high level.

Therefore, the transmission signal /C (FIG. 4(f)) from output buffer 936 is fixed at a logic level which indicates that data transmission to data transmitter 54 is not being carried out, and the transmitting side CPU 906 recognizes, by the control signal /RO0, that the data transmitter 52 has not yet received data from data terminal equipment 902.

After the initial state, the output signal of NAND gate 82 is determined by output signals from NAND gates 80 and 84, and the output signal of NAND gate 88 is determined by an output signal of NAND gate 86 and the reception signal /RI0. Namely, the output logic level of the NAND gates 82 and 88 is determined by the control signal /CI0 from data terminal equipment 902 and the logic level of the reception signal /RI0 from input buffer 938.

When there is not any data to be transmitted to data terminal equipment 904 output from data terminal equipment 902, the reception signal /RI0 from input buffer 938 is at the high level.

When the control signal /CI0 attains to the low level, the flipflop constituted by the NAND gates 80 and 82 rewrites the information which has been stored therein. Namely, the potential at the output terminal of the NAND gate 80 is set to the high level and the potential at the output terminal of the NAND gate 82 is set to the low level, whereby the fact that there is a data transmission request from data terminal equipment 902 is stored in the flipflop constituted by the NAND gates 80 and 82.

Since the switching of the control signal CI0 from data terminal equipment 902 from the high level to the low level is surely received and stored as a data transmission request from the data terminal equipment 902 in this manner, the output signal of NAND gate 82, that is, the control signal /RO0 to the data terminal equipment 902 is switched to the low level as shown in FIG. 4(c). Thus the data terminal equipment 902 is informed of the fact that the transmission request from the data terminal equipment 902 is recognized by the data transmitter 52.

The NAND gate 86 again applies a signal which is the inversion of the output logic level (high level) of the inverter 88 by that time to the NAND gate 88, so that the state of the flipflop constituted by the NAND gates 86 and 88 is kept at the initial state. Consequently, the control signal CTL0 and the transmission signal /CO0 are respectively maintained at the low level and the high level for sometime after the switching of the control signal /CI0 to the low level.

The CPU 906 on the transmitter side recognizes that the above described 2n bits of data have been supplied from data terminal equipment 902 to the data latch circuit 60 as the control signal /RO0 is at the low level, and set the control signal /CI0 again to the high level.

When the control signal /CI0 returns to the high level, the input signals to the NAND gate 84 all attain to the high level, and therefore the output signal from NAND gate 84 is switched to the low level. Consequently, a high level signal is applied from NAND gate 86 to NAND gate 88. Accordingly, NAND gate 88, receiving high level signals at its all input terminals, outputs a low level signal. Namely, the flipflop constituted by the NAND gates 86 and 88 is switched from the initial state in which the low level and the high level potentials are maintained at the output terminals of NAND gates 86 and 88, respectively, to a state in which high level and the low level are maintained at the output terminals of the NAND gates 86 and 88, respectively, in response to the switching of the output of NAND gate 84 to the low level. Consequently, the control signal CTL0 switches from the low level to the high level, and the transmission signal /CO0 switches from the high level to the low level (see FIGS. 4(d), (f)).

In response to the output signal of the NAND gate 84 attaining to the low level, the output signal from NAND gate 82, that is, the control signals /RO0 to the data terminal equipment 902 again returns to the high level as shown in FIG. 4(c).

More specifically, when a high level transmission signal is output from data terminal equipment 902 and the data transmitter 54 is set to a state allowing reception of data from data transmitter 52, transmission of data from data transmitter 52 to data transmitter 54 starts. When data transmission to the data transmitter 54 starts, data transmitter 52 becomes ready for the reception of the next data from the data terminal equipment 902, and therefore it sets the reception signal /RO) to the high level so as to permit transmission of the next data from the data terminal equipment 902.

Accordingly, while the reception signal /RI0 is at the low level, the data transmission from data transmitter 52 to data transmitter 54 is not carried out, the data transmitter 52 is prevented from transmitting the next data by the data terminal equipment 902, and in the data latch circuit 60 of the data transmitter 52, 2n bits of data which have been output from data terminal equipment 902 previously are maintained.

In response to the switching of control signal CTL0 to the high level, the data latch circuit 60 takes and stores at one time 2n bits of data D0 from data terminal equipment 902.

In this manner, when control signal /CI0 switches to the low level, first the control signal /RO0 attains to the low level to show the data terminal equipment 902 that 2n bits of data D0 (FIG. 4(a)) have been supplied from data terminal equipment 902 to the transmitting side data latch circuit 60. Thereafter, control signal CTL0 attains to the high level to instruct the data latch circuit 60 to take and store the data D0. Finally, the transmission signal /CO0 (/C) attains to the low level so as to indicate the receiving side data transmitter 54 that the data have been transmitted from data transmitter 52 to data transmitter 54.

Therefore, in response to the rise of the control signal CTL0, the first word of data dA and the second word of data dB output simultaneously from data terminal equipment 902 are applied from data latch circuit 60 to multiplexer 62 (see FIG. 4(e)).

Multiplexer 62 outputs the first word of data D0A from data latch circuit 60, when reception signal /RI0 is at the high level. Therefore, as shown in FIG. 4(h), out of 2n bits of data D0 taken in the data latch circuit 60 in response to the rise of the control signal /CI0, the first word of data dA are transmitted from data transmitter 52 and this transmission is indicated to data transmitter 54 by transmission signal /C.

After the control signal CTL0 attains to the high level to activate the data taking storing function of the data latch circuit 60, the control signal /RO0 to data terminal equipment 902 returns to the high level. Consequently, the transmitting side CPU 906 acknowledges that the 2n bits of data output at one time from data terminal equipment 902 have been taken in the data latch circuit 60.

When transmission signal /C attains to the low level, the transmission signal /CI1 (FIG. 4(f)) to transfer control mechanism 952 is switched to the low level in the data transmitter 54 on the receiving side.

Referring to FIG. 5(b), the receiving side transfer control mechanism 952 has a structure similar to the transmitting side transfer control mechanism (FIG. 5(a)) with the input signals/CI0 and /RI0 replaced by transmission signal /CI1 and the control signal /RI1 from the receiving side data terminal equipment 904, the output signals CTL0, /CO and /RO0 respectively replaced by the control signal CTL1 to the receiving side data latch circuit 70, the control signal /CO1 to the receiving side terminal equipment 904 and the reception signal /RO1.

Therefore, at the initial state in which data transmission by the interface apparatus 50 has not yet been started, the reception signal /RO1, the control signal /CO1 to the receiving side data terminal equipment 904 and the control signal CTL1 to the receiving side data latch circuit 70 are fixed at the high level, high level and the low level, respectively (FIGS. 4(g), (l), and (j)).

From the initial state, data transmission by the interface apparatus 50 is started, and when the transmission signal /CI1 switches to the low level, at first the reception signal /RO1 to output buffer 958 switches to the low level. Thereafter, when transmission signal /CL1 returns to the high level, the control signal CTL1 to the receiving side data latch circuit 70 switches to the high level. Thereafter, the control signal /CO1 to the receiving side data terminal equipment 904 switches to the low level.

In response to the switching of transmission signal /CI1 to the low level, data latch circuit 72 takes and stores n bits of data from input buffer 954.

Accordingly, the first word dA which have arrived as data DATA at the receiving side transmitter 54 are taken and stored in data latch circuit 70 in response to the fall of transmission signal /CI1 and output to data latch circuit 70.

Meanwhile, reception signal /RO1 immediately falls to the low level after the first word of data dA are taken in the data latch circuit 72 at the fall of the transmission signal /CI1, and therefore, immediately after the fall of the transmission signal CI1, the reception signal /RI0 (FIG. 4(g)) to transfer control mechanism 932 in the transmitting side transmitter 52 attains to the low level.

Referring to FIG. 5(a), when the reception signal /RI0 switches to the low level, the control signal CTL0 to the transmitting side data latch circuit 60 returns to the low level as shown in FIG. 4(d), while the transmission signal /CO0 returns to the high level as shown in FIG. 4(f).

In response to the switching of the reception signal /RI0 to the low level, multiplexer 62 outputs the second word of data dB among the 2n bits of data stored in the transmitting side data latch circuit 60. Therefore, in response to the fall of the reception signal /R, the data DATA from the transmitting side data transmitter 52 are switched to the second word of data dB as shown in FIG. 4(h), the transmission signal /C returns to the high level as shown in FIG. 4(f), and further the control signal CTL0 returns to the low level as shown in FIG. 4(d) whereby the transmitting side data latch circuit 60 is set to the standby state to be ready for taking the next 2n bits of data from the transmitting side data terminal equipment 902.

When the transmission signal /C returns to the high level, the transmission signal /CI1 to the transfer control mechanism 952 in the receiving side transmitter 54 attains to the high level.

The second word of data dB transmitted as data DATA from data transmitter 54 are directly applied to the data latch circuit 70 from input buffer 954.

Referring to FIG. 5(b), when transmission signal /CI1 returns to the high level, the control signal CTL1 to the receiving side data latch circuit 70 returns to the high level as shown in FIG. 4(j), and then the control signal /CO1 to the transmitting side data terminal equipment 904 attains to the low level as shown in FIG. 4(l) by the similar circuit operation as shown in FIG. 5(a) when the control signal CI0 returns to the high level.

The receiving side data latch circuit 70 has its data taking/storing function activated in response to the switching of the control signal CTL1 from the corresponding transfer control mechanism 952 to the high level, as does the transmitting side data latch circuit 60. Accordingly, the first word of data dA which has been stored in data latch circuit 72 in advance and the second word of data dB applied this time from input buffer 954 are taken and stored in the receiving side data latch circuit 70 in response to the switching of control signal CTL1 to the high level, respectively as data D1A (FIG. 4(i)) and D1B (FIG. 4(h)). Consequently, 2n bits of data which have been stored in the transmitting side data latch circuit 50 are supplied as data D1 (FIG. 4(k)) from data latch circuit 70 to the receiving side data terminal equipment 904.

Meanwhile, the CPU 908 on the receiving side acknowledges by the switching of the control signal /CO1 from transfer control mechanism 952 to the low level that such 2n bits of data have been supplied to the data terminal equipment 904, and set the control signal /RI1 to the low level.

In this manner, after the first word of data dA and the second word of data dB are taken by the data latch circuit 70, the control signal /RI1 from the receiving side data terminal equipment 904 falls in response to the fall of the control signal /CO1.

Referring to FIG. 5(b), when the control signal /RI1 switches to the low level, the control signal CTL1 to the receiving side data latch circuit 70 switches to the low level as shown in FIG. 4(j) and the control signal /CO1 to the receiving side data terminal equipment 904 returns to the high level, by the similar circuit operation as in the case where the control signal /RI0 switches to the low level in the transmitting side transfer control mechanism 932.

As the control signal CTL1 returns to the low level, the receiving side data latch circuit 70 is fixed at a state in which the output of the data latch circuit 72 which has been just taken in, that is, the first word of data dA and the second word of data dB, is continuously stored and output.

When the control signal /CO1 returns to the high level, data which have been transmitted from data transmitter 54 are all taken in data terminal equipment 904 and the reception of data by the data terminal equipment 904 is completed, the CPU 908 on the receiving side sets the control signal /RI1 back to the high level. Consequently, the receiving side data transmitter 54 is set to the state before the input of data DATA from the transmitting side data transmitter 52, that is, the reception standby state.

Thereafter, every time 2n bits of data D0 are newly output to be transmitted from the transmitting side data terminal equipment 902 to the receiving side data terminal equipment 904, the logic levels of control signals /CI0, CI1, /CO0, /C01, /RO0, /RO1, /RI0, /RI1, CTL0 and CTL1 are changed in the above described manner repeatedly in the interface apparatus 50, and thus 2n bits of data D0 are supplied collectively at one time to the receiving side data terminal equipment 904.

Now, when the reception signal /RO1 (/R) returns to the high level, in the transmitting side data transmitter 52, control signal /RI0 to multiplexer 62 attains to the high level, and therefore the output data of multiplexer 62 switches to the first word of data DOA stored in the data latch circuit 60 at that time.

In the period from the change of the reception signal /RI0 to the high level until 2n bits of data are newly output from the transmitting side data terminal equipment 902 to keep the control signal /CI0 at the low level for a prescribed time period, the control signal /CTL0 to the transmitting side data latch circuit 60 is maintained at the low level, continuously disabling the data taking storing function of data latch circuit 60.

Therefore, the output data DATA of the transmitting side data transmitter 52 becomes temporarily the first word of data dA which has been already transferred (denoted by * in the figure) in response to the switching of the reception signal /R to the high level, as shown in FIG. 4(h). However, at this time, data latch circuit 62 has already output the data dA which has been taken and stored at the time of the fall of the control signal /CI1 in the receiving side data transmitter 54, and it is controlled such that the input data to data latch circuit 70 is not affected at all. Therefore, such temporary change of the data DATA does not influence at all the data transmitter 54 and the data terminal equipment 904 of the receiving side.

Data latch circuit 72 on the receiving side includes, for example, n flipflop circuits FF1 to FFn provided corresponding to n bits of data D1 to Dn applied from the circuit of the preceding stage, as shown in FIG. 6(a).

Transmission signal /CI1 is input to clock signal input terminal CK of each of the n flipflops FF1 to FFn of data latch circuit 72 on the receiving side. In this case, each of the flipflops FF1 to FFN takes an input potential to data input terminal immediately before the fall of the input potential to the clock signal input terminal CK to the low level, latches this at the data output terminal Q at a falling edge of the input potential to clock signal input terminal CK and keeps outputting the information until the generation of the next falling edge of the clock signal input terminal CK. Therefore, in the period from the falling edge of the input potential to clock signal input terminal CK to the next falling edge, data output terminal Q is maintained at the potential which has taken in immediately before the fall of the input potential to the clock signal input terminal CK regardless of the change in the input potential to data input terminal D.

Output signals from n flipflops FF1 to FFn are applied to data latch circuit 70 as data D1A.

Figure 6B:
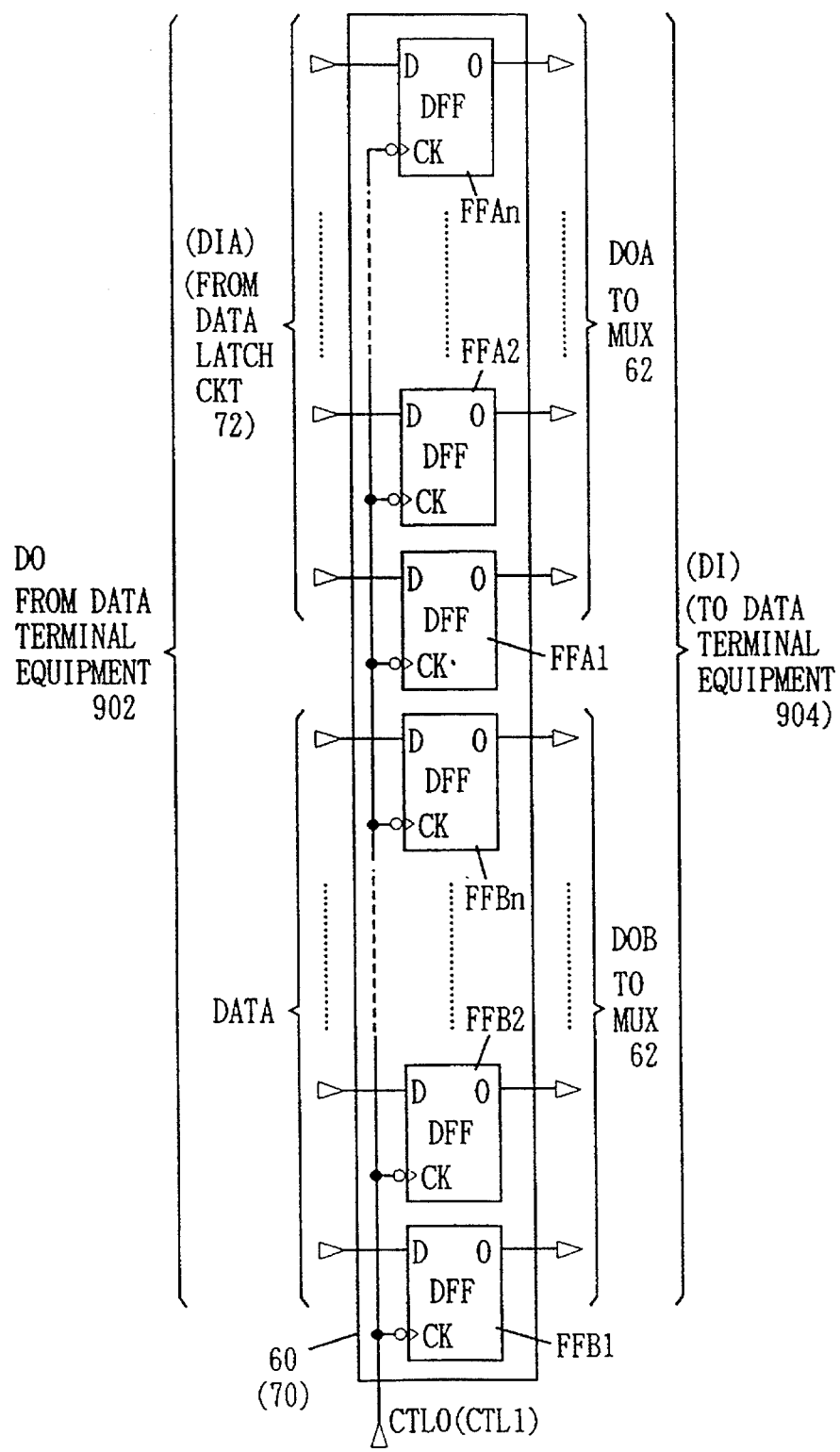

Another data latch circuit 70 on the receiving side includes, for example, n flipflops FFA1 to FFAn provided corresponding to n bits of data D1A from data latch circuit 72 and n flipflop circuits FFB1 to FFBn provided corresponding to n bits of data D1B from input buffer 954, as shown in FIG. 6(b).

The output signal CTL1 from the receiving side transfer control mechanism 952 is applied to the clock signal input terminal CK of each of the 2n flipflop circuits FFA1 to FFAn and FFB1 to FFBn. Each of the flipflop circuits FFA1 to FFAn and FFB1 to FFBn takes the input data to data input terminal D immediately before the rise of the input potential to the clock signal input terminal CK to the high level, latches the data at the rising edge of the input potential to the clock signal input terminal CK and continuously outputs the information until the generation of the next rising edge at the input potential to the clock signal input terminal CK. Therefore, in the period from the input of the rising edge to the clock signal input terminal CK to the input of the next rising edge, the data taken from the data input terminal D immediately before the rise of the input potential to the clock signal input terminal CK is maintained at the output terminal Q regardless of the change in the input data at the data input terminal D.

The output signals from 2n flipflop circuits FFA1 to FFAn and FFB1 to FFBn are applied as data DI to the receiving side data terminal equipment 904.

Data latch circuit 60 of the transmitting side may be structured similar to the data latch circuit 70 of the receiving side, such as shown in FIG. 6(b).

In the data latch circuit 60 of the transmitting side, the 2n flipflop circuits FFA1 to FFAn and FFB1 to FFBn are provided corresponding to 2n bits of data DO from data terminal equipment 902 on the transmitting side, and an output signal CTL0 from transmitting side transfer control mechanism 932 is applied to the clock signal input terminal CK of the flipflop circuits. To multiplexer 62 of FIG. 63, for example, output signals from flipflop circuits FFA1 to FFAn provided corresponding to the higher n bits of data are applied as data DOA, and output signals from flipflop circuits FFB1 to FFBn provided corresponding to the lower n bits are applied as data DOB.

The master reset signal /MR is for clearing the stored contents of the flipflop constituted by the NAND gates 82 and 80 and of the flipflop constituted by the NAND gates 86 and 88 in the transfer control mechanisms 932 and 952, as described above, and therefore it only has to be forced to the potential causing such resetting only at the initialization of the system. Therefore, the master reset signal /MR may be any signal if its level is not fixed at the potential that cannot cause such resetting, for example, the low level and if it attains to the high level during the operation of the system (provided that the transmitting side transfer control mechanism 932 and the receiving side transfer control mechanism 952 are structured as shown in FIGS. 5(a) and (b), respectively), and the manner and the source of generation of this signal is not limited. The master reset signal /MR may be generated in the data terminal equipments 902 and 904 or in data transmitters 52 and 54.

The 2n bits of data DO from data terminal equipment 902 may be divided such that the higher n bits of data and the lower n bits of data constitute the first and second words, respectively, in the transmitting side data transmitter 52.

In this embodiment, the present invention has been applied to an interface apparatus in which transmission control is carried out in accordance with the handshaking system. However, the present invention can be applied to interface apparatuses using any system of transfer control.

In the above described embodiment, the interface apparatus 50 carries out transmission control in accordance with the handshaking system. Therefore, data is divided into a plurality of groups in the transmitting side data transmitter 52, these plural groups of data are continuously transmitted from the transmitting side data transmitted 52 and the plural groups of data are taken in the receiving side data transmitter 54 by using the transmission signal /C and reception signal /R which are control signals particular to the transmission control of the handshaking system. However, the control of operations of the transmitting side data transmitter 52 and of the receiving side data transmitter 54 may be effected by using appropriate control signals dependent on the transmission control system of the interface apparatus to which the present invention is to be applied.

In the above described embodiment, on the receiving side, the data group transmitted at first are once latched in data latch circuit and applied to data latch circuit having the width of 2n bits, while the data group transmitted at last are applied directly to data latch circuit. However, a data latch circuit having the width of n bits for temporarily latching the last transmitted data group may be provided and the output thereof may be applied to data latch circuit 70.

In the above described embodiment, data transmitters 52 and 54 are provided separate from data terminal equipment 902 and 904 respectively, and each of the data terminal equipments 902 and 904 is an information processing apparatus having a CPU. However, the present invention can be applied to general interface apparatuses provided for data transmission between arbitrary circuits and devices having information processing function.

In the following, an embodiment employing synchronous transfer system, an embodiment including means for ensuring data transfer, an embodiment for transmission with the data divided not into two but four to be transmitted in one cycle of the transmission control signal will be described with reference to the figures.

[Second Embodiment]

Figure 7:
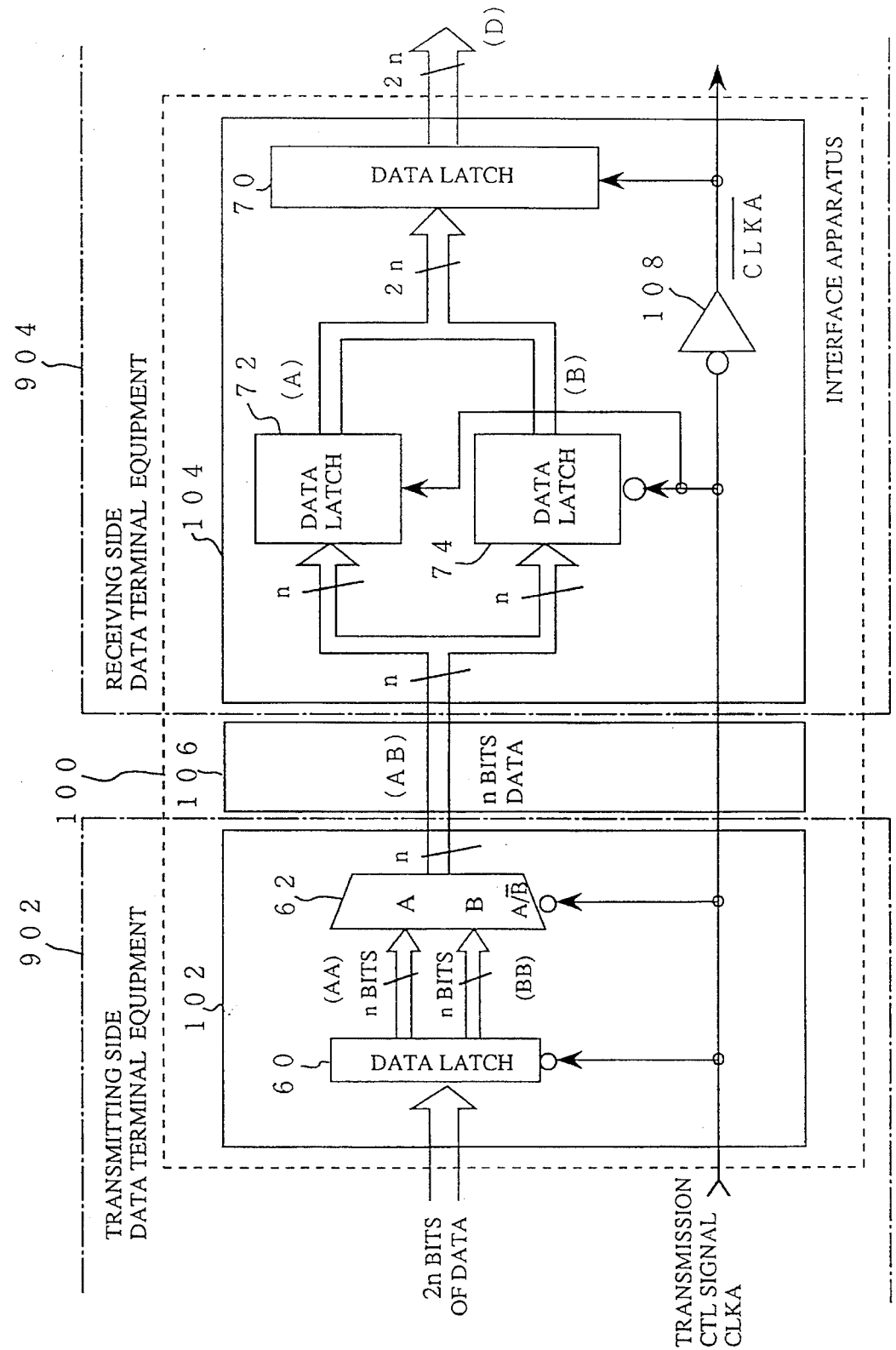
FIG. 7 is a block diagram of the interface apparatus in accordance with a second embodiment of the present invention.

FIG. 7 is a block diagram of an interface apparatus 100 in accordance with a second embodiment of the present invention. Different from the first embodiment, the interface apparatus 100 employs synchronous transfer system, using transmission control signals CLKA and /CLKA.

Referring to FIG. 7, interface apparatus 100 is provided for transmitting 2n bits of data between transmitting side data terminal equipment 902 and receiving side data terminal equipment 904. The interface apparatus 100 includes transmitting side data transmitter 102 provided in transmitting side data terminal equipment 902; a receiving side data transmitter 104 provided in receiving side data terminal equipment 904; and a data transmission path 106 connecting the transmitting side data transmitter 102 and the receiving side data transmitter 104. Interface apparatus 100 includes buffers for signals which are input/output. These buffers are not shown for the purpose of simplicity.

Transmitting side data transmitter 102 includes a data latch circuit 60 which receives and stores 2n bits of data from transmitting side data terminal equipment 902 for dividing the data into two words each including n bits for output; and a multiplexer 62 having two inputs respectively connected to two outputs of data latch circuit 60 for selecting either one of these two inputs in accordance with a control signal for outputting the selected one as n bits of data to data transmission path 106. Data latch circuit 60 and multiplexer 62 both operate under the control of transmission control signal CLKA applied from the transmitting side data terminal equipment 902.

The receiving side data transmitter 104 includes data latch circuits 72 and 74 having their inputs connected to data transmission path 106 and which are capable of holding n bits of data; and a data latch circuit 70 which can hold a total of 2n bits of data, that is, n bits of data output from each of the data latch circuits 72 and 74 and output the data collectively to receiving side data terminal equipment 904. Receiving side data transmitter 104 further includes a transmission control signal buffer 108 which inverts after a prescribed delay the transmission control signal CLKA applied from transmitting side data transmitter 102 and applies the inverted signal as the signal /CLKA to receiving side data terminal equipment 904. This buffer 108 provides a delay to the signal in order to ensure the margin for data latch. Therefore, signal inversion is not essential and can be replaced with a delay element. Data latch circuits 72 and 74 are controlled by the transmission control signal CLKA applied from the transmitting side data transmitter 102 and these latch circuits operate complementarily to latch n bits of input data in response to the change of the level of the transmission control signal CLKA to the opposite direction. Data latch circuit 70 is controlled by the transmission control signal /CLKA output from transfer control signal buffer 108 and latches the input 2n bits of data and collectively output the data to the receiving side data terminal equipment 904.

Figure 8:
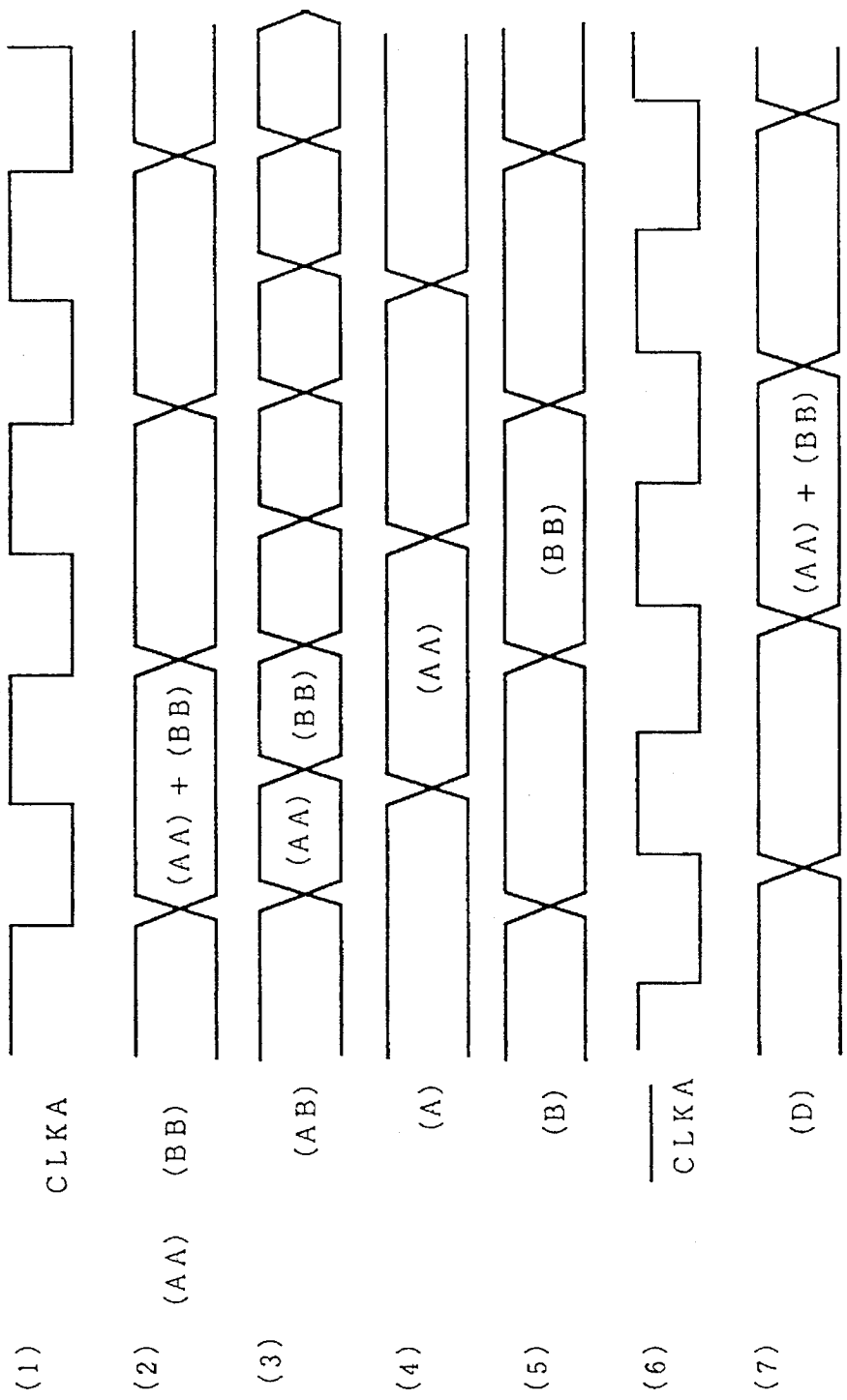
FIG. 8 is a timing chart showing the operation of the interface apparatus shown in FIG. 7.

FIG. 8 is a timing chart showing the operation of the interface apparatus 100 shown in FIG. 7. The transmission control signal CLKA is a clock signal having a predetermined period as shown in FIG. 8(1).

Referring to FIG. 8(2), 2n bits of data ((AA)+(BB)) applied from transmitting side data terminal equipment 902 to data latch circuit 60 is successively input at every one cycle of the transmission control signal CLKA. Data latch circuit 60 latches the data ((AA)+(BB)) in response to the fall of the transmission control signal CLKA. The transmission control signal CLKA is inverted and applied to a clock signal terminal of data latch circuit 60. Data latch circuit 60 divides the 2n bits of data ((AA)+(BB)) into two words (data groups) AA and BB each including n bits and applies the same to two inputs A and B of multiplexer 62.

When the signal input to a control terminal A/ (/B) rises to the high level, multiplexer 62 selects and outputs the data applied to the input A. When the signal input to control terminal A/ (/B) falls from the high level to the low level, it selects and outputs the data applied to input B. Since the signal applied to the control terminal of the multiplexer 62 is of negative logic, data AA is selected when the transmission control signal CLKA falls (or at the low level), and data BB is selected when the transmission control signal CLKA rises (or at the high level). More specifically, data output from multiplexer 62 will be the signal AB in which data AA and data BB appear alternately in every half cycle of the transmission control signal CLKA, as shown in FIG. 8(3).

Data latch circuit 72 latches the input data in response to the rise of the transmission control signal CLKA from the low level to the high level, and outputs the data. At this timing, the data applied from multiplexer 62 to the receiving side data transmitter 104 is the data AA as shown in FIG. 8(3), and therefore data latch circuit 72 latches and outputs data AA. Meanwhile, data latch circuit 74 latches input data in response to the fall of the transmission control signal CLKA from the high level to the low level. At this timing, the data applied to data latch circuit 74 is the data BB as shown in FIG. 8(3). Therefore, data latch circuit 74 holds and outputs the data BB. The data n bits each from the data latch circuits 72 and 74 are collected and applied as 2n bits of data to data latch circuit 70.

Transmission control signal buffer 108 inverts, after a prescribed delay time, the applied transmission control signal CLKA and outputs this as a transmission control signal /CLKA as shown in FIG. 8(6). The transmission control signal /CLKA is applied to the clock terminal of data latch circuit 70. Data latch circuit 70 latches and collectively outputs the input data in response to the rise of the level of the transmission control signal /CLKA from the low level to the high level.

If the delay of the transmission control signal /CLKA is selected to have such a timing as shown in FIG. 8(6), the data latched by data latch circuit 70 includes as higher n bits, the data AA applied from data latch circuit 72 and as lower n bits, the data BB applied from data latch circuit 74. The data D latch and output by data latch circuit 70 will be the data ((AA)+(BB)) which has been held by the data latch circuit 60 of the transmitting side data transmitter as shown in FIG. 8(7). Thus transmission of 2n bits of data from the transmitting side data terminal equipment 902 to the receiving side data terminal equipment 904 is completed.

In this case, the width of the data signal line included in the data transmission path 106 requires not 2n bits but only n bits. Therefore, by using the transmission path having the same bit width, the amount of data transmitted in a unit time can be doubled, and if the amount of data transmitted in a unit time is constant, the bit width of the transmission path can be made approximately one half.

[Third Embodiment]

Figure 9:
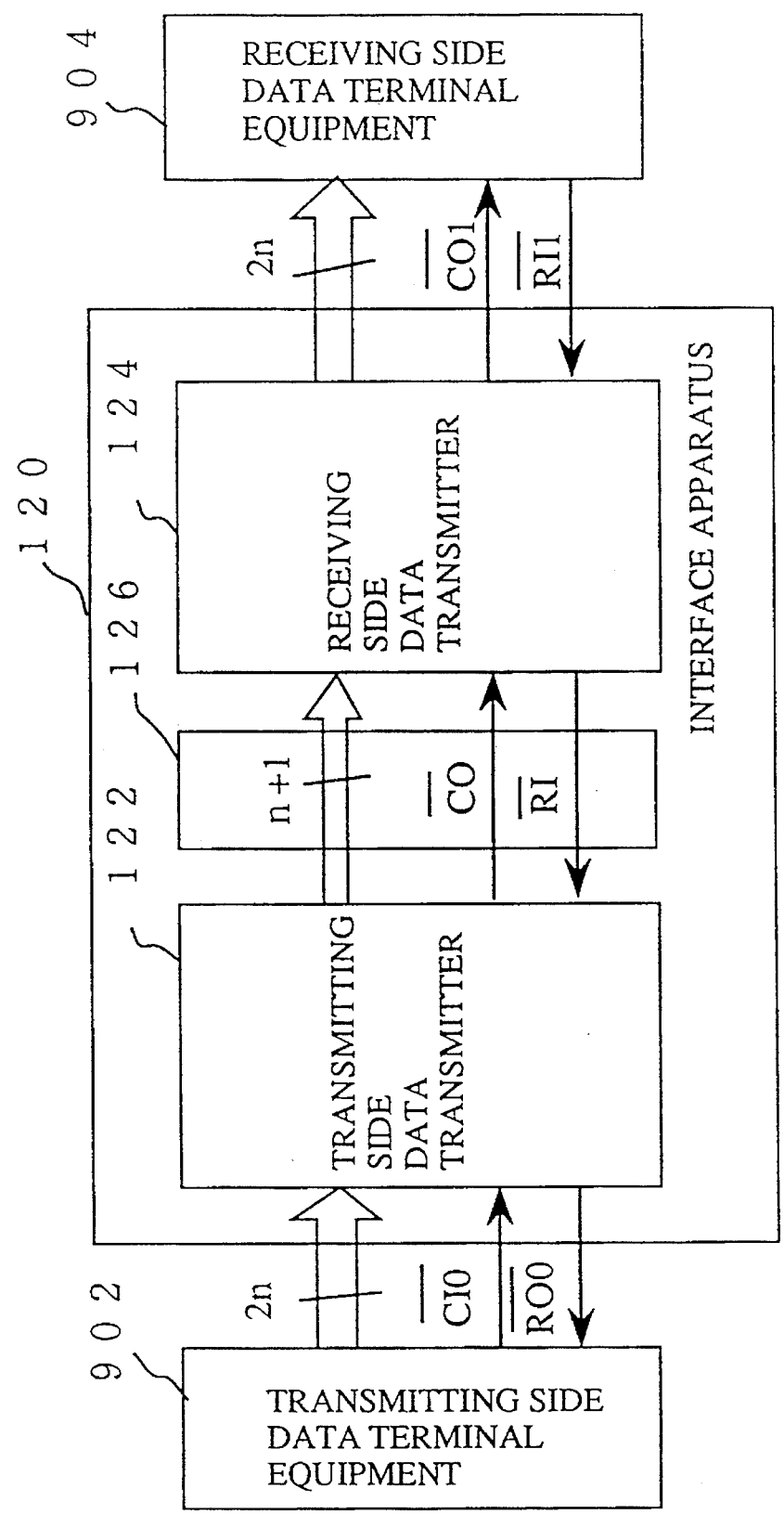
FIG. 9 is a block diagram of the interface apparatus in accordance with a third embodiment of the present invention.

FIGS. 9 to 18 show the interface apparatus in accordance with a third embodiment of the present invention. Referring to FIG. 9, the interface apparatus 102 in accordance with the third embodiment is provided for carrying out transmission of 2n bits of data between the transmitting side data terminal equipment 902 and the receiving side data terminal equipment 904 by using a data transmission path having the width of n+1 bits and two signal transmission paths for two transmission control signals (transmission signal /CO and reception signal /RRI), while maintaining high reliability of data transmission.

In the following embodiment, three circuits for confirmation are provided for maintaining reliability of data transmission. Only one or two of these circuits may be used.

Referring to FIG. 9, the interface apparatus 120 in accordance with the third embodiment includes a transmitting side data transmitter 122, a receiving side data transmitter 124 and a data transmission path 126 connecting these two. Interface apparatus 120 is for carrying out data transfer in accordance with the handshaking system as in the first embodiment, and for this purpose, control signal /CI0, /RO0, /CO1, /RI1, transmission signal /CO and reception signal /RI are transmitted and received between respective components 902, 122, 124 and 904.

Transmitting side data transmitter 122 receives 2n bits of data from transmitting side data terminal equipment 902 and transmits the data through the data transmission path having the width of n+1 bits in data transmission path 126 to the receiving side data transmitter 120.

Figure 10:
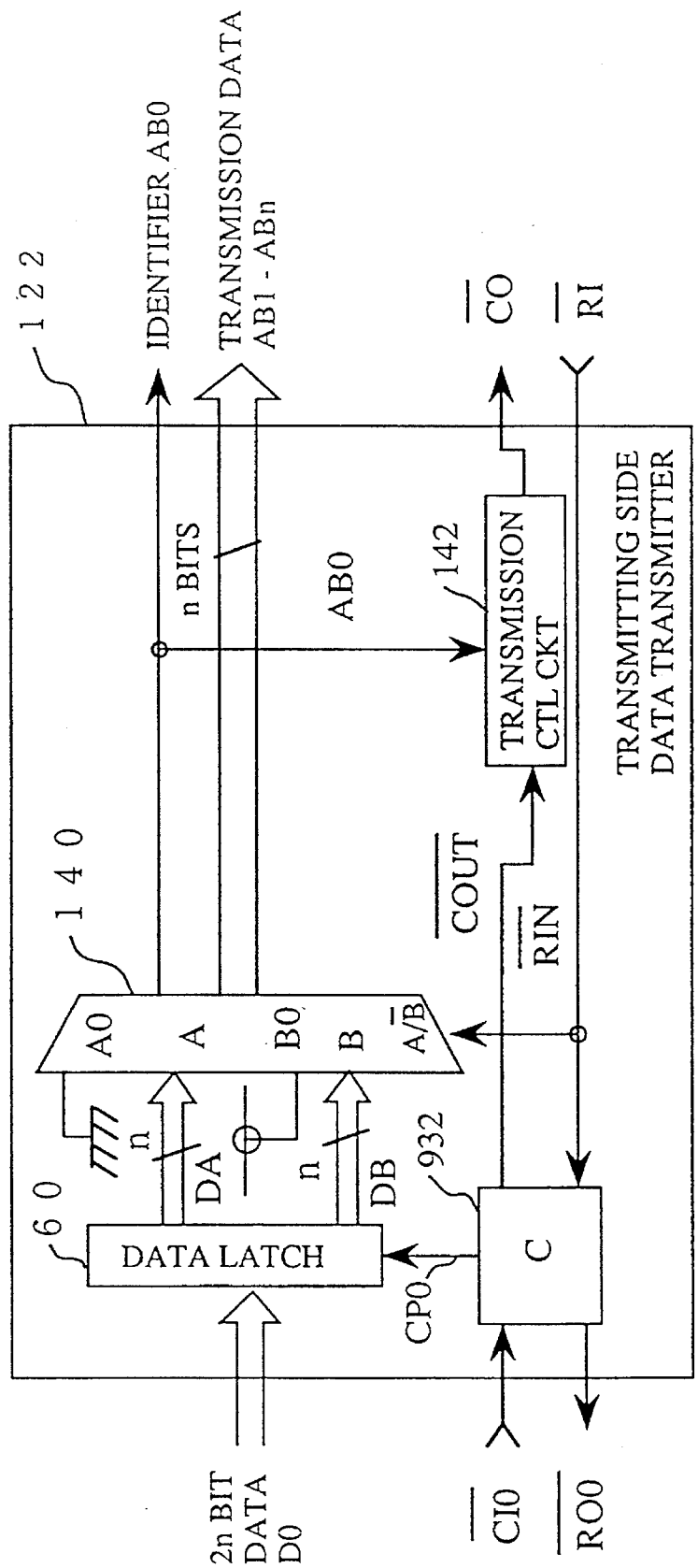
FIG. 10 is a block diagram of the transmitting side data transmitter of the interface apparatus in accordance with the third embodiment of the present invention.

Referring to FIG. 10, transmitting side data transmitter 12 includes a data latch circuit 60, a multiplexer 140, a transfer control mechanism 932 similar to that shown in FIG. 39, and a transmission control circuit 142 for detecting whether or not the data output from multiplexer 140 has been established as correct data and for outputting a transmission-signal /CO applied to the receiving side data transmitter 124 dependent on the result of detection.

Data latch circuit 60 is the same as that shown in FIGS. 1 and 3. The transfer control mechanism 932 is similar to the conventional one shown in FIG. 39. More specifically, transfer control mechanism 932 is for receiving control signal /CI0 from transmitting side data transmitter 902 (FIG. 9) and reception signal /RI (/RIN) from receiving side data transmitter 124 and for outputting control signal RO0 to transmitting side data terminal equipment 902 and control signal /COUT to transmission control circuit 142.

Multiplexer 140 is for selecting data applied to input terminals A and B in response to reception signal /RIN applied from receiving side data transmitter 124 and for outputting the selected data as transmission data AB1 to ABn. Multiplexer 140 further outputs an identifier AB0 showing whether or not the transmitted data AB1 to ABn have been established as the selected data, after the selection of the data. In order to output the identifier AB0, multiplexer 140 further includes two input terminals A0 and B0. One input terminal A0 is connected to the ground potential. More specifically, logic "0" is input to input terminal A0. The other input terminal B0 is connected to the power supply Vcc. Namely, the input terminal B0 is continuously provided with the logic "1". In response to the reception signal /RIN applied to the control terminal, multiplexer 140 selects logic "0" input to input terminal A0 together with the data DA applied to the input A, and logic "1" applied to input terminal B0 together with the data DB applied to input B, respectively, and outputs the same as the identifier AB0. The identifier AB0 is applied to the receiving side data transmitter 124 through one of the transmission path having the width of n+1 bits of the transmission control circuit 126 shown in FIG. 9. As shown in FIG. 10, the identifier AB0 is also applied to the transmission control circuit 142.

In this embodiment, the data used as the identifier is 1 bit. When data is divided into two for transmission, what is necessary is to detect whether or not the data being transmitted is the first or second data. For this purpose, the information of only 1 bit (1 or 0) is enough.

Figure 11:
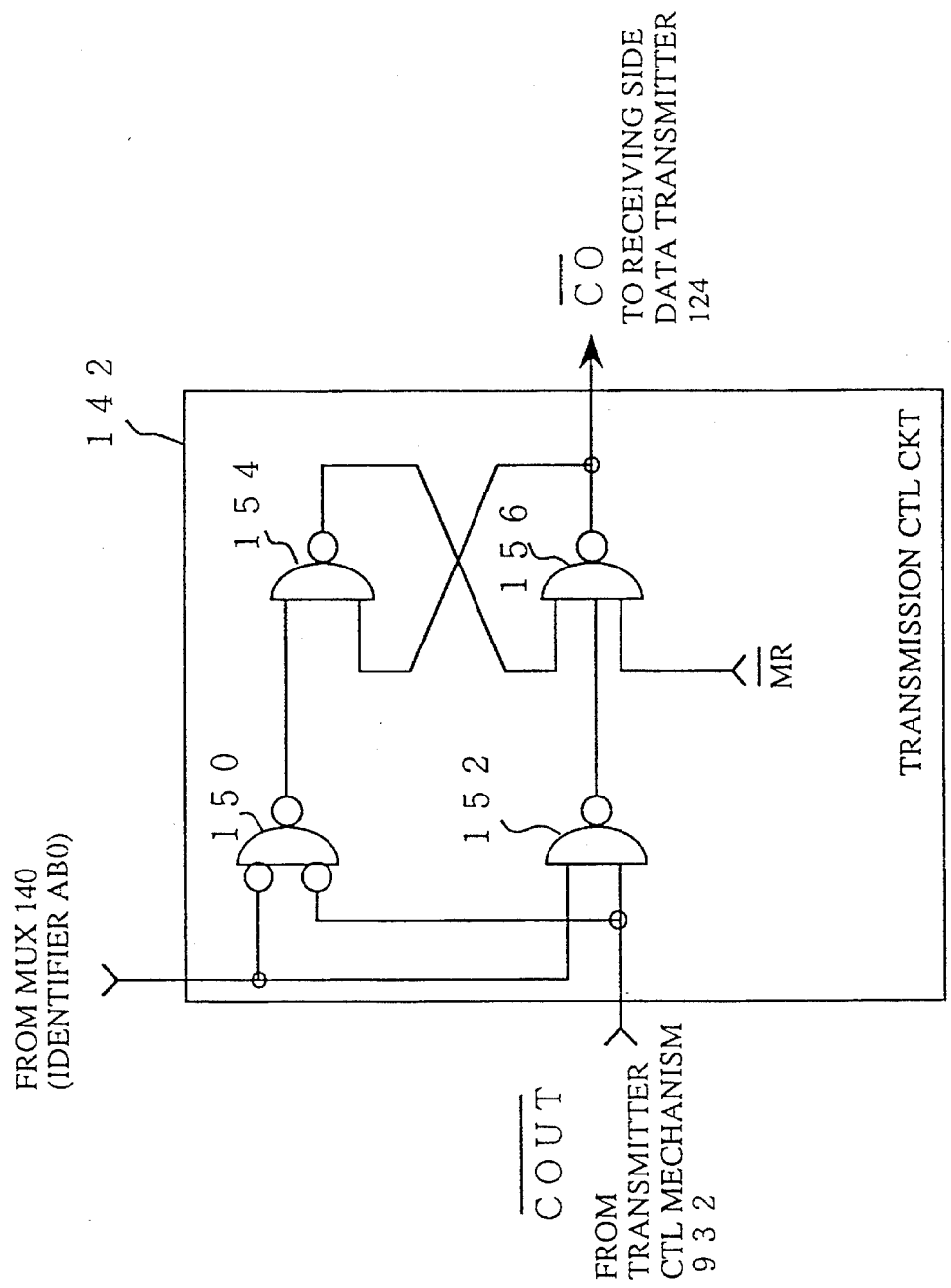
FIG. 11 is a schematic block diagram of the transmission control circuit.

Referring to FIG. 11, transmission control circuit 142 includes an NAND gate 152 having one input receiving the identifier AB0 from multiplexer 140 and the other input receiving the transmission signal /COUT from transfer control mechanism 932, respectively in the negative logic; an NAND gate 152 having one input receiving the identifier AB0 and the other input receiving the transmission signal /COUT; and cross coupled to NAND gates 154 and 156. The NAND gate 154 has its the other input connected to the output of the NAND gate 150. NAND gate 156 is a 3-input NAND gate, one of which is connected to the output of NAND gate 152. The remaining one receives the master reset signals /MR. The output of NAND gate 156 is transmission signal /CO applied through the receiving side data transmitter 124.

Figure 12:
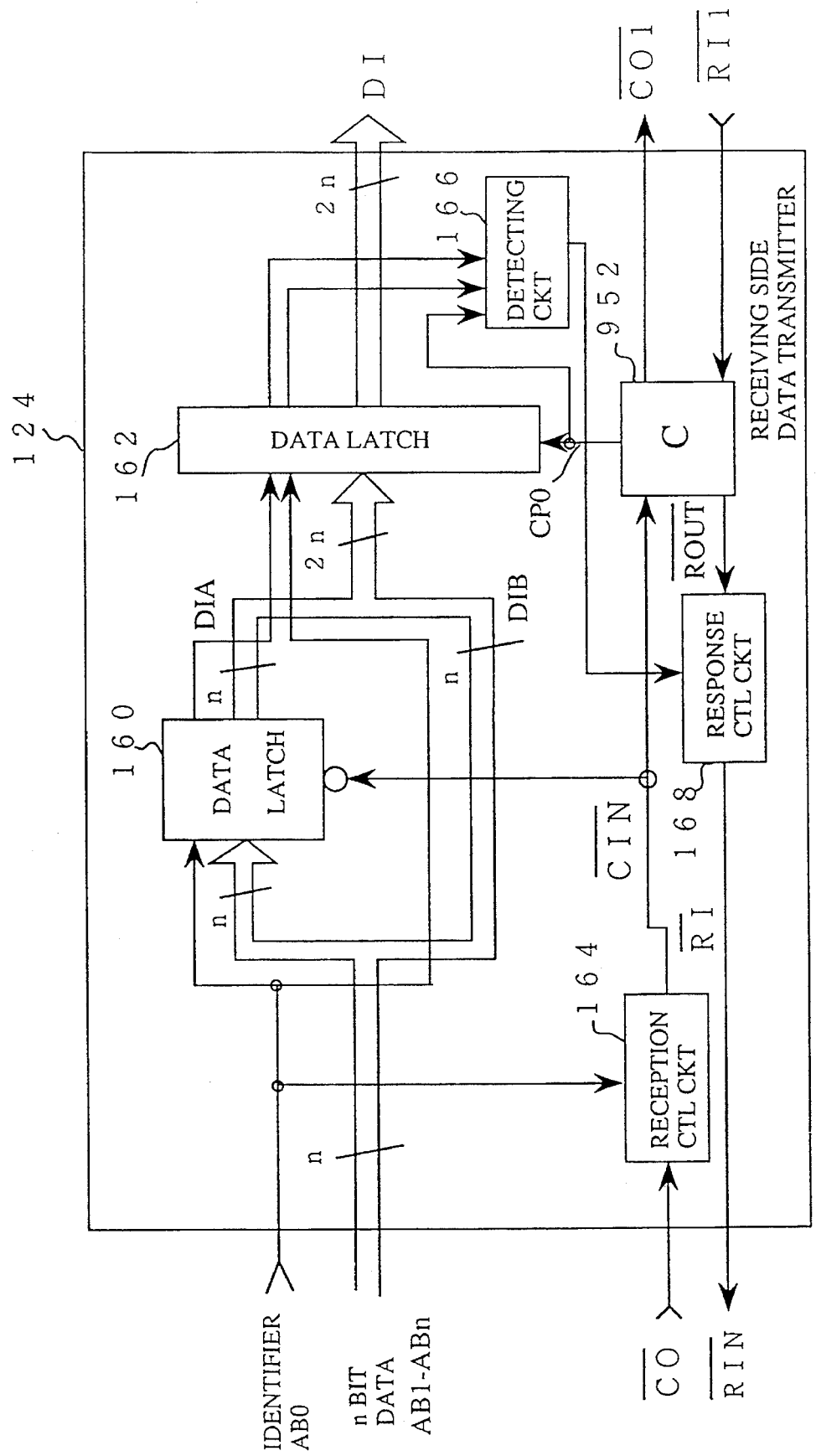
FIG. 12 is a block diagram of the receiving side data transmitter.
Figure 53:
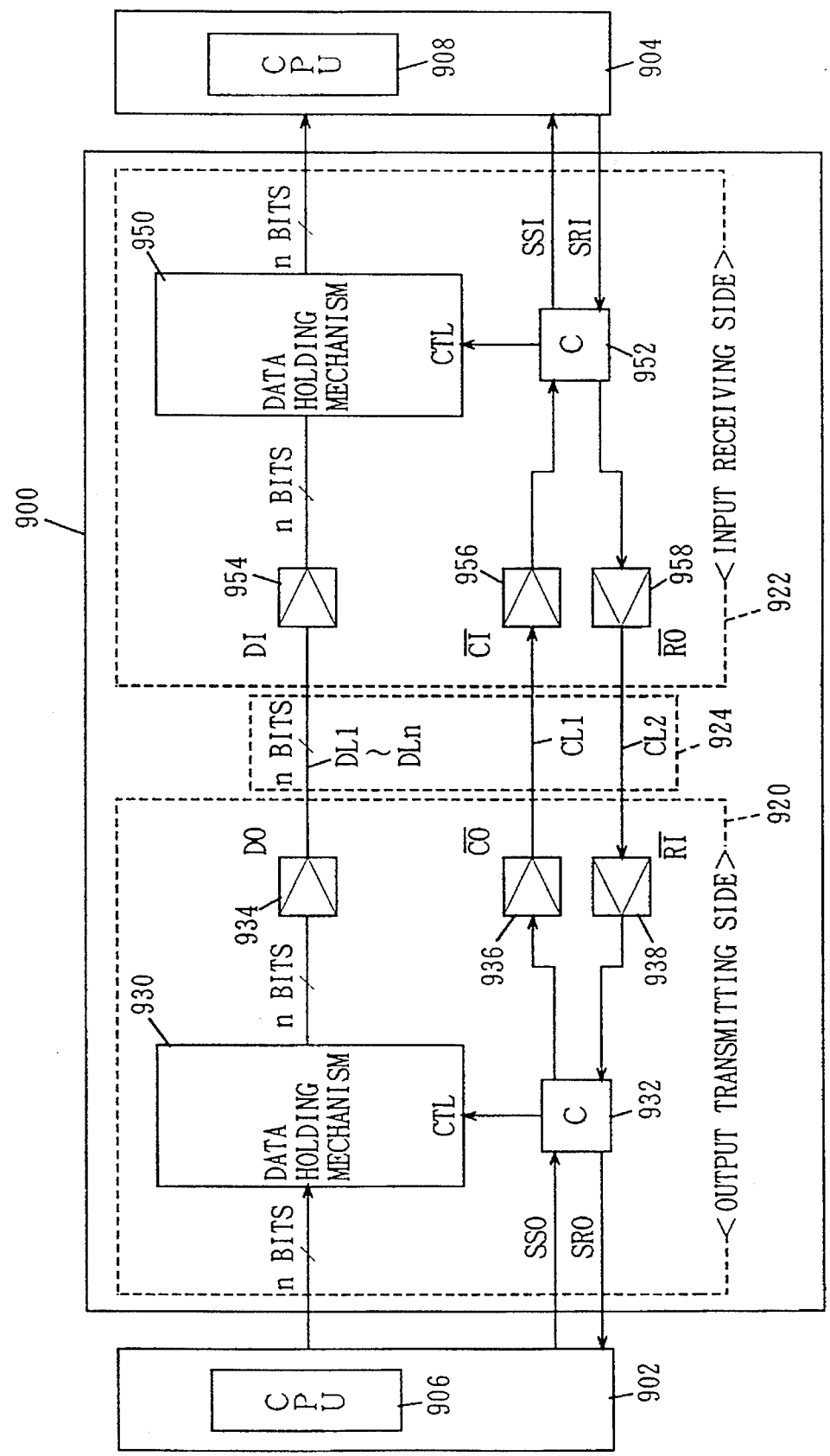
FIG. 53 is a block diagram schematically showing an example of the structure of a conventional interface apparatus.
Figure 54:
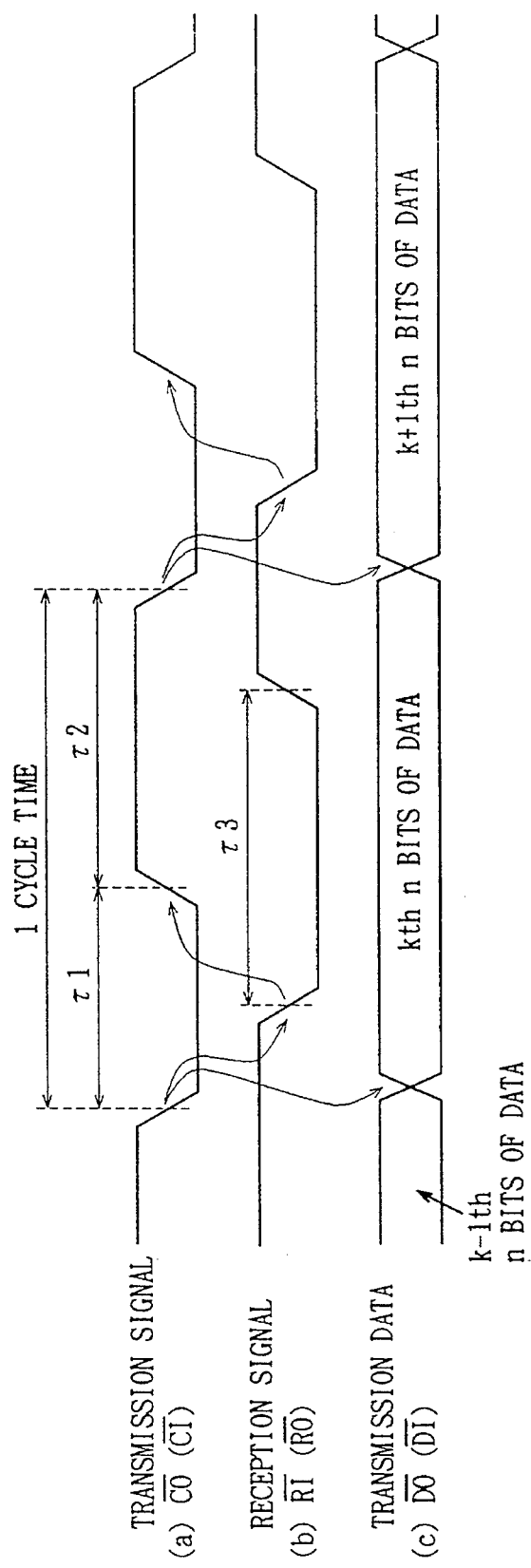
FIG. 54 is a timing chart showing data transfer timing of the interface apparatus shown in FIG. 39.

Referring to FIG. 12, receiving side data transmitter 124 includes a data latch 166 which receives n bits of data AB1 to ABn and the identifier AB0 from the transmitting file data transmitter 122; a data latch circuit 162 which receives, holds and outputs both data, (that is, 2n+2 bits) including n+1 bits of data output from data latch circuit 160 and n+1 bits of data applied from transmitting side data transmitter 122; a transfer control mechanism 952 which is the same as that shown in FIG. 53; a detecting circuit 166 for detecting whether or not the receiving side data transmitter is operating normally in accordance with an identifier including 2 bits output from data latch circuit 162 and a signal CP1 for driving data latch circuit 162 output from transfer control mechanism 952 and for outputting a detection signal MO; a reception control circuit 164 responsive to the identifier AB0 from the transmitting side data transmitter 162 and to transmission signal /CO from transmitting side data transmitter 122 for applying a transmission signal /CIN to transfer control mechanism 952; and a response control circuit 168 responsive to the reception signal /ROUT from transfer control mechanism 952 and to the detection signal MO from detecting circuit 166 for outputting a reception signal /RI to transmitting side data transmitter 122.

In FIG. 12, input buffers and output buffers for data and signals input output are provided. However, such input/output buffers are not shown in FIG. 12 for the purpose of simplicity. Such input/output buffers are not always necessary. The same applies to the following embodiments.

Figure 13:
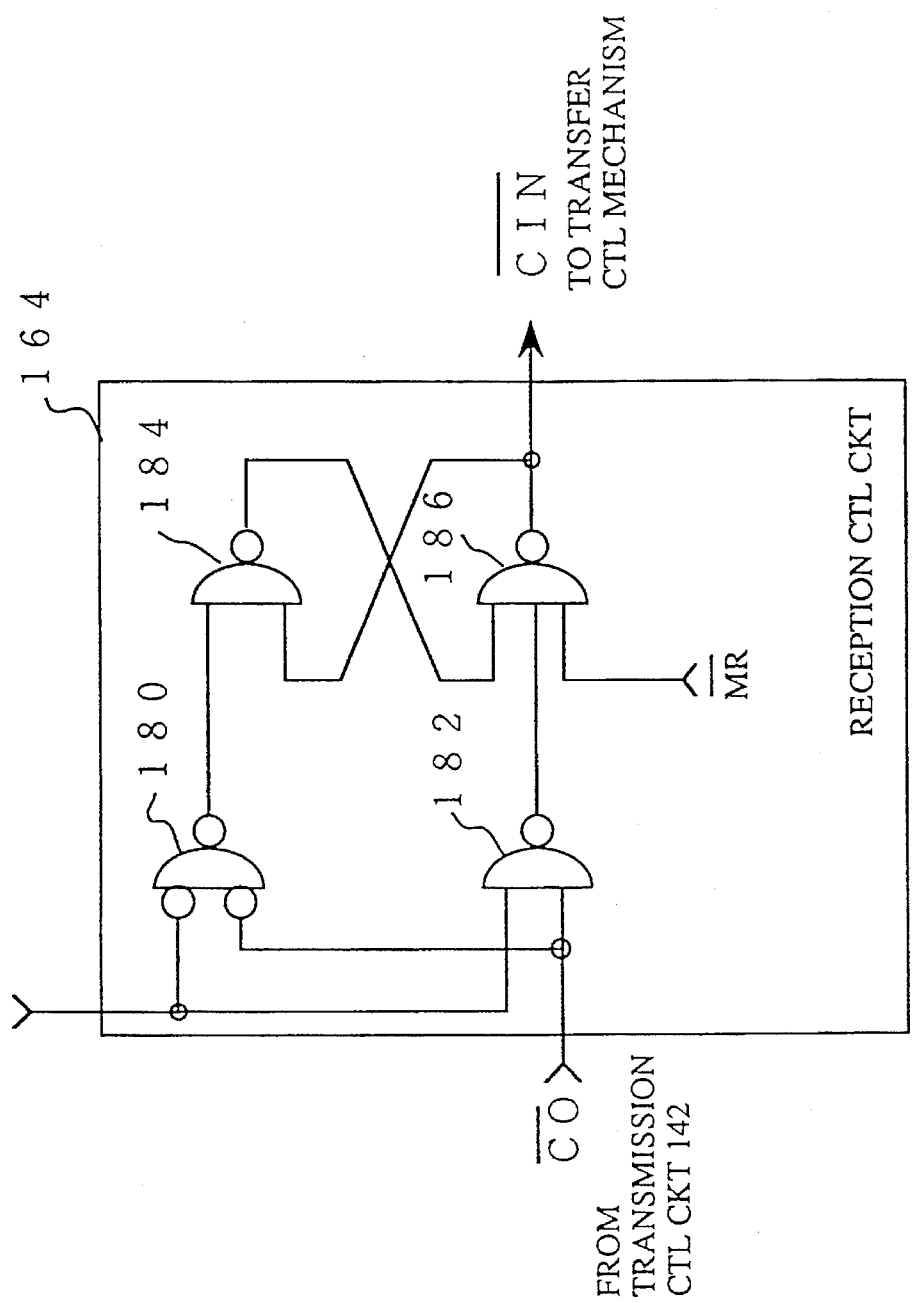
FIG. 13 is a schematic block diagram of the reception control circuit.

Referring to FIG. 13, reception control circuit 164 includes NAND gates 180, 182, 184 and 186. One input of NAND gate 180 is connected in accordance with a negative logic to a transmission signal line of the identifier AB0. The other input of NAND gate 180 is connected in accordance with the negative logic to the transmission signal line from transmission control circuit 142. NAND gate 180 has its output connected to one input of NAND gate 184.

NAND gate 182 has its one input connected to the transmission signal line of the identifier AB0. The NAND gate 182 has its the other input connected to the transmission signal line from transmission control circuit 42. NAND gate 182 has its output connected to one of the inputs of the 3-input NAND gate 186. As described above, NAND gate 186 has three inputs, one of which receives the master reset signal /MR. NAND gates 184 and 186 are cross coupled to each other to form a flipflop. The NAND gate 86 has its output connected to a signal line of the transmission control signal (/CIN) to the transfer control mechanism 952.

Figure 14:
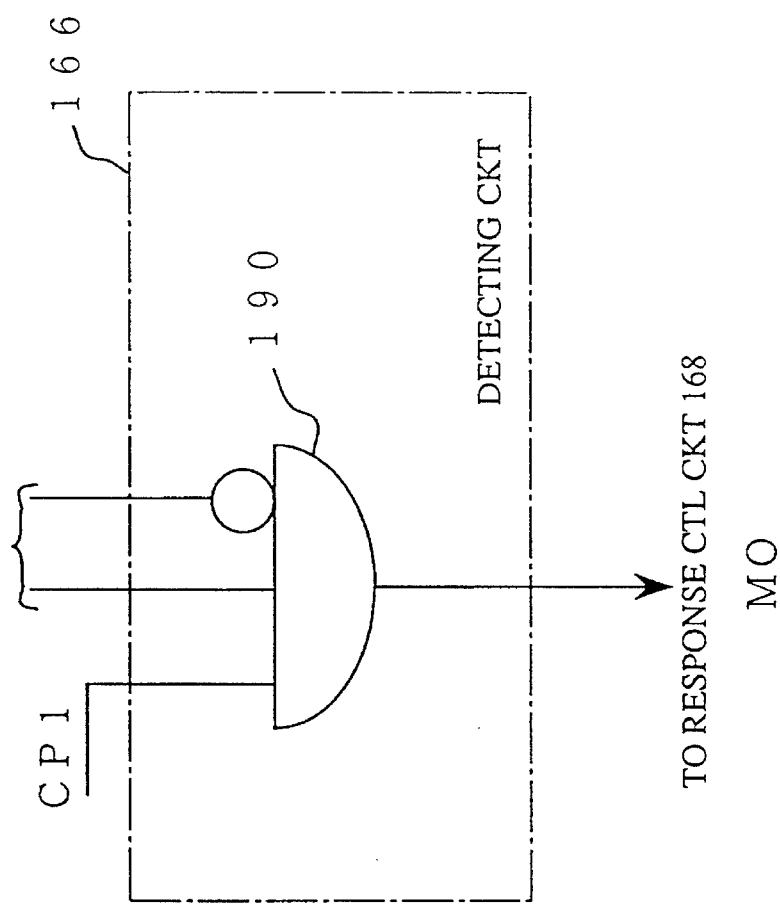
FIG. 14 is a schematic block diagram of a detecting circuit.

Referring to FIG. 14, the detecting circuit 166 includes a 3-input NAND gate 190. The NAND gate 190 has one input connected to a signal line of a latch signal CP1 from transfer control mechanism 952 to data latch circuit 162. NAND gate 190 has remaining two inputs connected to two identifier output signal lines from data latch circuit 162. One of the inputs of the identifier (for example, the one to which an identifier from data latch 160 is input) has a negative logic. NAND gate 190 has its output connected to an input of response control circuit 168 (see FIG. 12).

Figure 15:
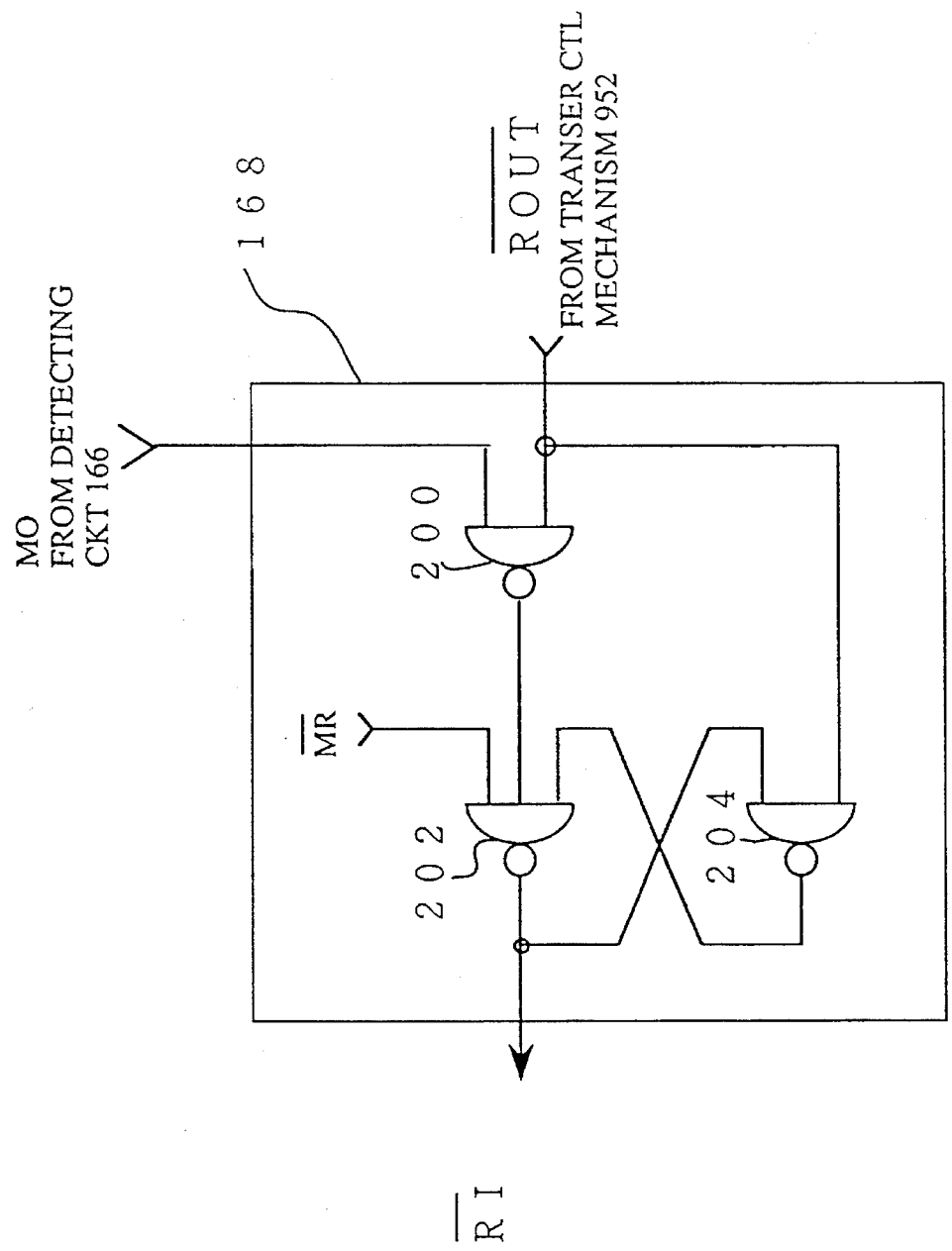
FIG. 15 is a schematic block diagram of a response control circuit.

Referring to FIG. 15, the response control circuit 168 includes two NAND gates 200 and 204 and one 3-input NAND gate 202.

NAND gate 200 has one input connected to an output of detection signal MO from detecting circuit 166. NAND gate 200 has the other input connected to the signal line of the reception signal /ROUT from transfer control mechanism 952. NAND gate 200 has its output connected to one of the 3-input NAND gate 202.

To one of the remaining inputs of NAND gate 202, master reset signal /MR is input. The NAND gate 204 has its remaining one input connected to the signal line of the reception signal /ROUT from transfer control mechanism 592. NAND gates 202 and 204 are cross coupled to form a flipflop. NAND gate 202 has its output connected to a signal line of the reception signal /R1 to transfer control mechanism 932.

Referring to FIGS. 9 to 15, the operation of the interface apparatus in accordance with the third embodiment will be described. However, at first, the operation of the transfer control circuit 142, the reception control circuit 164 and the response control circuit 168 will be briefly described with reference to FIGS. 16 and 17.

Figure 16:
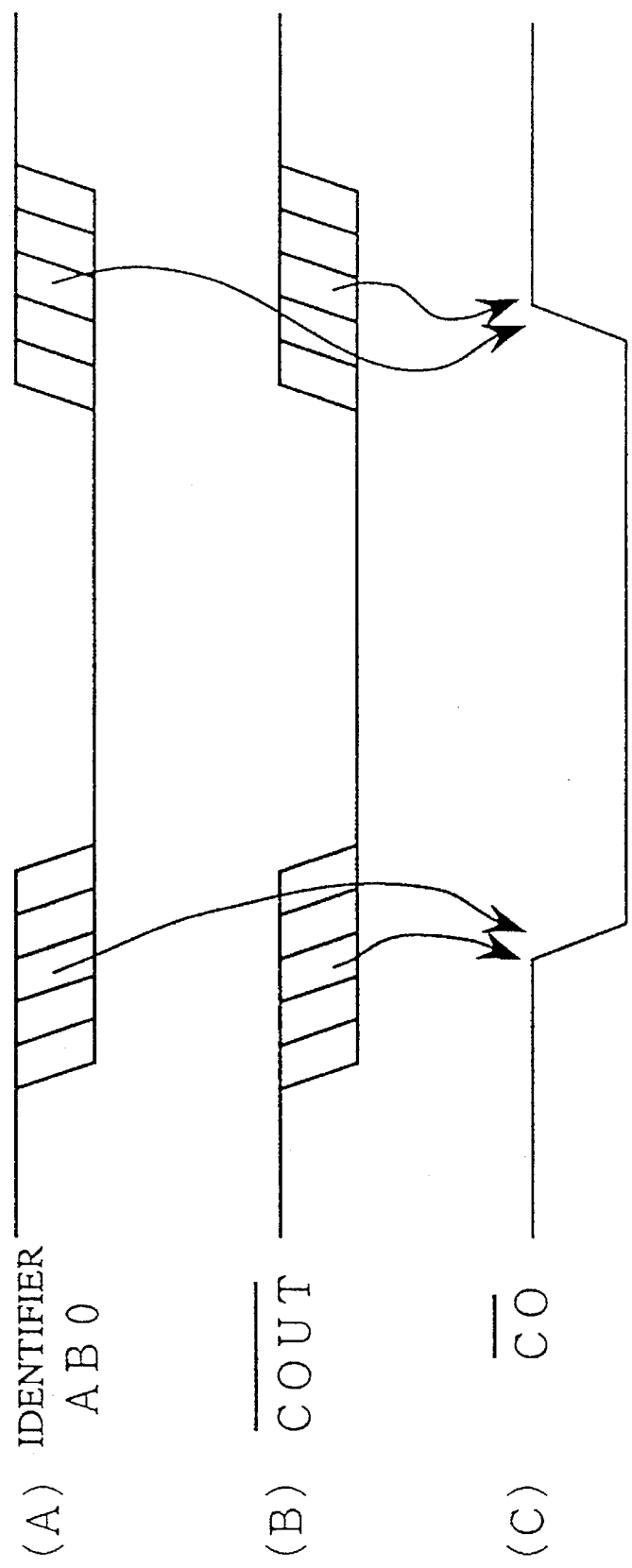
FIG. 16 is a timing chart showing the operation of the transmission control circuit and the reception control circuit.

The basic operation of the transfer control circuit 142 shown in FIG. 11 and of the reception control circuit 164 shown in FIG. 13 will be described in the following with reference to FIG. 16. The basic operation of the transfer control circuit 142 shown in FIG. 11, for example, is as follows. Assume that the identifier AB0 input from multiplexer 140 and transmission signal /COUT from transfer control mechanism 932 are both at the low level. The output from NAND gate 150 attains to the low level and the output from NAND gate 152 attains to the high level. The output from NAND gate 154 attains to the high level and the output from NAND gate 156 attains to the low level. Namely, in this case, the transmission signal /CO transmitted to the receiving side data transmitter 124 does not attain to the low level until both of identifier AB0 and transmission signal /COUT attain the low level.

Assume that either the identifier AB0 from multiplexer 140 or the transmission signal /COUT from transfer control mechanism 932 attains to H. In that case, output from NAND gates 150 and 152 both attain to the high level. In NAND gate 154, one input is at the high level and the other input is at the low level. Therefore, the output from the NAND gate 154 is kept at the high level. Two inputs of NAND gate 156 attain to the high level. The output of NAND gate 156 is kept at the low level. Therefore, the transmission signal /CO applied to the receiving side data transmitter 124 is kept at the low level even when either one of the identifier AB0 from multiplexer 140 or the transmission signal /COUT from transfer control mechanism 932 changes from low level to the high level.

Assume that both the identifier AB0 and the transmission signal /COUT from transfer control mechanism 932 attains to the high level. The outputs from NAND gates 150 and 152 attain to the high level and the low level, respectively. The inputs of NAND gate 156 changes to the high level and the low level. Therefore, the output from NAND gate 156 changes from the low level to the high level. Consequently, the inputs to NAND gate 154 are both changed to the high level. Consequently, the output from the NAND gate 154 changes to the low level, and the state of the flipflop constituted by NAND gates 154 and 156 is made stable. Accordingly, the transmission signal /CO applied from the transmission control circuit 142 to the receiving side data transmitter 134 changes from the low level to the high level.

More specifically, in the transmission control circuit 142, when both of the input identifier AB0 and the transmission signal /COUT from the transfer control mechanism 932 are at the low level, a low level signal is output, and when both attains to the high level, a high level signal is output. When the identifier AB0 and the transmission signal /COUT are both at the high level, the transmission control circuit 142 provides a high level output. Even when either the identifier AB0 or the transmission signal /COUT changes to the low level, the output of transmission control circuit 142 does not change. The output of the transmission control circuit 142 changes to the low level only when both the identifier AB0 and the transmission signal /COUT change to the low level.

On the contrary, when the identifier AB0 and the transmission signals /COUT are both at the low level, the output of transmission control circuit 142 is at the low level, and even when either the identifier AB0 and /or the transmission signal /COUT attains to the high level, the output of the transmission control circuit 142 is kept at the low level. The output of transmission control circuit 142 changes to the high level only when the identifier AB0 and the transmission signal /COUT both attain to the high level. As shown in FIG. 16(a) and (b), the timings of changes of the identifier AB0 and the transmission signal COUT from the high level to the low level and the timings of changes from the low level to the high level are not constant and the timing varies. In this case, as shown in FIG. 16(C), when the identifier AB0 and transmission signal /COUT both change from high level to the low level, the transmission signals /CO changes from the high level to the low level at a timing of change to the low level which is later. When the identifier AB0 and the transmission signal /COUT both changes from the low level to the high level, the transmission control signal /CO changes from the low level to the high level at a timing of change to the high level which is later. In other words, the transmission control circuit 142 is provided for synchronizing two inputs, that is, the identifier AB0 and the transmission signal /COUT.

As will be described later, the identifier AB0 changes from low level to the high level or from high level to the low level when n bits of data group (word) output from multiplexer 140 (see FIG. 10) changes from a data group provided from one input to a data group provided from the other input. It is possible to detect that the data output from multiplexer 140 is changed and the change of the data is definite by the level change of the identifier AB0. By the function of this transmission control circuit 142, when the establishment of data output from multiplexer 140 is delayed, the level of the transmission signal /CO changes immediately after the completion of establishment of data (that is, at the time of level change of the identifier AB0), and transmission starts. Even when the change of the level of the transmission signal /COUT is later than the establishment of data, transmission can be started without decreasing the speed of the transmission signal /CO.

The function of the reception control circuit shown in FIGS. 12 and 13 is completely the same.

The basic operation of the response control circuit 168 shown in FIG. 15 is as follows. Assume that the reception signal /ROUT and the detection signal MO input to the NAND gate 200 are both at the high level. The output of NAND gate 200 is at the low level. The output of NAND gate 202 attains to the high level. The high level signal and the high level reception signal /ROUT are applied to two inputs of NAND gate 204, respectively. Therefore, the output from NAND gate 204 is at the low level. In this state, the state of the flipflop constituted by NAND gates 202 and 204 is made stable. Accordingly, the reception signal /RI output from response control circuit 168 to transfer control mechanism 932 is at the high level.

Assume that either the detecting signal MO or the reception signal /ROUT changes to the low level. For example, assume that the reception signal /ROUT changes from the high level to the low level. The output of NAND gate 200 attains to the high level. The output of NAND gate 204 also changes to the high level. Therefore, the output from NAND gate 202 attains to the low level. The low level signal is applied to one of the input to NAND gate 204. At this state, the state of the flipflop circuit constituted by NAND gates 202 and 204 is made stable. Therefore, the reception signal /RI output from response control circuit 168 to transfer control mechanism 932 changes from the high level to the low level. Namely, response control circuit 168 lowers the reception signal /RI output to transfer control mechanism 932 at approximately the same timing as the timing of fall of the reception signal /ROUT from transfer control mechanism 962. More specifically, whether the detecting signal MO is at the high level or not, the ACK signal from transfer control mechanism 962 is transmitted to the transfer control mechanism 932 substantially at the same timing.

Assume that the reception signal /ROUT rises from the low level to the high level with the detection signal MO being at the high level. Namely, in this case, the circuit of the succeeding stage is available for data reception. The output from NAND gate 200 attains to the low level. The output of NAND gate 202 changes to the high level. Two inputs to NAND gate 204 both attain to the high level, and therefore the output thereof attains to the low level. At this time, the state of the flipflop constituted by the NAND gates 202 and 204 is made stable. The reception signal /RI applied to transfer control mechanism 932 also changes from the low level to the high level. In other words, the reception signal does not attain to high level until both of the detection signal MO and the reception signal /ROUT attain to high level.

Meanwhile, let us assume that the detection signal MO and the reception signal /ROUT are both at the low level. In this case, the reception signal /RI output from response control circuit 168 is at the low level. Here it is assumed that only the reception signal /ROUT changes to the high level. One input applied to the NAND gate 204 (reception signal /ROUT) changes from the low level to the high level. However, since the other input is at the low level, the output of NAND gate 204 is maintained at the high level. The signal applied from NAND gate 200 to NAND gate 202 is maintained at the high level. The signal applied from NAND gate 204 to NAND gate 202 is also maintained at the high level. Therefore, the output from NAND gate 202 is maintained at the low level. More specifically, as long as the detecting signal MO is at the low level, the reception signal /RI output from response control circuit 168 is maintained at the low level, even when the reception signal /ROUT rises from the low level to the high level. The reception signal /RI is not changed to the high level unless the detection signal MO attains to the high level.

Figure 17:
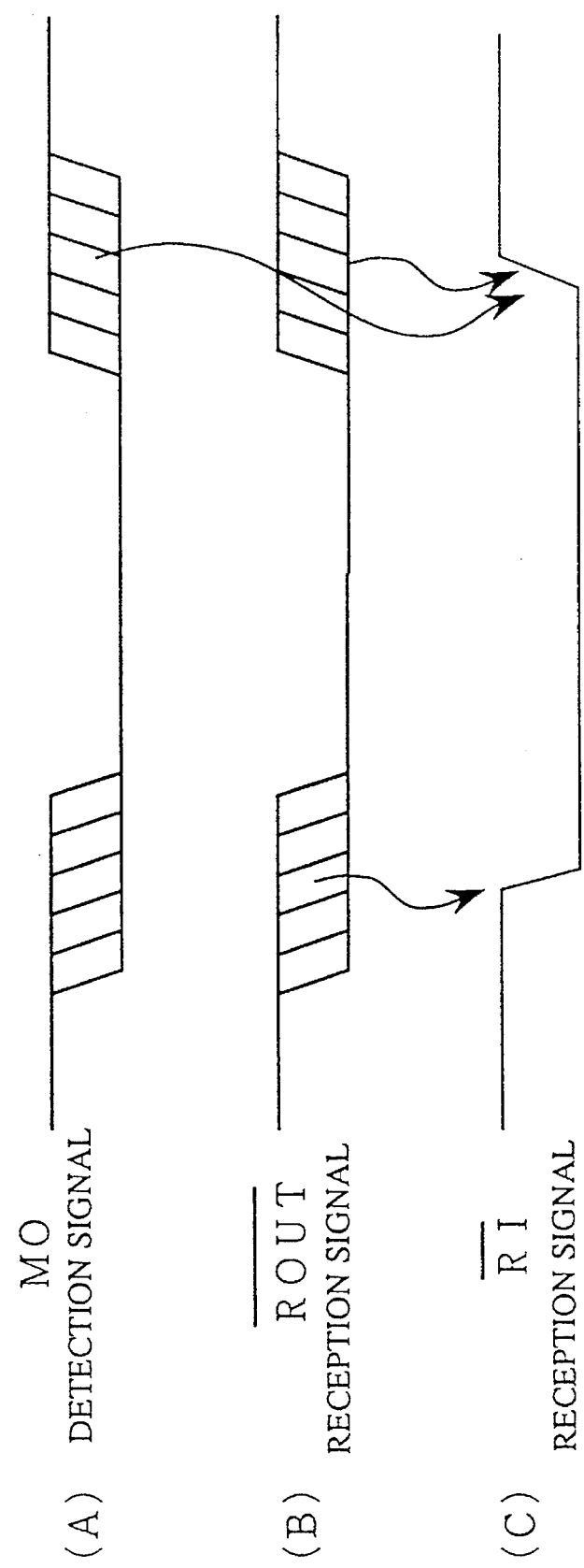
FIG. 17 is a timing chart showing the operation of the response control circuit.

This operation is shown in the timing chart of FIG. 17. Referring to FIG. 17, the timing of change of the levels of the detection signal MO and the reception signal /ROUT is not constant. In this case, the response control circuit 168 changes reception signal /RI to low level upon the low level of reception signal /ROUT, and changes reception signal /RI to high level in response to both the reception signal /ROUT and detection signal MO rising to high level. As will be described later, the detection signal MOS is at the high level as long as the interface apparatus operates normally and the value of the identifier taken in data latch circuit 162 (see FIG. 12) has a normal value and the latch signal CP1 is at the high level. In this example, the response control circuit 168 changes the level of the reception signal /RI approximately at the same time as the level of reception signal /ROUT changes. If the detection signal MO is at the low level, for example, the level of the reception signal /RI output from response control circuit 168 does not change to the high level even when the reception signal /ROUT changes from the low level to the high level. Even when the circuit of the succeeding stage becomes ready for data reception and the reception signal /ROUT changes to the high level, the reception signal /RI applied to the transfer control mechanism 932 of the preceding stage does not change to the high level, unless the reception of data at the interface apparatus is carried out normally. Accordingly, there is no possibility of erroneous start of data transmission when data transmission is not properly carried out.

In response control circuit 168, the response to the transmission signal from transfer control mechanism 932 is not effected while monitoring the detection signal MO, from the following reason. In this embodiment, the fact that the transmitted data have been surely received is surely checked by the transmission control circuit 142 (see FIGS. 10 and 11) and the reception control circuit 164 (see FIGS. 12 and 13). Therefore, a response to the reception of the transmission signal in the response control circuit is meaningless, since such response is redundant with the monitoring operation in the above described transmission control circuit 142 and the reception control circuit 164. For this reason, response to the transmission signal is not carried out by the response control circuit 168.

Figure 18:
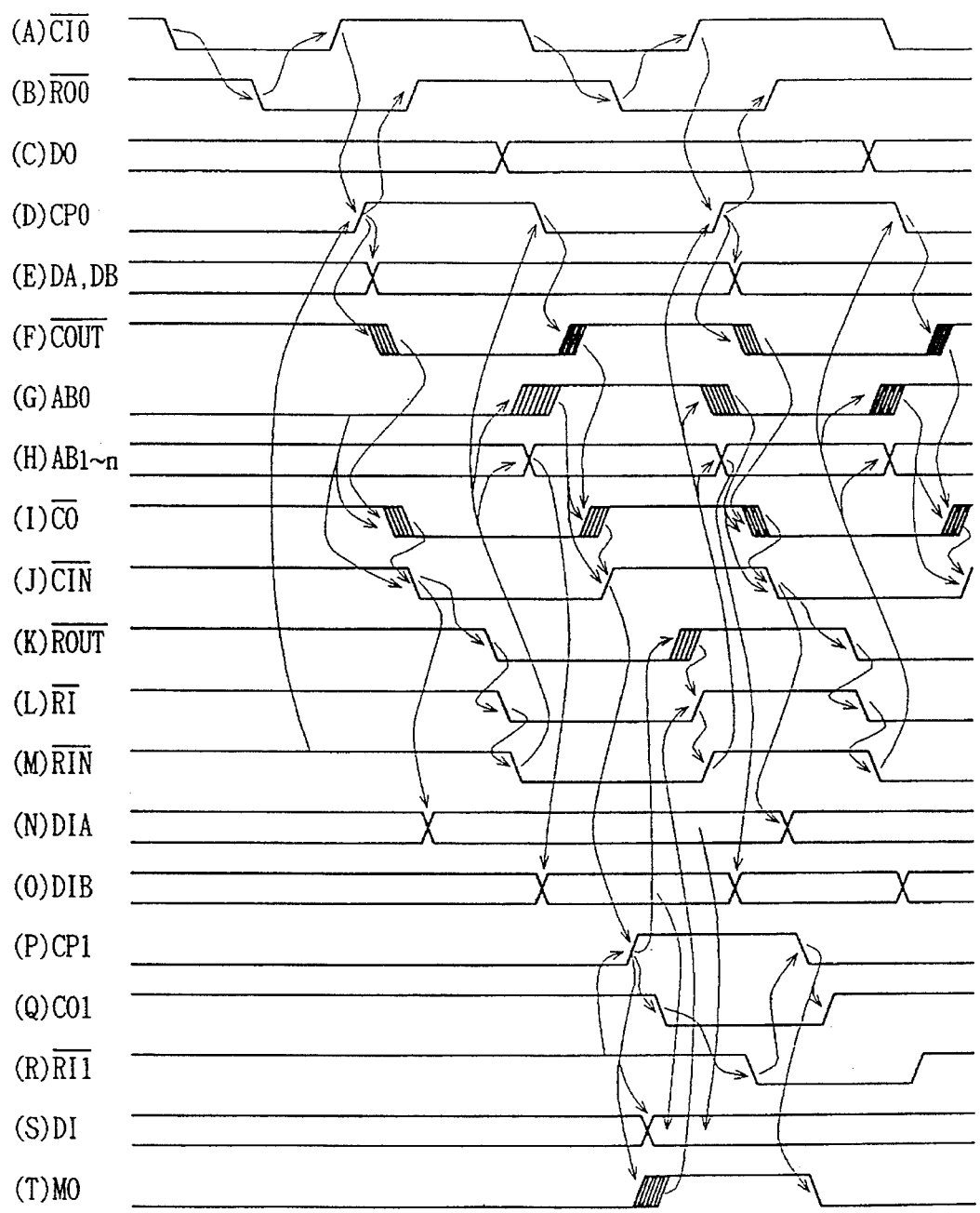
FIG. 18 is a timing chart showing the operation of the interface apparatus in accordance with the third embodiment.

FIG. 18 is a timing chart showing the operation of the interface apparatus in accordance with the third embodiment. Referring to FIGS. 9 to 15 and 18, the interface apparatus of the third embodiment operates in the following manner.

Specifically referring to FIGS. 9 and 18 (A), the transmission control signal /CI0 output from transmitting side data terminal equipment 902 has the following meaning. When the control signal /CI0 is at the high level, it means that the data is now being transmitted at present. When the control signal /CI0 is at the low level, it means that the data is now being transmitted.

Referring to FIGS. 9 and 18 (B), the reception control signal /RO0 applied from transmitting side data transmitter 122 to transmitting side data terminal equipment 902 has the following meaning. When the control signal /RO0 is at the high level, it means that the transmitting side data transmitter 122 is at a state allowing reception of data. When control signal /RO0 is at the low level, it means that the reception of the transmission signal of data from transmitting side data terminal equipment 902 has been acknowledged, and that the data is now being received. This signal is the aforementioned ACK signal. When the control signal /RO0 is at the low level, it means that the data transmission from transmitting side data terminal equipment 902 to the transmitting side data transmitter 122 is inhibited.

Referring to FIGS. 18 (A) and (B), when the reception control signal /RO0 is at the high level, the transmitting side data terminal equipment 902 changes the transmission control signal /CO0 to the low level, so as to indicate the transmitting side data transmitter 122 that the transmission is being carried out. At this time, referring to FIG. 18(C), 2n bits of data DO is applied to the transmitting side data transmitter 122.

Referring to FIG. 10, the transfer control mechanism 932 of transmitting side data transmitter 122 changes the reception control signal /RO0 to the transmitting side data terminal equipment 902 from the high level to the low level in response to the fall of the transmission control signal /CI0 to the low level, and applies the ACK signal to the transmitting side data terminal equipment 902. Prior to this, as shown in FIG. 18(C), 2n bits of data TO are applied to the input of data latch circuit 60 of transmitting side data transmitter 162 from transmitting side data terminal equipment 902.

Referring to FIG. 18(A), the transmitting side data terminal equipment 902 raises the transmissions control signal /CIO to the high level in response to the fall of the reception control signal /RO0 to the low level.

Referring to FIGS. 10 and 18(D), when the reception signal /RI from the receiving side data transmitter 124 is at the high level as shown in FIG. 18(M), transfer control mechanism 932 raises the latch signal CP0 applied to the clock terminal of data latch circuit 60 from the low level to the high level in response to the rise of the transmission control signal /CI0 to the high level. In response to the rise of latch signal CP0, data latch circuit 62 latches 2n bits of data DO as shown in FIG. 18(E), divides the data into data DA and DB each including n bits, and applies the data to two inputs of multiplexer 140.

Meanwhile, transfer control mechanism 932 again raises the reception control signal /RO0 approximately at the same time as the rise of the latch signal CP0, actually at a point delayed by the circuit delay. Consequently, the transmitting side data terminal equipment 902 recognizes that the transmitting side data transmitter 122 is now ready for the reception of the next data. Namely, as n bits of data DO are latched in data latch circuit 62 and applied to multiplexer 140 and data processing by interface apparatus 120 has been started, it is now possible to receive the next data at the input of the data latch circuit 60.

Further, data transfer mechanism 932 lowers the transmission signal /COUT applied to transmission control circuit 142 at a point delayed by the circuit delay from the rise of latch signal CP0 from the high level to the low level as shown in FIG. 18(F).

At this time, the reception signal /RI input from receiving side data transmitter 124 to transmitting side data transmitter 122 is at the high level as shown in FIG. 18(L). When the reception signal /RI is at the low level, multiplexer 140 outputs n bits of data DA input from data latch 60 to input A and the ground potential (logic "0") input to input terminal A0 as transmission data AB1 to ABn and the identifier AB0, respectively. These are shown in FIGS. 18 (H) and (G). The transmission outputs AB1 to ABn and the identifier AB0 are applied to the receiving side data transmitter 124 through n+1 bits of transmission path of the data transmission path 126 shown in FIG. 9. The identifier AB0 is also applied to the transmission control circuit 142.

Referring to FIG. 11, when the input identifier Ab0 is at the low level, transmission control circuit 142 lowers the transmission signal /CO output therefrom from the high level to the low level in response to the fall of the transmission signal /COUT applied from transfer control mechanism 932 (FIG. 10) from the high level to the low level, as shown in FIG. 18(F). This is shown in FIG.18(I). The transmission signal /CO is applied to reception control circuit 164 as shown in FIG. 12.

Referring to FIG. 12, the identifier AB0 applied to receiving side data transmitter 124 is applied to data latch circuits 160 and 162 as well as the reception control circuit 164.

Referring to FIGS. 13 and FIG. 18(J), when the input identifier AB0 is at the low level, the reception control circuit 164 lowers the transmission signal /CIN output therefrom from the high level to the low level, in response to the fall of the transmission signal /CO applied from transmission control circuit 142 from the high level to the low level as shown in FIG. 18(I). The transmission signal /CIN is applied to the transfer control mechanism 952 (see FIG. 12) and to the clock input terminal of negative logic of data latch circuit 160.

Referring to FIGS. 12 and 18 (N), data latch circuit 160 latches the input n bits of data in response to the fall of the transmission signal /CIN from the high level to the low level, and applies the same as data DIA to the data latch circuit 162. At this time, data latch circuit 160 also latches the identifier AB0 (low level) and applies this to data latch circuit 162.

Transfer control mechanism 952 lowers the reception signal /ROUT from the high level to the low level as shown in FIG. 18(K) after the circuit delay, in response to the fall of the transmission signal /CIN applied from the reception control circuit 164 from the high level to the low level as shown in FIG. 18(J). The reception signal ROUT is applied to response control circuit 168 shown in FIG. 12.

Meanwhile, the detecting circuit 166 shown in FIGS. 12 and 14 applies a low level detection signal MO to the response control circuit 168 except for the period in which the latch signal CP1 applied from transfer control mechanism 952 to data latch circuit 162 is at the high level. As shown in FIGS. 18 (P) and (T), at the time of the fall of reception signal /CIN, the latch signal CP1 is at the low level, and hence the detection signal MO is also at the low level. Therefore, the response control circuit shown in FIGS. 12 and 15 lowers the reception signal /RI output therefrom from the high level to the low level, in response to the fall of the reception signal ROUT from the high level to the low level as shown in FIG. 18(K), as described above. This is shown in FIG. 18(L).

Referring to FIG. 10, the reception signal /RI from receiving side data transmitter 124 is directly input to the transfer control mechanism 932 of the transmitting side data transmitter 122 (see FIG. 18(M)).

The transfer control mechanism 932 at first lowers the latch signal CP0 applied to data latch circuit 60 from the high level to the low level as shown in FIG. 18 in response to the fall of the input reception signal /RIN (FIG. 18(M)) from the high level to the low level.

Meanwhile, multiplexer 140 selects lower n bits of data DB latched in data latch 60 and outputs the same as transmission data AB1 to ABn (FIG. 18(H)) in place of the n bits of data DA which have been output so far, in response to the fall of the reception signal /RIN input to the control terminal A/(/B) thereof from the high level to the low level. At this time, multiplexer 140 selects and outputs the input to input terminal B0 as the identifier AB0, instead of the input to input terminal A0. Since the power supply Vcc is connected to the input terminal B0, the newly selected identifier AB0 has the logic "1", that is, it is at the high level (FIG. 18(J)). Referring to FIG. 12, n bits of data AB1 to Abn applied to the receiving side data transmitter 124 are the lower n bits of data BD among the 2n bits of data latched in data latch circuit 60. The data are also input to the input of data latch circuit 160 as well as to the lower n bits of the input of 2n bits of data latch circuit 162, as data DIB. Since the latch signal applied to data latch circuit 160 does not change from the low level to the high level in this period, the data DIB is not latched by the data latch circuit 160. The change of the data DIB applied to lower n bits of data latch circuit 162 is shown in FIG. 18(O).

Again referring to FIG. 10, transfer control mechanism 932 lowers the latch signal CP0 to low level, and thereafter raises the transmission signal /COUT applied to transmission control circuit 142 from low level to the high level as shown in FIG. 18(F). As already described with reference to the first embodiment, the transmission signal /COUT is an inversion of the latch signal CP0, and therefore it is delayed by the circuit delay from the level change of the latch signal CP0.

Referring to FIG. 11, in response to the change of the identifier AB0 and the transmission signal /COUT from the low level to the high level one after another as shown in FIGS. 18 (G) and (F), the transmission control circuit 142 raises the transmission signal /CO applied to the receiving side data transmitter 124 from the low level to the high level at a timing of change to the high level of this signal which is later (i.e. both signals being high level).

Referring to FIG. 13, the reception control circuit 164 raises the transmission signal /CIN to be applied to transfer control mechanism 952 from the low level to the high level (FIG. 18(J)), in response to the rise of the identifier AB0 to the high level shown in FIG. 18(G) and the to the rise of the transmission signal /CO applied from transmission control circuit 142 to the high level.

Referring to FIG. 12, when the control signal /RI1 input from receiving side data terminal equipment 904 is at the high level, (FIG. 18(R)), the transfer control mechanism 952 raises the latch signal CP1 from the low level to the high level in response to the rise of the transmission signal /CIN to the high level (FIG. 18(P)).

In response to the rise of the latch signal CP1 to the high level, data latch circuit 162 (see FIG. 12) latches n bits of data DIA applied from data latch circuit 160 and n bits of data DIB applied from transmitting side data transmitter 122 and collectively outputs the data as 2n bits of data DI to receiving side data terminal equipment 904 as shown in FIG. 18(S). At this time, data latch circuit 162 latches the identifier AB0 which has been transmitted previously and latched in data latch circuit 160 as well as the identifier AB0 which is being transmitted at present, and apply the same to detecting circuit 166.

Referring to FIG. 14, among three inputs to the 3-input NAND gate 190 of the detecting circuit 166, the input terminal connected to transfer control mechanism 952 receives a high level latch signal CP1. Of the two remaining inputs, the input terminal of the negative logic receives low level data which has been latched by data latch circuit 160 and further latched by data latch circuit 162. The remaining input of the 3-input AND gate 190 receives the high level identifier transmitted this time. Accordingly, a high level detection signal MO is applied to response control circuit 168 (see FIG. 18(T)).

The detection signal MO attains to the high level when the latch signal CP1 attains to the high level only when the data of the two identifiers applied from data latch circuit 162 have the correct combination of "0, 1". If data transmission is not properly carried out and the data latched in data latch circuit 162 is not correct, the two identifiers do not have the combination of the values mentioned above, and therefore the detection signal MO output from detecting circuit 166 remains at the low level. If the detection signal MO is kept at the low level, the reception signal /RI output from response control circuit 168 never rises from the low level to the high level as mentioned above, and therefore there is no possibility of improper transmission of the next data.

Meanwhile, as shown in FIG. 18(T), when the detection signal MO rises to the high level along with the rise of the latch signal CP1 to the high level, the receiving side data transmitter 124 operates in the following manner. First, the transfer control mechanism 952 of FIG. 12 raises latch signal CP1 to the high level as shown in FIG. 18(K), and then raises the reception signal /ROUT from the low level to the high level after a delay of the circuit.

When the detection signal MO is at the high level as described above and the reception signal /ROUT rises from the low level to the high level, the control circuit 168 shown in FIG. 15 raises, in response, the reception signal /RI to be applied to transfer control mechanism 932 from the low level to the high level as shown in FIG. 18(L). The reception signal /RI is directly input to the transfer control mechanism 932 shown in FIG. 10 and to the clock terminal of multiplexer 140 as the reception signal /RIN, and rises to the high level after a delay required for transmission from the reception signal /RI (FIG. 18(M)).

During such operation, as shown in FIG. 18(C), after the reception signal /RO0 attains to the high level, the transmitting side data terminal equipment 902 applies the next 2n bits of data D0 to the input of the transmitting side data transmitter 122, and lowers again the transmission control signal /CI0 to the low level. In response to the fall of the transmission control signal /CI0 to the low level, transfer control mechanism 932 (FIG. 10) of the transmitting side data transmitter 122 switches the reception control signal /RO0 from the high level to the low level, and applies the ACK signal to the transmitting side data terminal equipment 902.

Referring to FIG. 18(D), when the reception signal RIN from receiving side data transmitter 124 is at the high level and the transmission signal /CI0 rises to the high level as mentioned above, the data transfer mechanism 932 shown in FIG. 10 rises to the high level in response. In response to the rise of latch signal CP0, data latch circuit 60 (FIG. 10) latches the newly input 2n bits of data D0, divides the data into two data groups DA and DB each including n bits and apply the data to two inputs of multiplexer 140 (see FIG. 18(E)).

Similarly, multiplexer 140 selects the identifier of the logic "0" applied to input terminal A0 as well as n bits of data DA applied from data latch circuit 60 at input A, in response to the rise of the reception signals /RIN input to control terminal A/(/B) to the high level (FIG. 18(M)), and apply the same to the receiving side data transmitter 124 as the identifier AB0 and the transmission data AB1 to ABn (FIGS. 18(G) and (H)).

Transfer control mechanism 932 raises latch signal CP0 to the high level, and after a prescribed delay of the circuit, raises the reception signal /RO0 to the high level, and lowers the transmission signal /COUT to the low level (FIGS. 18(B) and (F)).

In response to the change of the identifier AB0 to the low level and to the fall of the transmission signal /COUT to the low level, transmission control circuit 142 (FIG. 10) again lowers the reception signal /CO to the receiving side data transmitter 124 to the low level, as described above. Thereafter, the similar processes as effected on the previous 2n bits of data is repeated.

The transfer control mechanism 952 of receiving side data transmitter 124 raises the latch signal CP1 applied to data latch circuit 162 to the high level, and then, after the delay of the circuit, lowers the transmission control signal /CO1 to the receiving side data terminal equipment 904 from the high level to the low level as shown in FIG. 18(O).

Then, in response to the fall of this transmission control signal /CO1, reception control signal /RI1 from receiving side data terminal equipment 904 falls from the high level to the low level as shown in FIG. 18(R). In response to the fall of the reception control signal /RI1 to the low level, transfer control mechanism 952 lowers the latch signal CP1 to the low level again, as shown in FIG. 18(P). Thereafter, transfer control mechanism 952 raises the transmission control signal /CO1 as shown in FIG. 18(O) after a delay of the circuit from the fall of CP1 to the low level. In response to the rise of the transmission control signal /CO1 to the high level, the receiving side data terminal equipment 904 raises the reception control signal /RI1 to the high level again as shown in FIG. 18(R).

Now, the detecting circuit 166 is formed of an AND gate 190 (see FIG. 14) as described above. Therefore, in response to the fall of the latch signal CP1 from the high level to the low level as shown in FIG. 18(P), the detection signal MO again falls to the low level as shown in FIG. 18(T). The above described operation is similarly repeated for each of the subsequent data, and thus 2n bits of data transmission from transmitting side data terminal equipment 902 to the receiving side data terminal equipment 904 is carried out.

In this embodiment, handshaking transfer system is used as in the first embodiment, and 2n bits of data can be transmitted by using data transmission path of n+1 bits. Therefore, when the data transmission path having the same bit width is used, the amount of data transmitted in unit time by the data transmitting apparatus of the present invention can be increased to nearly twice that of the conventional interface. If the amount of transmission in a unit time is constant, the necessary data transmission path can be made about one half.

When 2n bits of data are divided into two groups of data each including n bits and sequentially transmitted (n bits at one time) in one cycle, the groups of data are provided with an identifier for transmission from the transmitting side data transmitter to the receiving side data transmitter. The identifier changes alternately, that is, it changes to the low level when the first n bits of data are transmitted and changes to the high level when the latter n bits are transmitted. Transmission control circuit 142 of transmitting side data transmitter 122 and reception control circuit 164 of receiving side data transmitter 124 detect whether or not the identifier has changed from the high level to the low level or from the low level to the high level, and provided that the identifier has switched to the collect value, the timings of storing data in the data latch circuit 162 and data latch circuit 160 (see FIG. 12) of the receiving side data transmitter 124 are determined. Therefore, data which are transmitted divisionally can be correctly transmitted and stored correctly at the correct timing in the data latch circuits. It is a matter of course that such confirmation is not necessary in both the transmitting and receiving sides. Such confirmation may be carried out in either one of the transmitting and receiving sides. In that case, the signal line for transmitting the identifier naturally differs from that described above.

Referring to FIG. 12, in this embodiment, a detecting circuit 166 is used for detecting whether or not a correct identifier is stored in data latch circuit 162, and in response to the result of detection, transmission of reception signal /RI from response control circuit 168 to the transmitting side data transmitter 162 is controlled. Namely, when the correct identifier is not detected by the detecting circuit 166, the transmission permitting signal is not returned from response control circuit 168 to the transmitting side data transmitter 122. For this reason, there is no possibility of the start of next data transmission when the data transmission was not successful, whereby the data can be surely transmitted correctly. In practice, when it is detected by the detecting circuit 16 that the data transmission is not proper, there may be a request for re-transmission of the same data or some error correcting operation.

[Fourth Embodiment]

Figure 19:
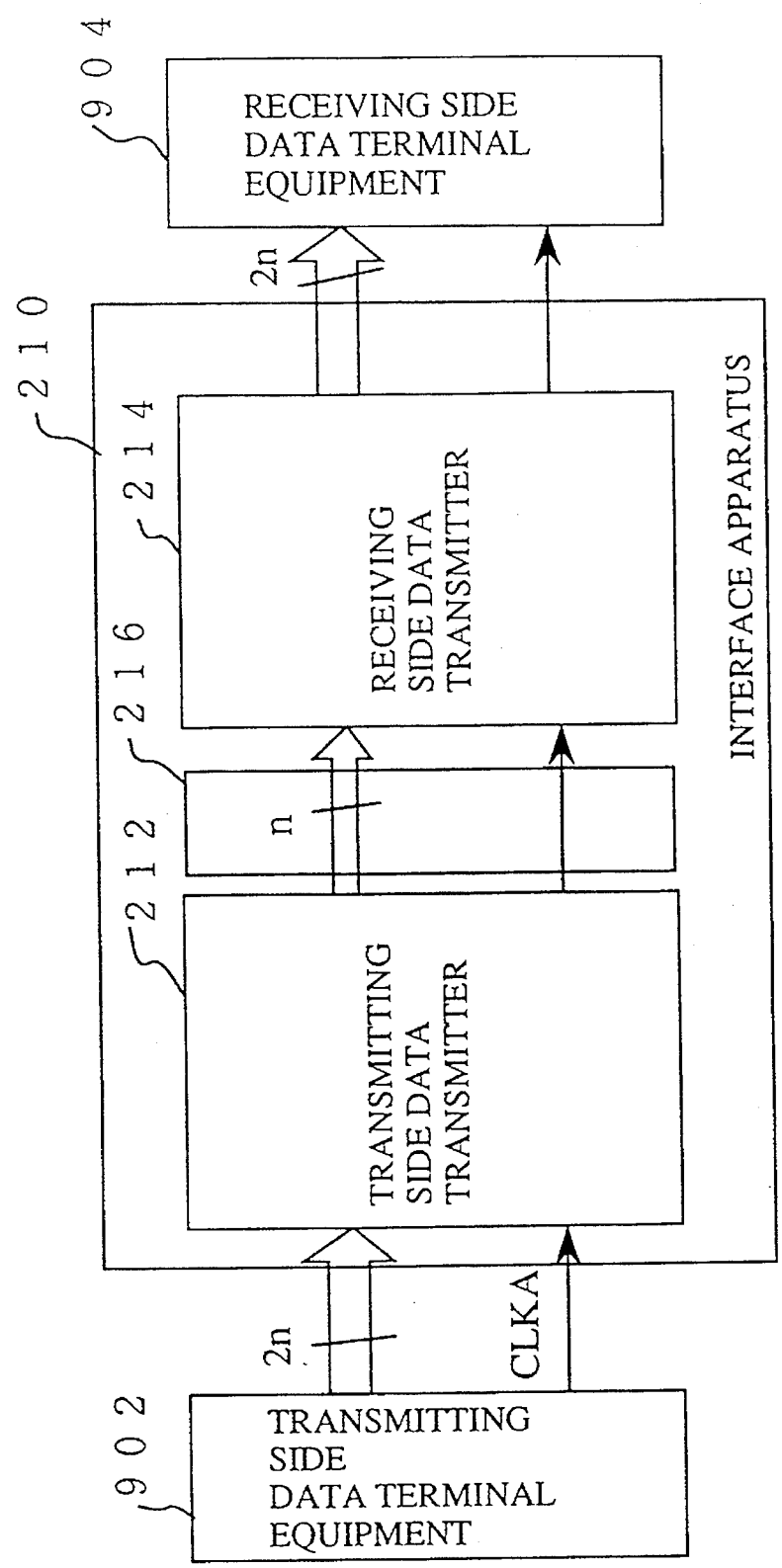
FIG. 19 is a schematic block diagram of the interface apparatus in accordance with a fourth embodiment.
Figure 20:
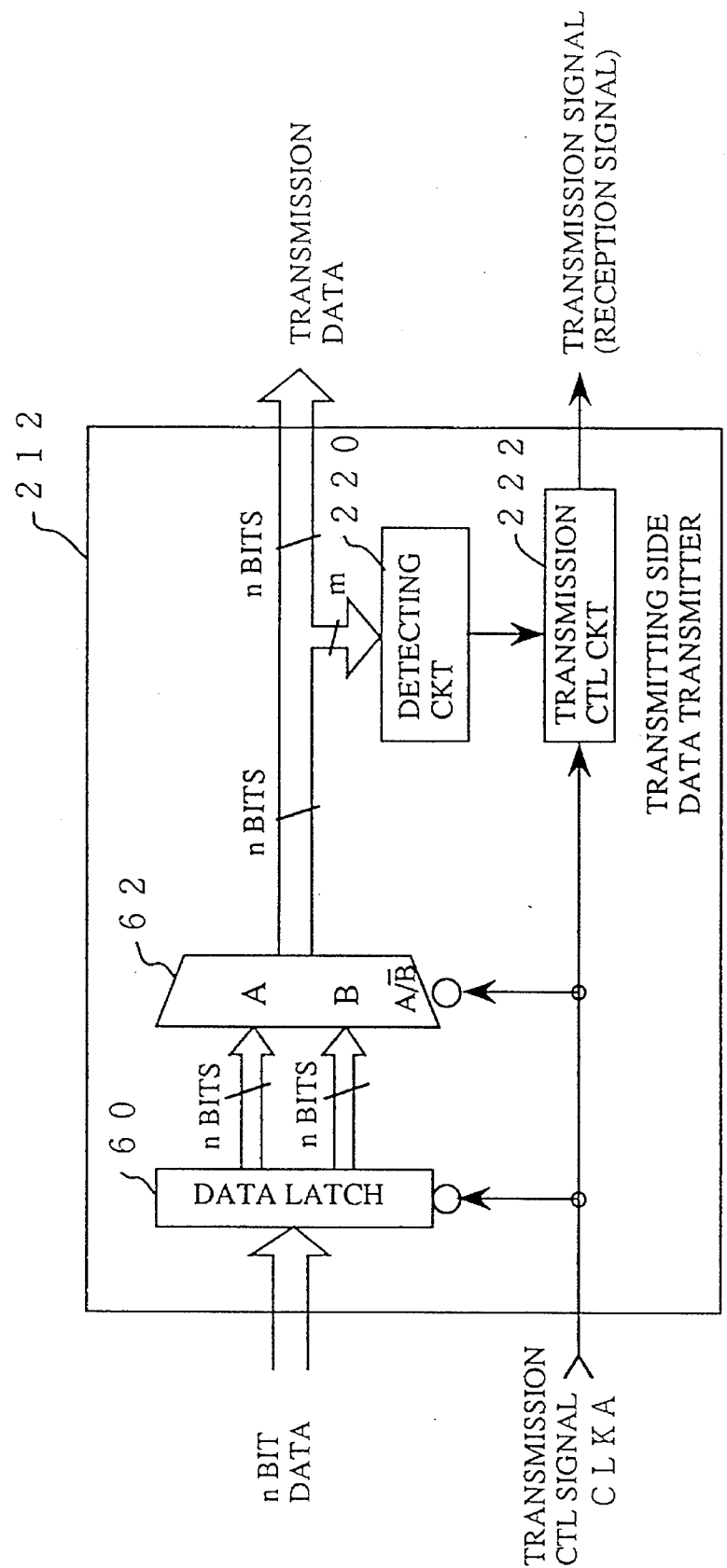
FIG. 20 is a block diagram of the transmitting side data transmitter.
Figure 21:
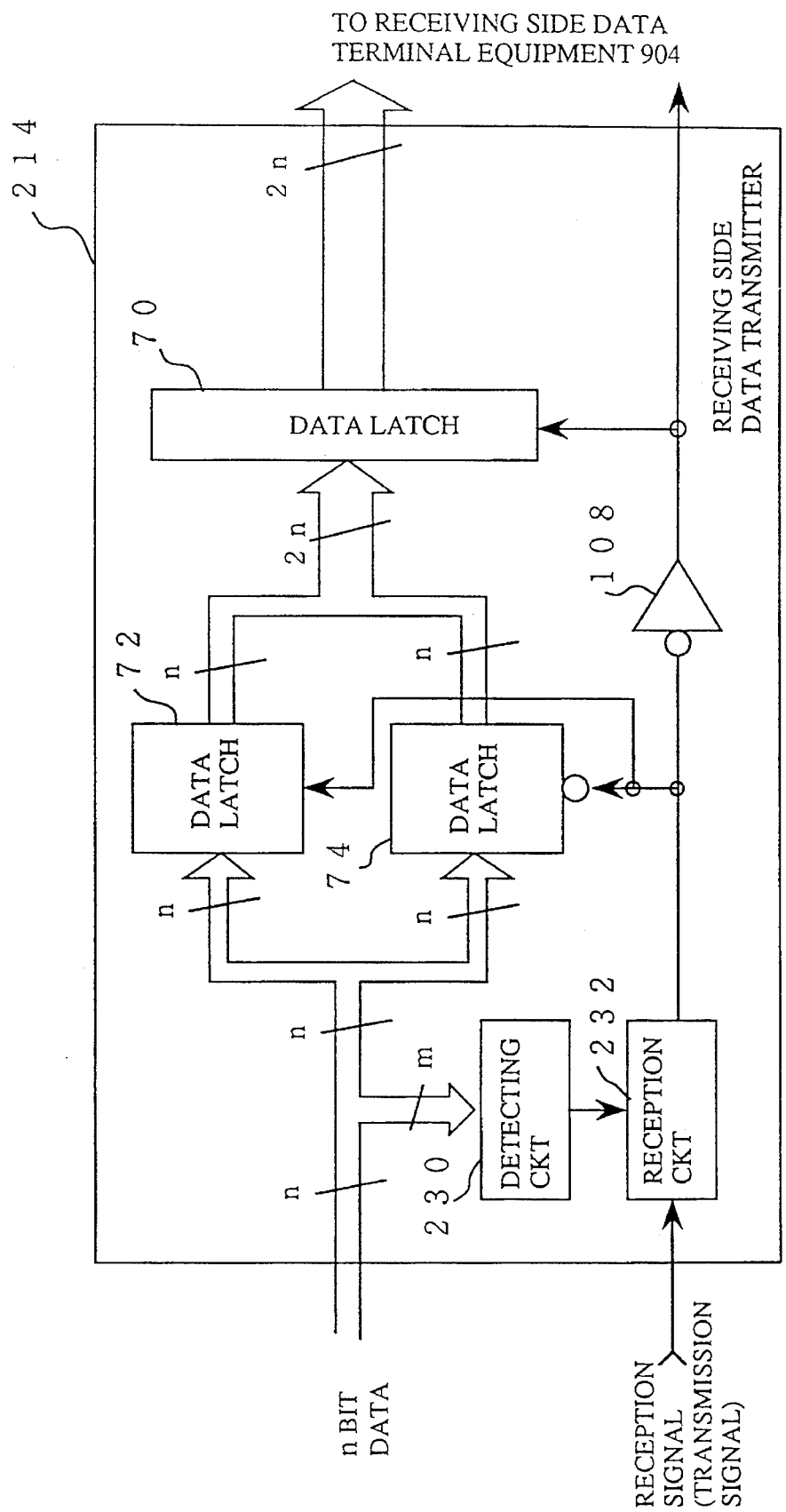
FIG. 21 is a block diagram of the receiving side data transmitter.

FIGS. 19 to 21 show an interface apparatus in accordance with a fourth embodiment of the present invention. The interface apparatus in accordance with the fourth embodiment transmits 2n bits of data by using a data transmission path of n bits, as in the third embodiment. However, different from the third embodiment, it employs not the handshaking system but the synchronous transfer system.

Referring to FIG. 19, the interface apparatus 210 in accordance with the fourth embodiment is provided for data transmission between transmitting side data terminal equipment 902 and a receiving side data terminal equipment 904. 2n bits of data and transmission control signal CLKA are applied from transmitting side data terminal equipment 902 to the interface apparatus 210. 2n bits of data and transfer control signal are also applied from interface apparatus 210 to receiving side data terminal equipment 904.

Interface apparatus 210 includes a transmitting side data transmitter 212 receiving the 2n bits of data and transmission control signal CLKA from transmitting side data terminal equipment 902 for time sequentially outputting the 2n bits of data by dividing the same to two data groups each including n bits in one cycle of data transmission of 2n bits; a receiving side data transmitter 214 receiving two data groups each including n bits applied time-sequentially from the transmitting side data transmitter for reconstructing 2n bits of data to apply the same to receiving side data terminal equipment 904; and a data transmission path 216. Different from the third embodiment, data transmission path 216 includes a data signal line having the width of n bits and one transmission control signal line. It is assumed that among the data transmitted between two data terminal equipments 902 and 904 in the fourth embodiment, data which can be used as the "identifier" described in the third embodiment is included. By using a part of the data as the identifier, the reliability of data transmission from the transmitting side data transmitter 212 to the receiving side data transmitter 214 is enhanced.

Referring to FIG. 20, transmitting side data transmitter 212 includes a data latch circuit 60 of 2n bits of data; a multiplexer 62 having two input terminals each for n bits for selecting and outputting either one data group of n bits; a detecting circuit 220 receiving m bits (in this embodiment, 1 bit) used as the identifier out of the transmitted data of n bits output from multiplexer 62 for detecting whether or not data output from multiplexer 62 has been correctly established; and transmission control circuit 222 responsive to the detection by the detecting circuit 220 that the data output from multiplexer 62 has been correctly established and to the input of transfer control signal CLKA for transmitting the transmission control signal to the receiving side data transmitter 214. The transmission control signal CLKA applied from transmitting side data terminal equipment 902 to transmitting side data transmitter 212 is applied to the clock terminal of data latch circuit 60, the control terminal A/ (/B) of multiplexer 62 and to the transmission control circuit 222. Data latch circuit 60 divides the 2n bits of data which have been latched therein into two groups of data each including n bits for output. These two outputs of data latch circuit 60 are connected respectively to two inputs A and B of multiplexer 60.

Referring to FIG. 21, receiving side data transmitter 214 includes two data latch circuits 72 and 74 each having the width of n bits; a data latch circuit 70 having the width of 2n bits; a detecting circuit 230 receiving m bits (in this embodiment, 1 bit) used as the identifier out of the n bits of data applied from transmitting side data transmitter 212 for detecting whether or not the input data has been correctly established; a reception control circuit 232 responsive to the output from detecting circuit 230 and to a reception control signal applied from transmitting side data transmitter 212 (signal output as the transmission control signal from transmission control circuit 222) for outputting a transmission control signal; and a transfer control signal buffer 108 having its input connected to an output of reception control circuit 232 for inverting and outputting the applied transfer control signal after a prescribed delay to apply the same to the receiving side data terminal equipment. The reception control circuit 232 has its output connected to the clock terminal of data latch circuit 74. The reception control circuit 232 has its output also connected to the clock terminal of negative logic of the data latch circuit 72. The transfer control signal buffer 108 has its output connected to the clock terminal of data latch circuit 70.

The inputs of data latch circuits 72 and 74 are connected respectively to data transmission paths each having the width of n bits, to which n bits of data are applied from transmitting side data transmitter 212. The outputs each having n bits of the data latch circuits 72 and 74 are collected to have the width of 2n bits and connected to the input of data latch circuit 70. The 2n bits output of data latch circuit 702 is connected to the receiving side data terminal equipment.

The operation of the fourth embodiment is approximately the same as that of the interface apparatus described in the second embodiment, and therefore the details thereof is not repeated here. The feature of the fourth embodiment is that, similar to the third embodiment, the transfer control signal (reception control signal) is applied to the receiving side data transmitter only when the n bits of data output from multiplexer 62 are established correctly, by the detecting circuit 220 and the transmission control circuit 220 provided in the transmitting side data transmitter 212. Similarly, referring to FIG. 21, in the receiving side data transmitter 214, whether or not the n bits of data transmitted from transmitting side data transmitter 212 has been correctly established is detected by the detecting circuit 230 and the reception control circuit 232, and only when it is detected that the data are correctly established, the transfer control signal (reception control signal) is transmitted to the receiving side data terminal equipment. In this manner, since the detecting circuit 220 and the transmission control circuit 222 are provided in the transmitting side data transmitter and the detecting circuit 230 and the reception control circuit 232 are provided in the receiving side data transmitter 214, it can be surely known that the transmitted data are the correct data, as in the third embodiment. Consequently, the reliability of data transmission can be improved as compared with the prior art and the interface apparatus of the second embodiment.

In FIGS. 20 and 21, the detecting circuits 220 and 230 and detailed structures thereof are not described.

However, as described above, what is necessary is only to determine 1 bit of data as the identifier. Therefore, such detecting circuits 220 and 230 may be easily formed by using a decoder, a coincidence detecting circuit or a toggle flipflop, for example.

The transmission control circuit 222 and the reception control circuit 232 are not described in detail, either. However, this can be easily formed by the similar structure as the transmission control circuit 142 (see FIG. 11), reception control circuit (see FIG. 13) or the response control circuit 168 shown in the third embodiment.

Referring to FIGS. 19 to 21, the interface apparatus 210 of the fourth embodiment operates in the following manner. Referring to FIG. 19, the transmitting side data terminal equipment 902 successively applies 2n bits of data to be transmitted to the transmitting side data transmitter 212, and at the same time applies a transmission control signal CLKA having a prescribed frequency to the transmitting side data transmitter 212. Referring to FIG. 20, data latch circuit 60 latches the input 2n bits of data at a timing of the rise of the transmission control signal CLKA. Data latch circuit 60 divides the latched 2n bits of data into two data groups each including n bits and applies the same to two inputs A and B of multiplexer 62.

In response to the rise of the transfer control signal CLKA to the high level (or in response to the signal which is at the high level), the multiplexer 62 selects n bits of data at the input A and outputs the data to receiving side data transmitter 214. In response to the fall of the transmission control signal CLKA to the low level (or at the low level), the multiplexer 62 selects n bits of data at the input B and applies the data to receiving side data transmitter 214. Among the n bits of data output from multiplexer 62, m bits (1 in this embodiment) are applied to the detecting circuit 220. It is assumed that the 2n bits of data is structured such that this 1 bit of data assumes "0" (low level) when the data at the input A are selected and assumes "1" (high level) when the data at the input B are selected, as in the third embodiment.

When the 1 bit of data input thereto is at the low level, the detecting circuit 220 applies a low level signal and when it is the high level, applies a high level signal, respectively, to the transmission control circuit 222.

After the input of the transmission control signal CLKA, the transmission control circuit 222 applies the transmission control signal (reception control signal) to the receiving side data transmitter 214 in response to the change of the signal level input from detecting circuit 220 from the high level to the low level, or in response to the change in the opposite direction. Consequently, it is detected by the detecting circuit 220 that the data output from multiplexer 62 have been correctly established as the data on the input A or the input B, and only when the data have been established, the data is received by the receiving side data transmitter 214.

Referring to FIG. 21, the first one of the two data groups each including n bits is applied from transmitting side data transmitter 212 to the data latch circuits 72 and 74. Detecting circuit 230 detects whether or not the one bit identifier among the n bits is at the low level and when it attains to the low level, it changes the level of the signal which is being applied to the reception control signal 232 from the high level to the low level. When the reception control signal (transmission control signal) is input from the transmitting side data transmitter 212 and when the signal applied from detecting circuit 230 is changed from the high level to the low level, the reception control 232 raises the reception control signal, which is applied to the transfer control signal buffer 108, from the low level to the high level.

In response to the rise of the reception control signal output from the reception control circuit 232 to the high level, data latch circuit 72 latches the n bits of data and applies the same to higher n bits data input of the data latch circuit 70. At this time, data latch circuit 74 does not latch the n bits of data.

Thereafter, assume that the n bits of data transmitted from transmitting side data transmitter 212 have changed to the next n bits of data. The data are applied both to the inputs of data latch circuits 72 and 74. The identifier applied to the detecting circuit 230 changes to the high level, as mentioned above. In response to the change of the signal indicating the identifier from the low level to the high level, the detecting circuit 230 raises the signal to be applied to the reception control circuit 232 from the low level to the high level.

In response to the fall of the reception control signal (transmission control signal) applied from the transmitting side data transmitter 212 from the high level to the low level and to the rise of the signal from the detecting circuit 230 from the low level to the high level, the reception control circuit 232 lowers the reception control signal output therefrom from the high level to the low level.

Data latch circuit 74 latches the input n bits of data at the timing of the fall of the reception control signal output from reception control circuit 232 and outputs the same to lower n bits input of data latch circuit 70. At this time, data latch circuit 72 does not latch the n bits of data appearing as its input. As the data latch circuit 74 latches the n bits of data, higher n bits out of 2n bits of data which have been stored in the data latch circuit 60 of transmitting side data transmitter 212 are now latched in data latch circuit 72, and the lower n bits of the 2n bits of data are now latched in the data latch circuit 74.

As the reception control signal from the reception control circuit 232 changes, the transfer control signal buffer 108 outputs a reception control signal with its level changed after a prescribed delay. After the necessary data are stored in data latch circuits 72 and 74, respectively, the reception control signal output from transfer control signal buffer 108 rises from the low level to the high level. Data latch circuit 70 latches the 2n bits of data applied from data latch circuits 72 and 74 in response to the rise of the reception control signal to the high level and applies the data collectively as 2n bits of data to the receiving side data terminal equipment 904.

In this manner, in the fourth embodiment also, 2n bits of data can be transmitted between the transmitting side data terminal equipment 902 and the receiving side data terminal equipment 904 by using the synchronous transfer system. In this case, the bit width of the data transmission path used between the interface apparatus requires n bit width as the data signal line and one signal line for transmission control signal. In the first embodiment, compared with the interface apparatus of the second embodiment, a part of the data is used as the identifier. Therefore, whether or not the data transmitted over the data transmission path having the width of n bits have distinctively changed to the correct data is determined, and reception of data is performed only when it is determined that the data have definitely changed. Therefore, the reliability of data transmission of the interface apparatus in accordance with the first embodiment is higher than that of the interface apparatus in accordance with the second embodiment.

[Fifth Embodiment]

In the following, the interface apparatus in accordance with the fifth embodiment of the present invention will be described with reference to FIGS. 22 to 35. The interface apparatus of the fifth embodiment employs, similar to the third embodiment, the handshaking system and performs highly reliable transmission using an identifier. Different from the third embodiment, the interface apparatus of the fifth embodiment carries out transmission of data of 4n bits between two data terminal equipments 240 and 242 by using (n+1) data lines and two transmission control signal lines for handshaking. Accordingly, in the interface apparatus 240 of the fifth embodiment, 4n bits of data applied from transmitting side data terminal equipment 240 are divided into four data groups each including n bits of data, which are time sequentially transmitted through the transmission path in one cycle of operation of the data terminal equipments 240 and 242.

For identifying the data groups, information including 2 bits is necessary. A decoder or a coincidence detecting circuit may be used for identification. However, since it is known that the data are time sequentially transmitted in a prescribed order, more simple method can be used in which 1 bit of information indicating whether or not the data group is an odd numbered data group or an even numbered data group as the identifier. The embodiment below has such a circuit structure. The circuit for applying such identifier is not limited to the embodiment described in the following. For example, such 1 bit of information may be obtained by selecting binary data of "00", "01", "11" and "00" by using a multiplexer and further by passing the same through an EXOR gate or an EXNOR gate.

Figure 22:
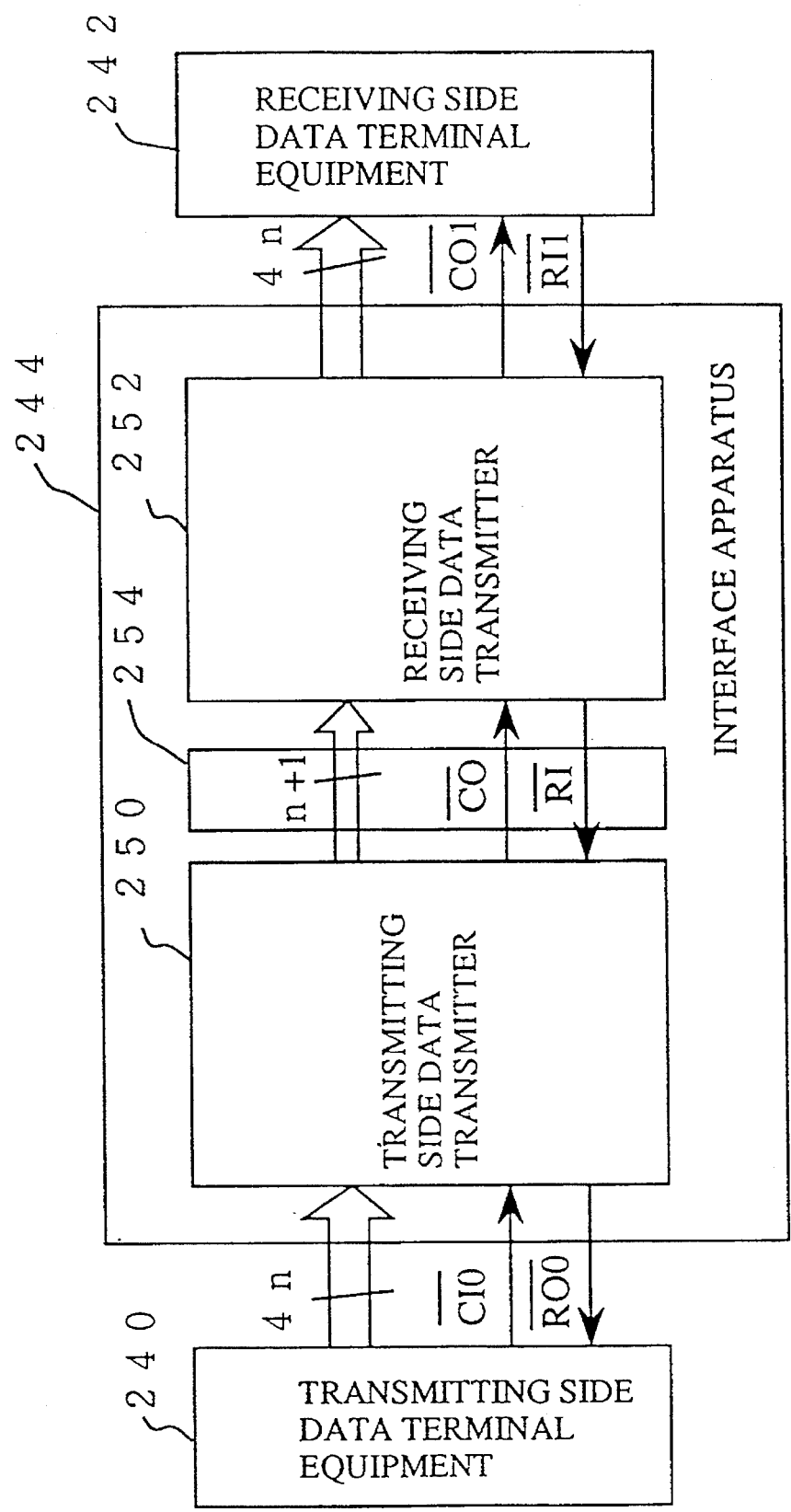
FIG. 22 is a schematic block diagram showing the interface apparatus in accordance with a fifth embodiment.

Referring to FIG. 22, the interface apparatus 244 includes a transmitting side data transmitter 250 connected to transmitting side data terminal equipment 240, a receiving side data transmitter 252 connected to receiving side data terminal equipment 242, and a data transmission path 254 for connecting the transmitting side data transmitter 250 with the receiving side data transmitter 252.

Between transmitting side data terminal equipment 240 and transmitting side data transmitter 250, there are 4n bits of data lines, a signal line for a control signal /CI0 and a signal line for a control signal /RO0.

Between the receiving side data transmitter 252 and receiving side data terminal equipment 242, 4n bits of data signal lines, a signal line for the control signal /CO1 and a signal line for the control signal /RI1 are provided.

In the transmission path 254, a data signal line having the width of n+1 bits, a signal line for transmission signal /CO and a signal line for reception signal /RI are provided.

Figure 23:
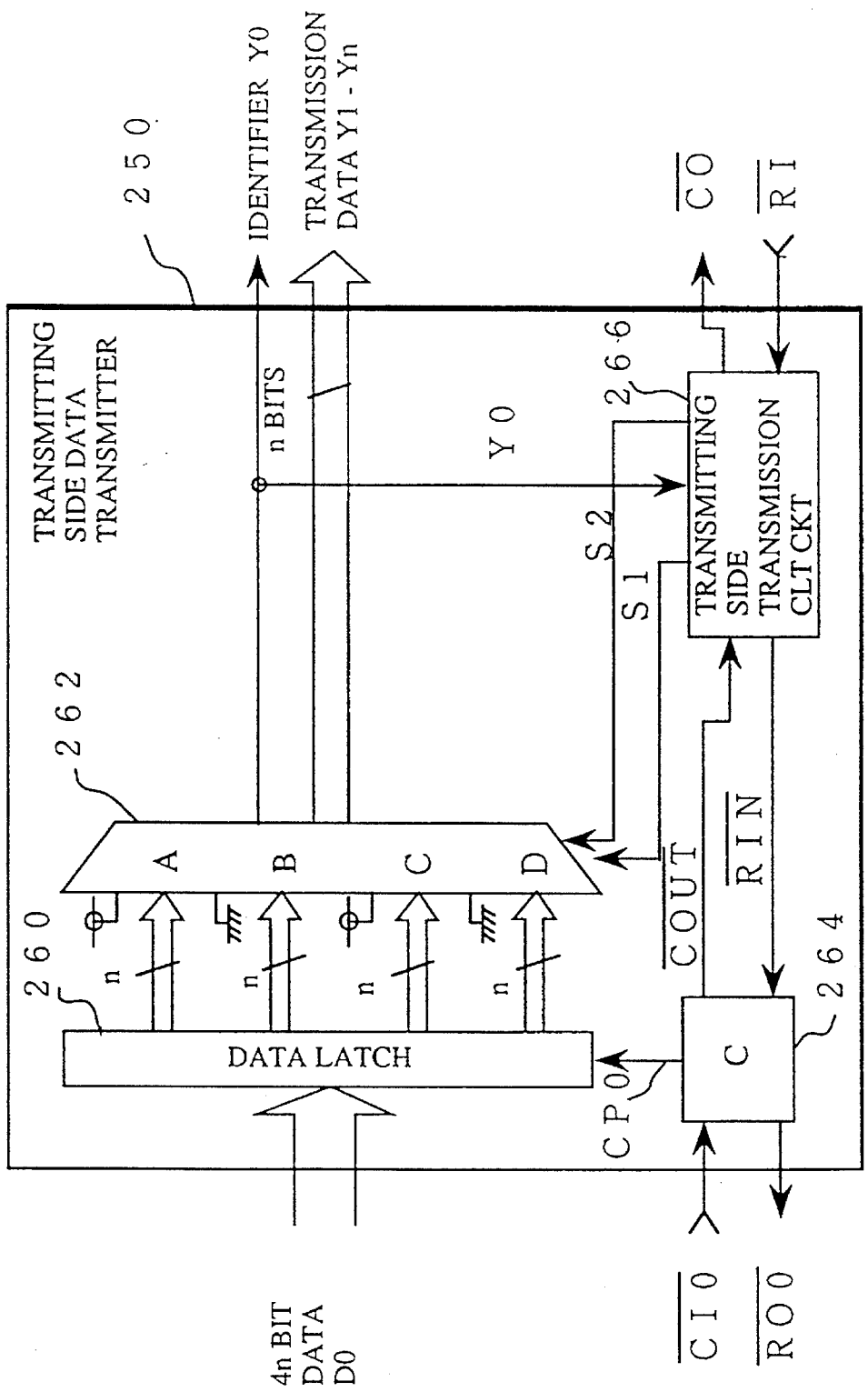
FIG. 23 is a block diagram of the transmitting side data transmitter.

Referring to FIG. 23, transmitting side data transmitter 250 includes a data latch circuit 260 latching 4n bits of data DO from transmitting side data terminal equipment 240 for dividing and outputting the same as four data groups each including n bits; a multiplexer 262 for selecting and outputting one of the four inputs A to D together with an indictor Y0 which is determined in a manner described later; a transfer control mechanism 264; and a transmitting side transmission control circuit 266.

Transfer control mechanism 264 includes two inputs and three outputs. One of the inputs is connected to transmitting side data terminal equipment 240 (see FIG. 22) and receives transmission control signal /CI0. The other one of the inputs is connected to one of the outputs of transmitting side transmission control circuit 266 and receives reception signal /RIN from transmitting side transmission control circuit 266. One of the three outputs of transfer control mechanism 264 is connected to transmitting side data terminal equipment 240 and outputs a reception control signal /RO0. One of the outputs of transfer control mechanism 264 is connected to one of the inputs of transmitting side transmission control circuit 266 and applies a transmission signal /COUT to circuit 266. The remaining one of the outputs of the transfer control mechanism 264 is connected to a clock terminal of data latch circuit 260 and outputs a latch signal CP0 for data latch circuit 260. The structure of transfer control mechanism 264 is the same as transfer control mechanism 932 (see FIG. 5) described in the first embodiment. Therefore, the structure of transfer control mechanism 264 is not described in detail.

Transmitting side transmission control circuit 266 has three inputs and four outputs. One of the three inputs is connected to a signal line of the identifier Y0 from multiplexer 262 as described above. Another one of the three inputs receives reception signal /RI from receiving side data transmitter 252 as will be described later. The remaining one of the inputs of transmitting side transmission control circuit 266 is connected to an output of transmission signal /COUT of transfer control circuit 264.

Two of the four outputs of transmitting side transmission control circuit 266 are for outputting signals S1 and S2 which define the data selected by multiplexer 262, and these outputs are connected to a control terminal of multiplexer 262. Another one of the four outputs of transmitting side transmission control circuit 266 is connected to an input of reception signal RIN of transfer control circuit 264. The remaining output of transmitting side transmission control circuit 266 is connected to receiving side data transmitter 262 for outputting transmission signal /CO. The details of the transmitting side transmission control circuit 266 will be described later.

Referring to FIG. 14, the selecting operation of multiplexer 262 will be described in detail. The structure of multiplexer 262 itself is the same as a common multiplexer, and the details thereof is not described for the purpose of simplicity.

Multiplexer 262 has four inputs A to D, as described above. Each of the four inputs A to D has the width of n bits. For the inputs A to D, corresponding 1 bit input terminals A0, B0, C0 and D0 are provided. To these input terminals A0, B0, C0 and D0, logics "1", "0", "1" and "0" are input, respectively. The input A is connected to the output of the highest n bits of data DA of four outputs of data latch circuit 260 shown in FIG. 23. These n bits of data are labeled as A1 to An. The second input B is connected to the second output of data latch circuit 260, to which the second highest n bits of data DB are input. These data are labeled as B1 to Bn. The third input C is connected to the third output of data latch circuit 260, to which the third n bits of data DC are input. These data are labeled as C1 to Cn. The fourth inputs D is connected to the fourth output of data latch circuit 260 to which the fourth n bits of data group DD are input. These data are labeled as D1 to Dn.

In accordance with the combination of selection signals S1 and S2 applied from transmitting side transmission control circuit 266, multiplexer 262 selects one of the combination of input A and A0, B and B0, C and C0 and D and D0, and output data which have been input to the selected one as transmission data Y1 to Yn and the identifier Y0. The relation between the values of selection signals S1 and S2 as well as the signal selected by multiplexer 262 is shown in the Table below.

TABLE 1

| S1 | S2 | OUTPUT |
|----|----|--------|
| 1  | 1  | A0-An  |
| 0  | 1  | B0-Bn  |
| 0  | 0  | C0-Cn  |
| 1  | 0  | D0-Dn  |

Figure 25:
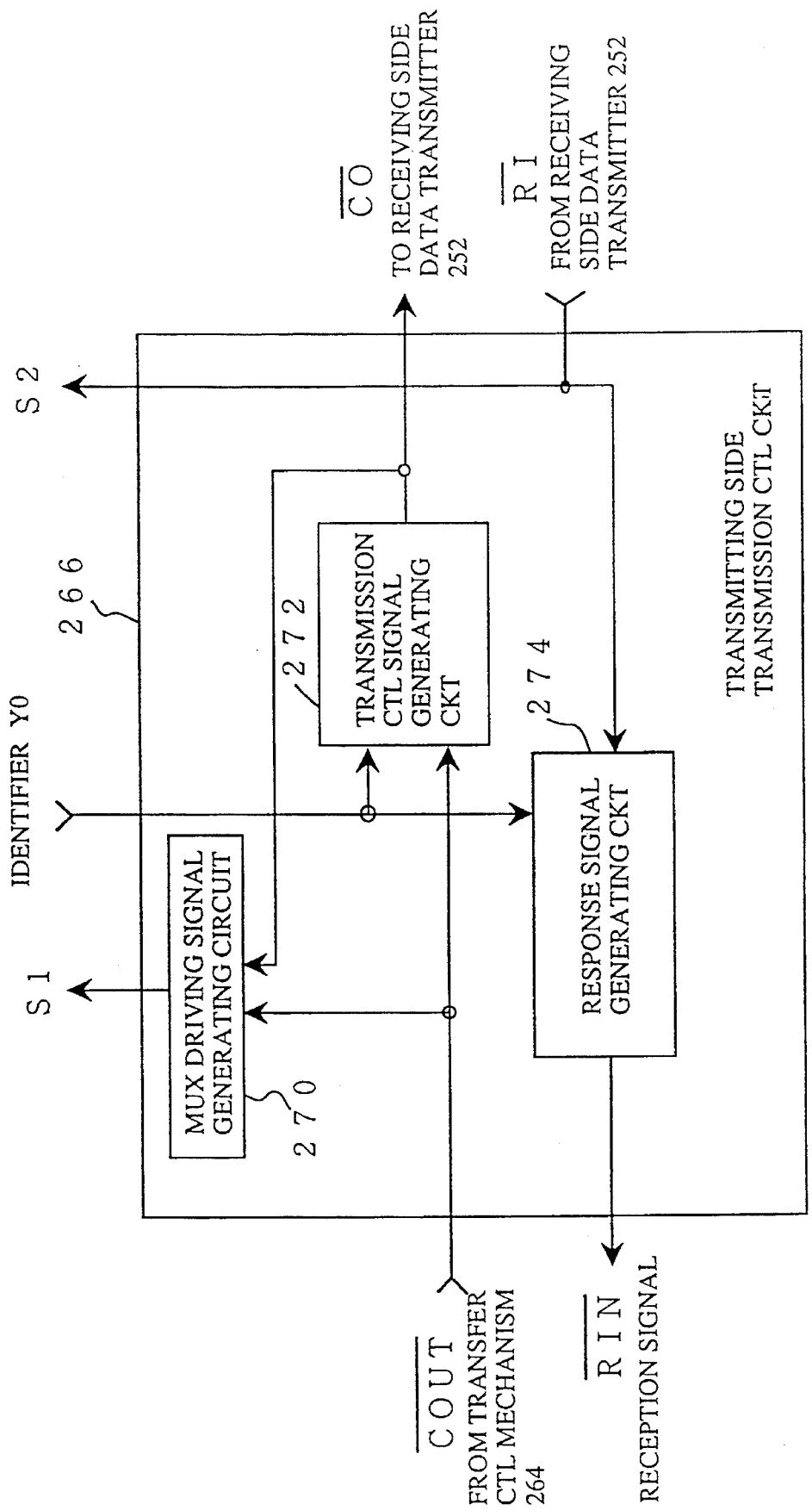
FIG. 25 is a block diagram of the transmitting side transmission control circuit.

Referring to FIG. 25, the transmitting side transmission control circuit 266 shown in FIG. 23 includes a multiplexer driving signal generating circuit 270, a transmission control signal generating circuit 272 and a response signal generating circuit 274. Each of the three circuits 270, 272 and 274 have two inputs and one output.

Figure 24:
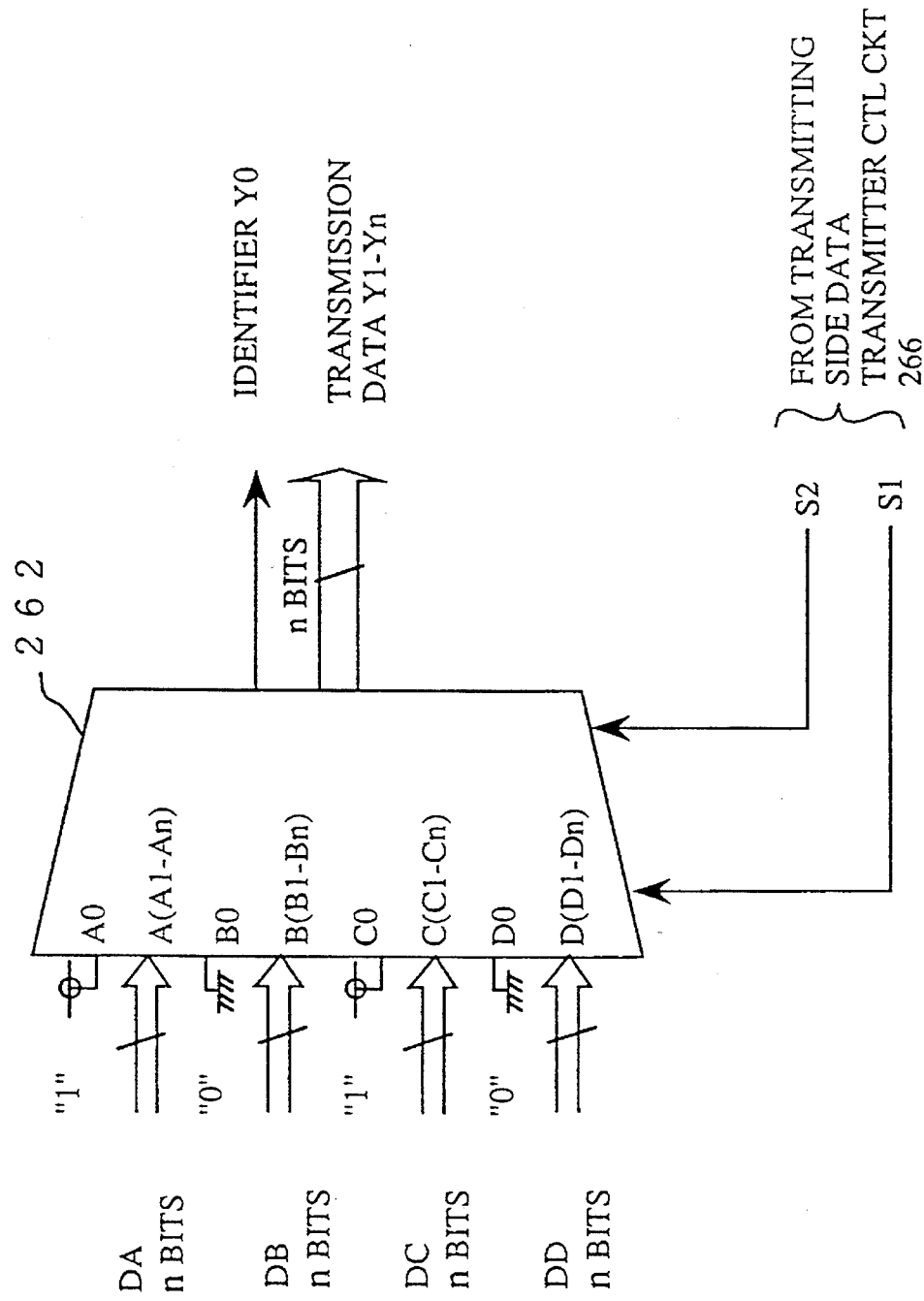
FIG. 24 is a schematic diagram showing the structure of the multiplexer.

One of the inputs of multiplexer driving signal generating circuit 270 is connected to an output of transmission signal /COUT of transfer control mechanism 264(FIG. 23). The other input of multiplexer driving signal generating circuit is connected to an output of transmission control signal generating circuit 272. The output of multiplexer driving signal generating circuit 270 is for providing a selection signal S1 and it is connected to one of the control terminals of multiplexer 262, as shown in FIGS. 23 and 24. The details of multiplexer driving signal generating circuit 270 will be described with reference to FIG. 26, later.

One input of transmission control signal generating circuit 272 is connected to the signal line of the identifier Y0 as shown in FIG. 23. The other input of transmission control signal generating circuit 272 is connected to the output of transmission signal /COUT of transfer control mechanism 264(FIG. 23). The output of transmission control signal generating circuit 272 is connected to one input of multiplexer driving signal generating circuit 270 as mentioned above as well as to receiving side data transmitter 252. This output of transmission control signal generating circuit 272 is the transmission signal /CO. The details of transmission control signal generating circuit 272 will be described later with reference to FIG. 27.

One input of response signal generating circuit 274 is connected to the signal line of the identifier Y0 from multiplexer 262 shown in FIG. 23. The other input of response signal generating circuit 274 is connected to the signal line of reception signal /RI from receiving side data transmitter 252. The output of response signal generating circuit 274 is connected to an input of reception signal /RIN of transfer control mechanism 264 shown in FIG. 23. The details of the response signal generating circuit 274 will be described later with reference to FIG. 28.

Figure 26:
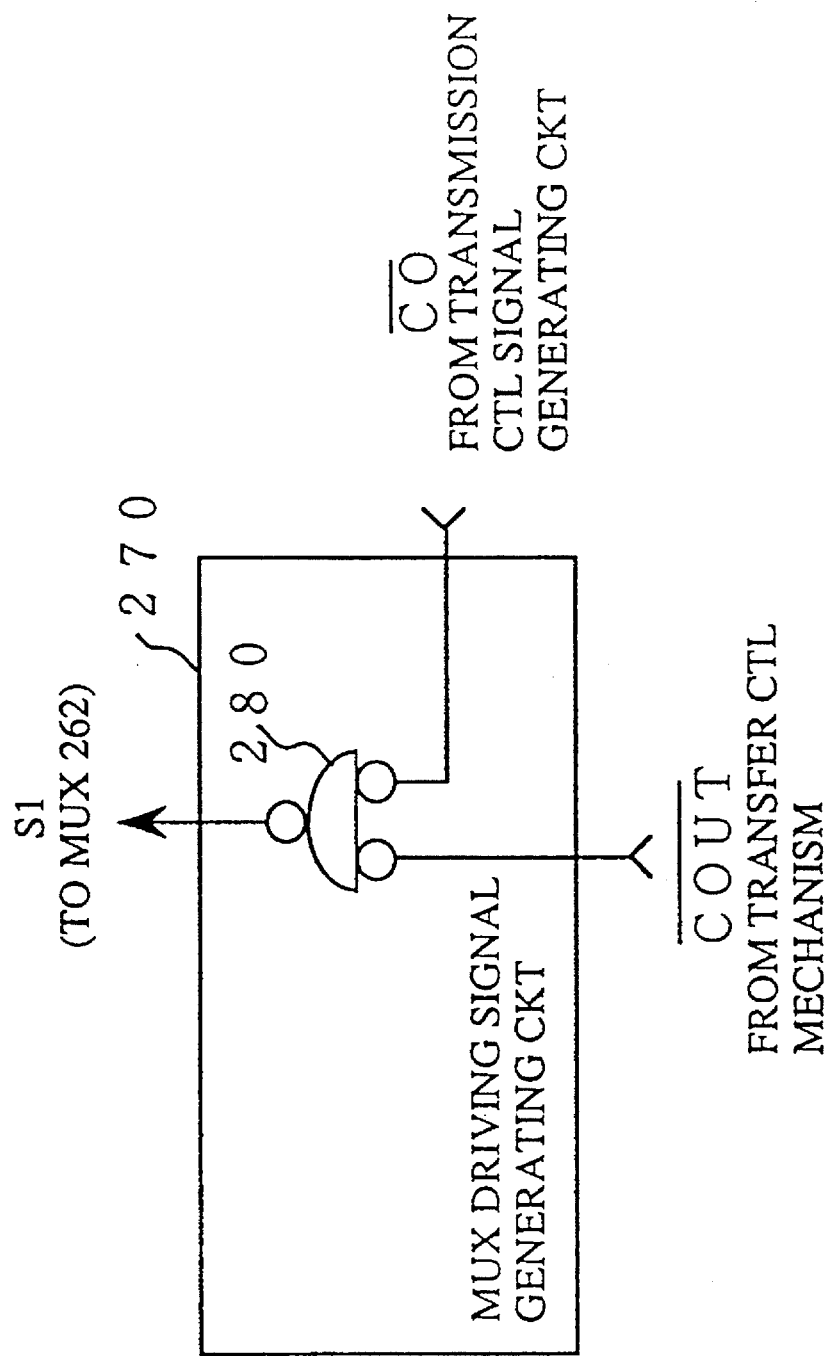
FIG. 26 is a schematic block diagram of a multiplexer driving signal generating circuit.

Referring to FIG. 26, multiplexer driving signal generating circuit 270 includes a 2-input NAND gate 280 of a negative logic. Two inputs of NAND gate 280 are connected to an output of transmission control signal generating circuit 272 and /COUT output of transfer control mechanism 264 (FIG. 23), respectively. An output of NAND gate 280 is connected to a control terminal of multiplexer 262 and applies the selection signal S1 to multiplexer 262.

Figure 27:
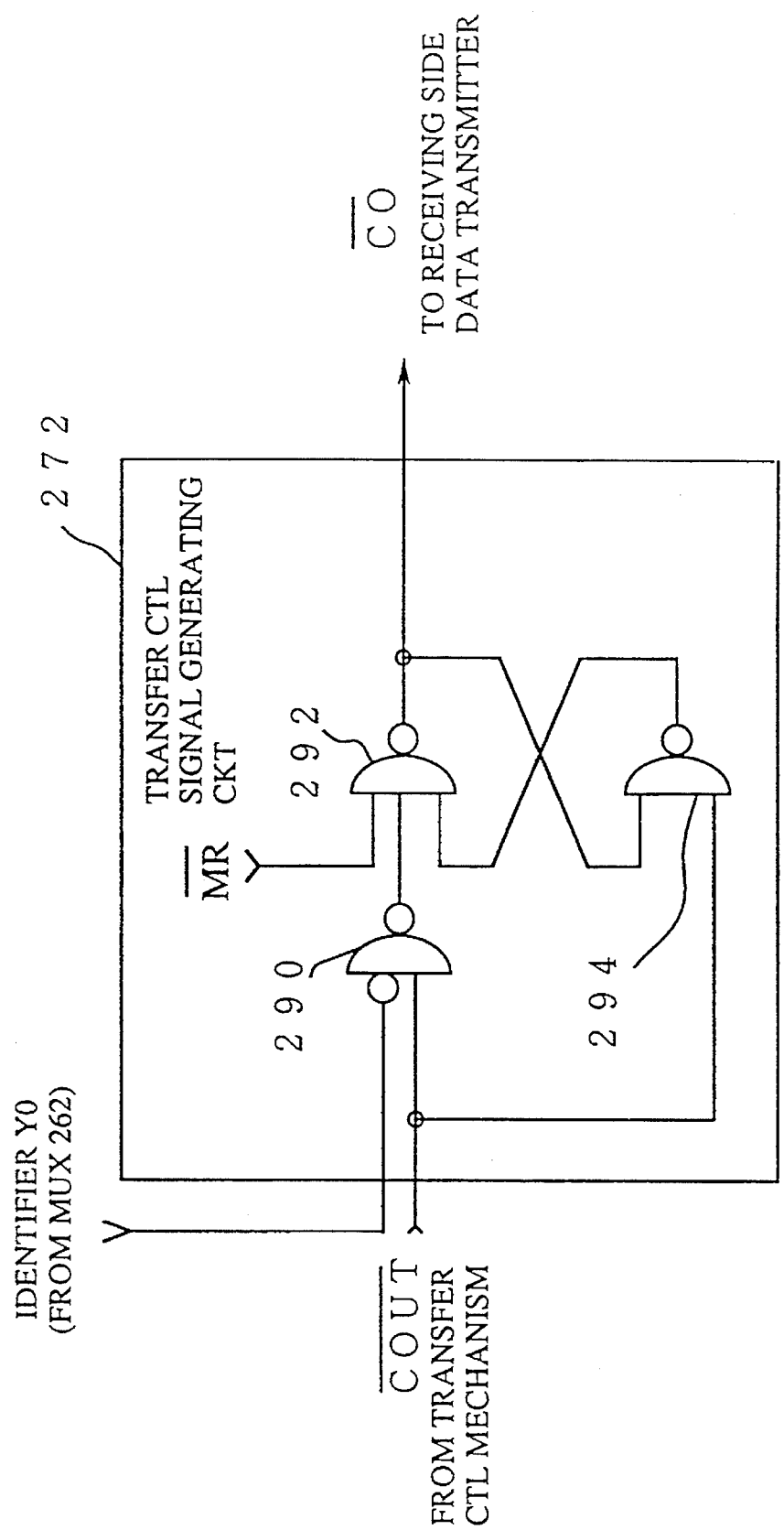
FIG. 27 is a schematic block diagram of a transmission control signal generating circuit.

Referring to FIG. 27, transmission control signal generating circuit 272 includes two 2-input NAND gates 290 and 294, and a 3-input NAND gate 292. One input of NAND gate 290 is a negative logic and is connected to a signal line of the identifier Y0 from multiplexer 262. The other input of NAND gate 290 is connected to /COUT output of transfer control mechanism 264(FIG. 23). The output of NAND gate 290 is connected to one of the inputs of 3-input NAND gate 292.

One input of NAND gate 294 is connected to /COUT output of transfer control mechanism 264 shown in FIG. 23.

One of the remaining two inputs of NAND gate 292 is connected to a circuit (not shown) generating the master reset signal /MR. NAND gates 292 and 294 are cross coupled to form a flipflop. The output of NAND gate 292 is connected to /C0 input of receiving file data transmitter.

Figure 28:
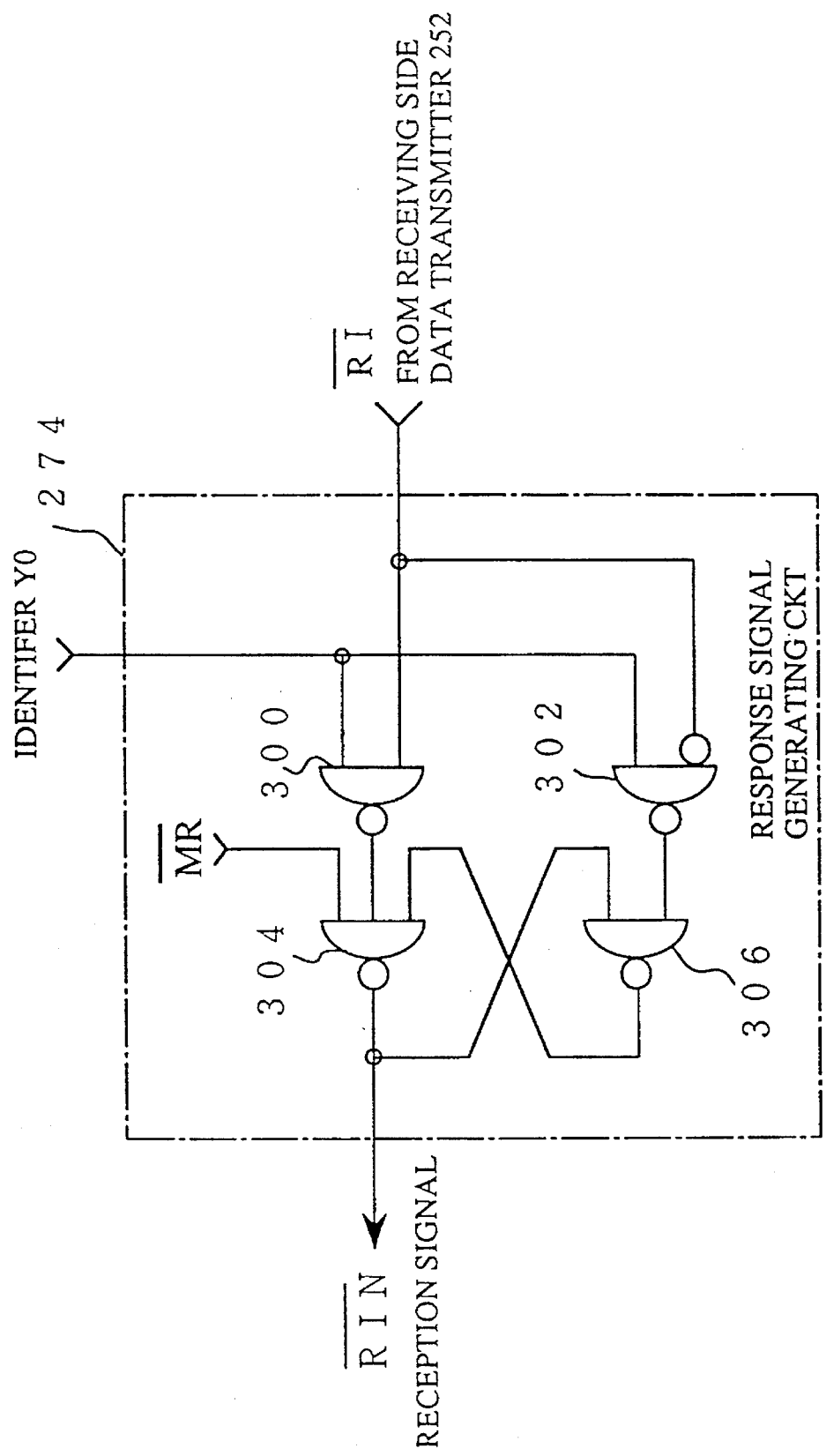
FIG. 28 is a schematic block diagram of a response signal generating circuit.

Referring to FIG. 28, the response signal generating circuit 274 includes three 2-input NAND gates 300, 302 and 306, and one 3-input NAND gate 304.

One input of NAND gate 300 is connected to /RI output of receiving side data transmitter 252. The other input of NAND gate 300 is connected to the signal line of identifier Y0 from multiplexer 262 shown in FIG. 23. The output from NAND gate 300 is connected to one of the inputs of 3-input NAND gate 304.

One input of NAND gate 302 is a negative logic and is connected to /RI output of receiving side data transmitter 252. The other input of NAND gate 302 is connected to the signal line of the identifier Y0 from multiplexer 262 shown in FIG. 23. The output of NAND gate 302 is connected to one of the inputs of NAND gate 306. One input of the remaining two inputs of NAND gate 304 is connected to a circuit for generating the master reset signal MR, which is not shown. NAND gates 304 and 306 are cross coupled to form a flipflop. The output of NAND gate 304 is connected to /RIN input of transfer control mechanism 264(see FIG. 23).

Figure 29:
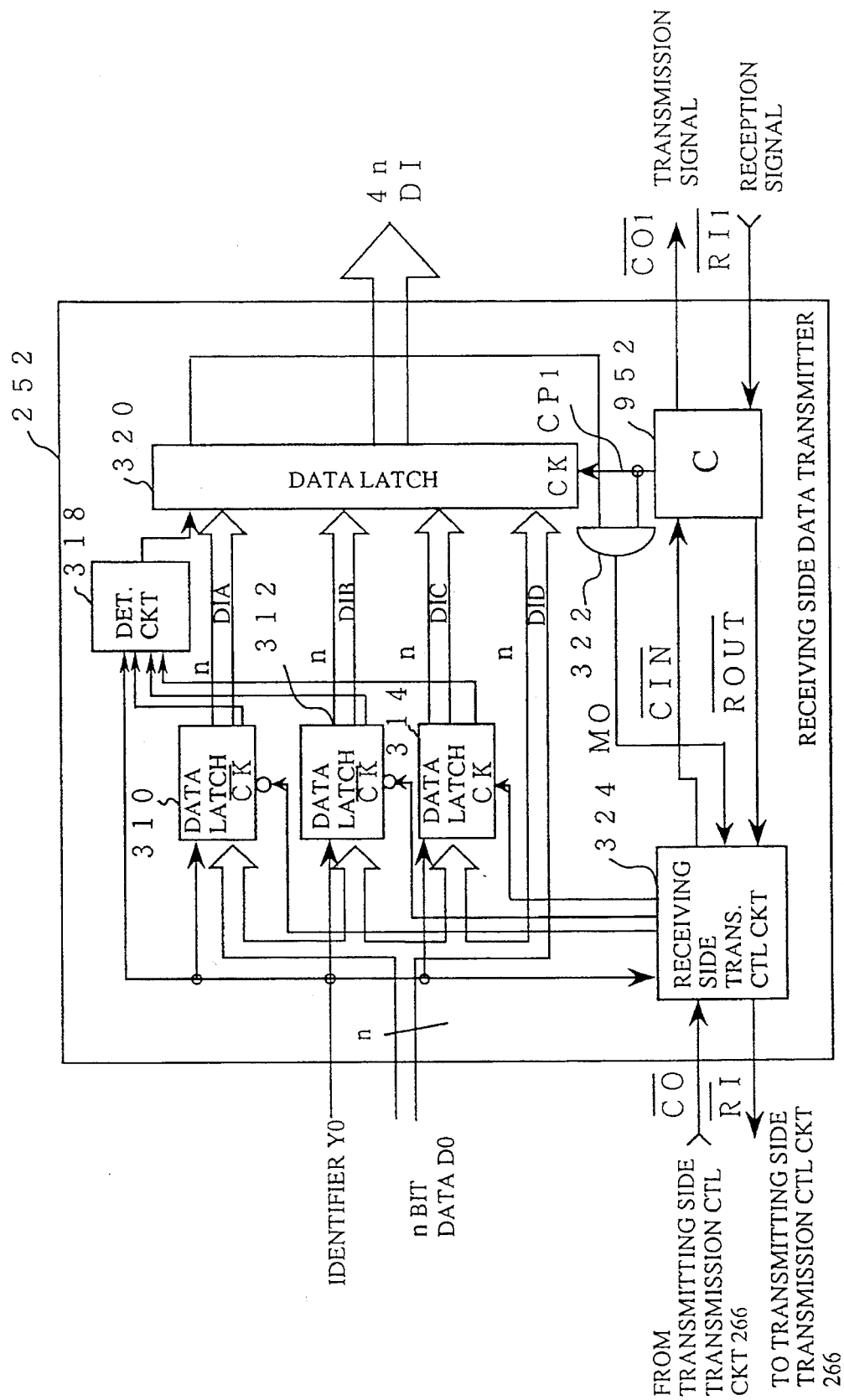
FIG. 29 is a block diagram of the receiving side data transmitter.

Referring to FIG. 29, receiving side data transmitter 252 includes data latch circuits 310, 312 and 312, each having the width of n+1 bits and having its input connected to the n bits of data signal lines and the signal line of the identifier Y0 from the transmitting side data transmitter 250; a data latch circuit 320 having the width of 4n bits having four inputs each having the width of n bits; a detecting circuit 318 having four inputs connected to the signal line of the identifier Y0 from transmitting side data transmitter 250 and to identifier outputs from data latch circuits 310, 312 and 314, detecting whether or not 4n bits of data which have been divided into four for transmission have completely set up and to apply a detection signal of 1 bit to data latch circuit 320; a receiving side transmission control circuit 324; a transfer control mechanism 952; and an AND gate 320 having one input connected to the output of the detection signal from data latch circuit 320, the other input connected to an output of latch signal CP1 from transfer control mechanism 952 and its output connected to one of the inputs of the receiving side transmission control circuit 324.

The structure of receiving side transmission control circuit 324 will be described in detail later with reference to FIGS. 31 to 34. Receiving side transmission control circuit 324 includes four inputs and five outputs. One of the input is connected to /CO output of transmitting side transmission control circuit 266. Another one of the inputs is connected to an output of AND gate 322. Still another one of the inputs is connected to /ROUT output of transfer control mechanism 952. The last one of the inputs is connected to the signal line of the identifier Y0 from multiplexer 262 shown in FIG. 23. Three of the five outputs of receiving side transmission control circuit 324 are connected to clock terminals of data latch circuits 310, 312 and 314, respectively. The clock terminals of data latch circuits 310 and 312 have negative logic. One of the remaining two outputs of receiving side transmission control circuit 324 is connected to /RI input of transmitting side transmission control circuit 266. The last one output is connected to /CIN input of transfer control mechanism 952.

The transfer control mechanism 952 is the same as the transfer control mechanism 952 of the first embodiment shown in FIGS. 3 and 5. However, it should be noted that in FIG. 29, the latch signal provided from transfer control mechanism 952 to data latch circuit 320 is labeled CP1. Transfer control mechanism 952 has three inputs including the output of latch signal CP1. One of the remaining two outputs is connected to /ROUT input of receiving side transmission control circuit 324. The last output is connected to CO1 input of receiving side data terminal equipment 242 (see FIG. 22). One of the two inputs of transfer control mechanism 952 is connected to /RI1 output of receiving side data terminal equipment 242. The other input is connected to /CIN output of receiving side transmission control circuit 324.

Figure 30:
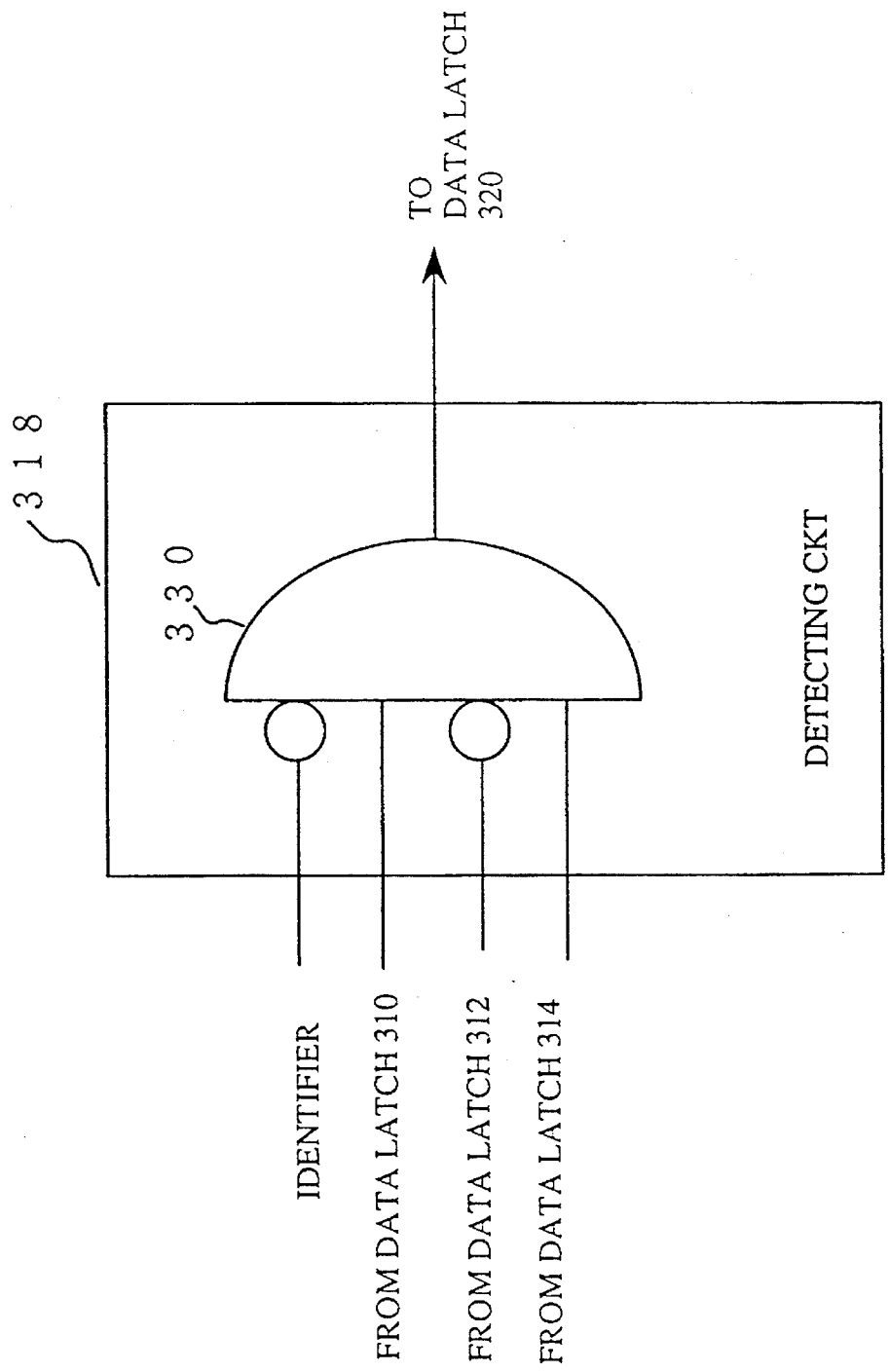
FIG. 30 is a block diagram of the detecting circuit.

Referring to FIG. 30, the detecting circuit 318 includes a 4-input NAND gate 330. Among the four inputs, the highest input and the third from the top input have negative logic. The uppermost input is directly connected to the signal line of the identifier Y0 from multiplexer 262 shown in FIG. 23. The second input is connected to the latch indentifier output of data latch circuit 310 shown in FIG. 29. The third input is connected to the latch identifier output of data latch circuit 312. The fourth input is connected to the latch identifier output of data latch circuit 314 shown in FIG. 29. The output of AND gate 330 is connected to a 1 bit input for the identifier of data latch circuit 320 shown in FIG. 29.

Figure 31:
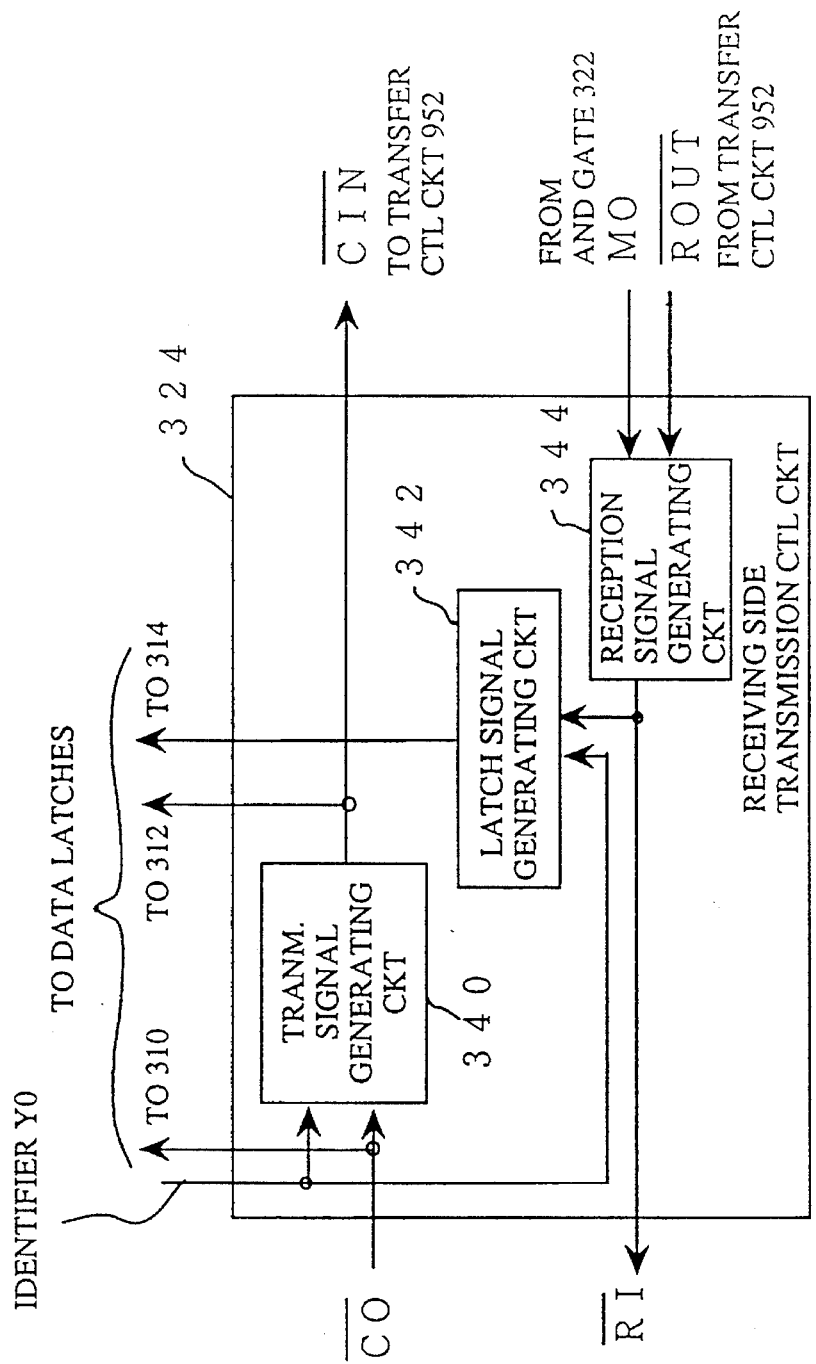
FIG. 31 is a block diagram of the receiving side transmission control circuit 324.

Referring to FIG. 31, receiving side transmission control circuit 324 shown at the lower right corner of FIG. 29 includes a transmission signal generating circuit 340 for generating transmission signal /CIN shown in FIG. 29; reception signal generating circuit 344 for generating reception signal /RI shown in FIG. 29; and a latch signal generating circuit 342 for generating a latch signal for the data latch circuit 314 shown in FIG. 29. The structures of circuits 340, 342 and 344 will be described later with reference to FIGS. 32, 33 and 34, respectively.

Transmission signal generating circuit 340 has two inputs and one output. One of the inputs is connected to the data signal line of the identifier Y0 from multiplexer 262 shown in FIG. 23. The other input is connected to /CO output of transmitting side transmission control circuit 266. The output of transmission signal generating circuit 340 is connected to /CIN input of transfer control circuit 952 (see FIG. 29) and to the latch control signal.

Reception signal generating circuit 344 has two inputs and one output. One of the two inputs is connected to the output of AND gate 322 shown in FIG. 29. The other input is connected to /ROUT of transfer control circuit 552 shown in FIG. 29. The output of reception signal generating circuit 344 is connected to /RI input of transmitting side transmission control circuit 266 as well as to one input of latch signal generating circuit 342.

Latch signal generating circuits 342 includes two inputs and one output. One of the inputs is connected to the output of reception signal generating circuit 344, as mentioned above. The other input is connected to the signal line of the identifier Y0 from multiplexer 262 shown in FIG. 23. The output of latch signal generating circuit 342 is connected to the clock terminal of data latch circuit 314.

The /CO signal line from transmitting side transmission control circuit 266 is connected to the negative logic clock terminal of the data latch circuit 310 shown in FIG. 29. The output of transmission signal generating circuit 340 is also connected to the clock terminal having negative logic of data latch circuit 312 shown in FIG. 29.

Figure 32:
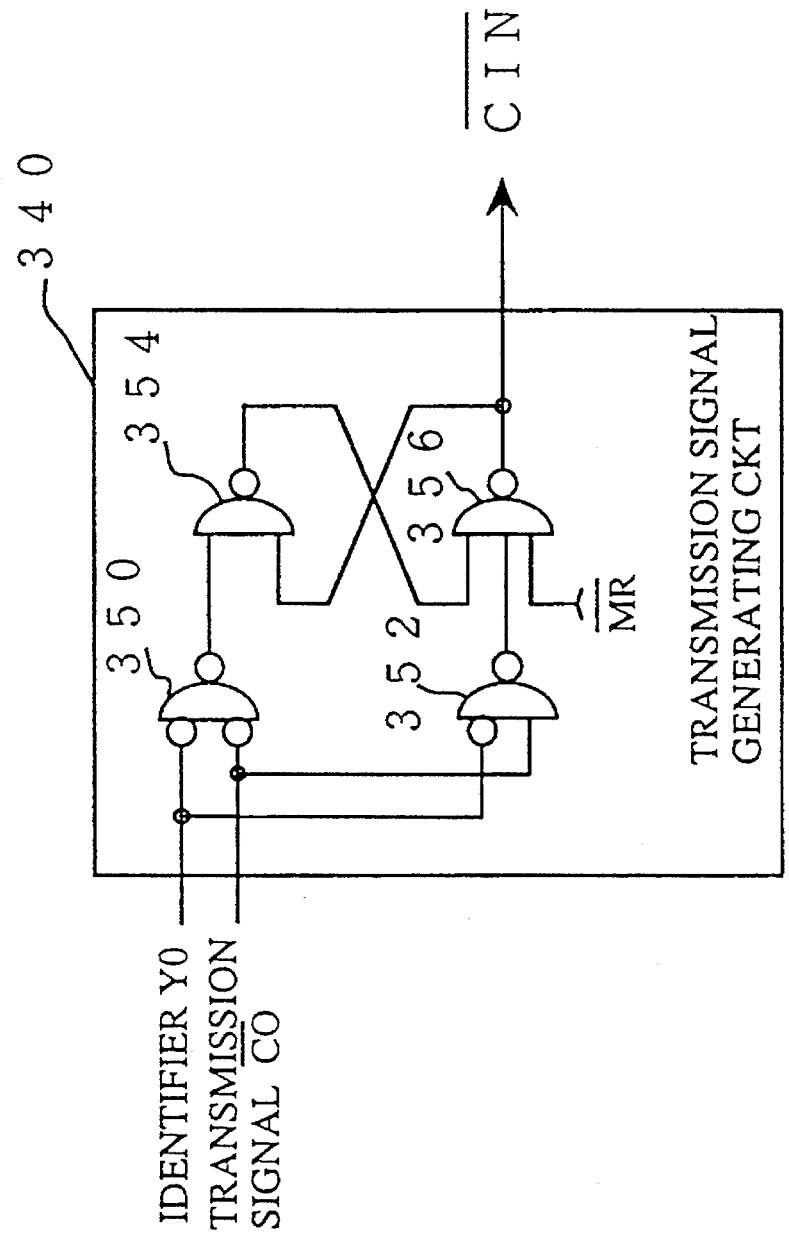
FIG. 32 is a schematic block diagram of the transmission signal generating circuit.

Referring to FIG. 32, transmission signal generating circuit 340 includes three NAND gates 350, 352 and 354, and a 3-input NAND gate 356.

NAND gate 350 has two inputs of negative logic. One of the inputs is connected to the signal line of the identifier Y0. The other one of the inputs is connected to /CO output of transmitting side transmission control circuit 266. The output of NAND gate 350 is connected to one of the inputs of NAND gate 354.

One of the two inputs of NAND gate 352 has a negative logic and is connected to the signal line of the identifier Y0. The other input is connected to /CO output of transmitting side transmission control circuit 266. The output of NAND gate 352 is connected to one of the inputs of NAND gate 356. One of the two remaining inputs of NAND gate 356 is connected to a circuit for generating the master reset signal /MR, which is not shown. NAND gates 354 and 356 are cross coupled to form a flipflop. The output of NAND gate 356 is connected to /CIN input of transfer control circuit 952. This output is also connected to a clock terminal of negative logic of data latch circuit 312 (see FIG. 29).

Figure 33:
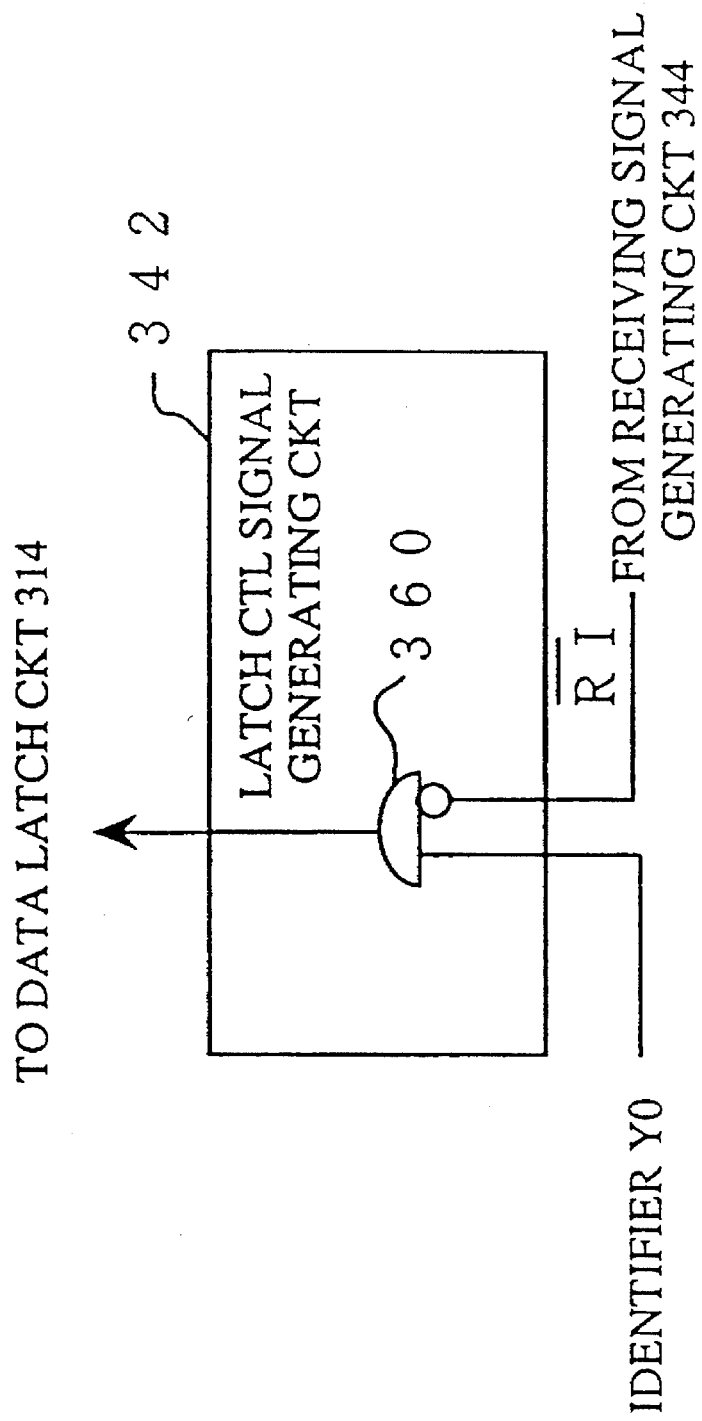
FIG. 33 is a schematic block diagram of a latch signal generating circuit.

Referring to FIG. 33, latch control signal generating circuit 342 includes a 2-input NAND gate 360. One of the inputs of NAND gate 360 has a negative logic, and it is connected to /RI output of reception signal generating circuit 344 (see FIG. 31). The other input of NAND gate 360 is connected to the signal line of the identifier Y0. The output of NAND gate 360 is connected to the clock terminal of data latch circuit 314 shown in FIG. 29, as described above.

Figure 34:
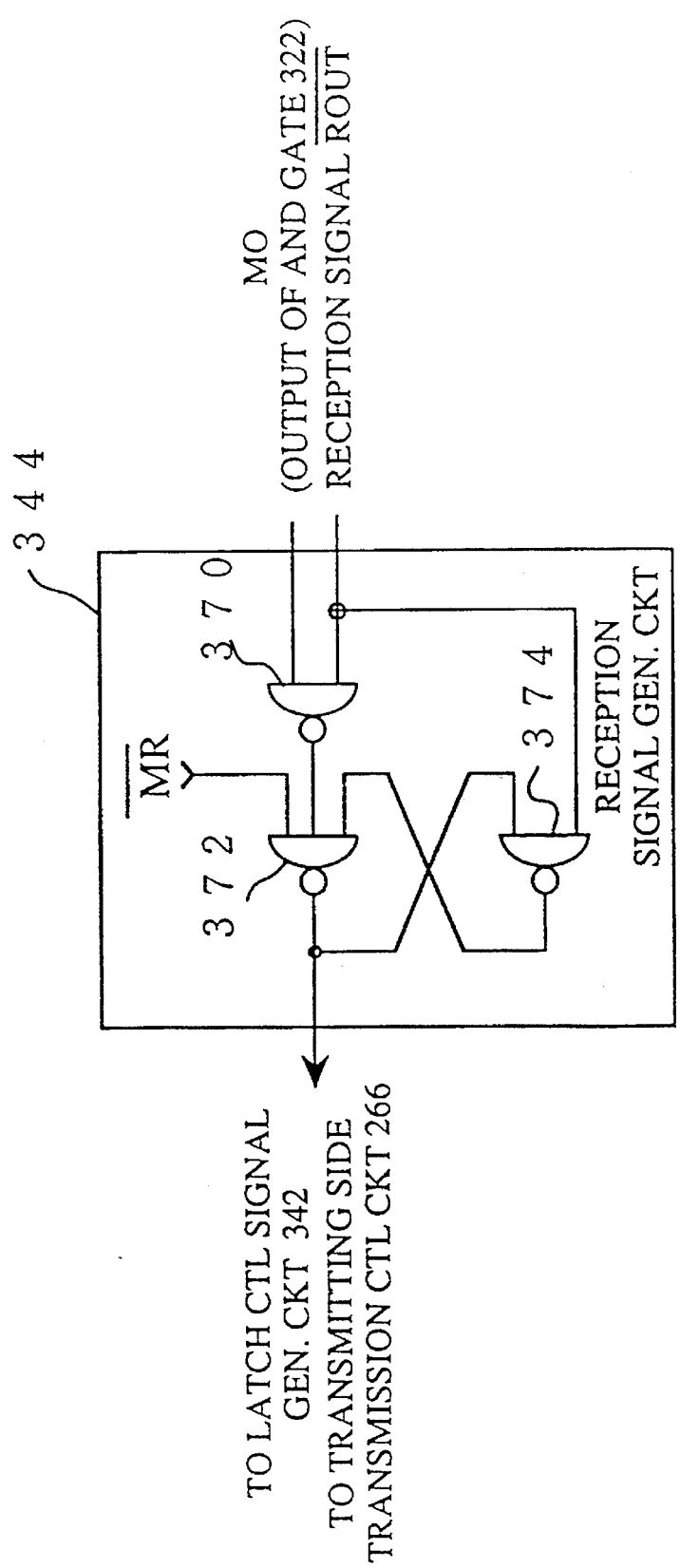
FIG. 34 is a schematic block diagram of a reception signal generating circuit.

Referring to FIG. 34, reception signal generating circuit 344 includes two 2-input NAND gates 370 and 374, and a 3-input NAND gate 372.

One of the inputs of NAND gate 370 is connected to an output of NAND gate 322 (see FIG. 29). The other input is connected to /RI1 output of transfer control mechanism 952. The output of NAND gate 370 is connected to one of the inputs of 3-input of NAND gate 372.

One of the inputs of NAND gate 374 is connected to /ROUT output of transfer control mechanism 952 shown in FIG. 29. One of the remaining two inputs of NAND gate 372 is connected to a circuit for generating the master reset signal /MR which is not shown. NAND gates 272 and 374 are cross coupled to form a flipflop. The output of NAND gate 372 is connected to one of the inputs of latch signal generating circuit 342 as well as to /RI input of transmitting side transmission control circuit 266.

The structure of the interface apparatus in accordance with the fifth embodiment has been schematically described. The operation of the interface apparatus will be described with reference to FIGS. 22 to 34 and the timing chart of FIG. 35.

Figure 35:
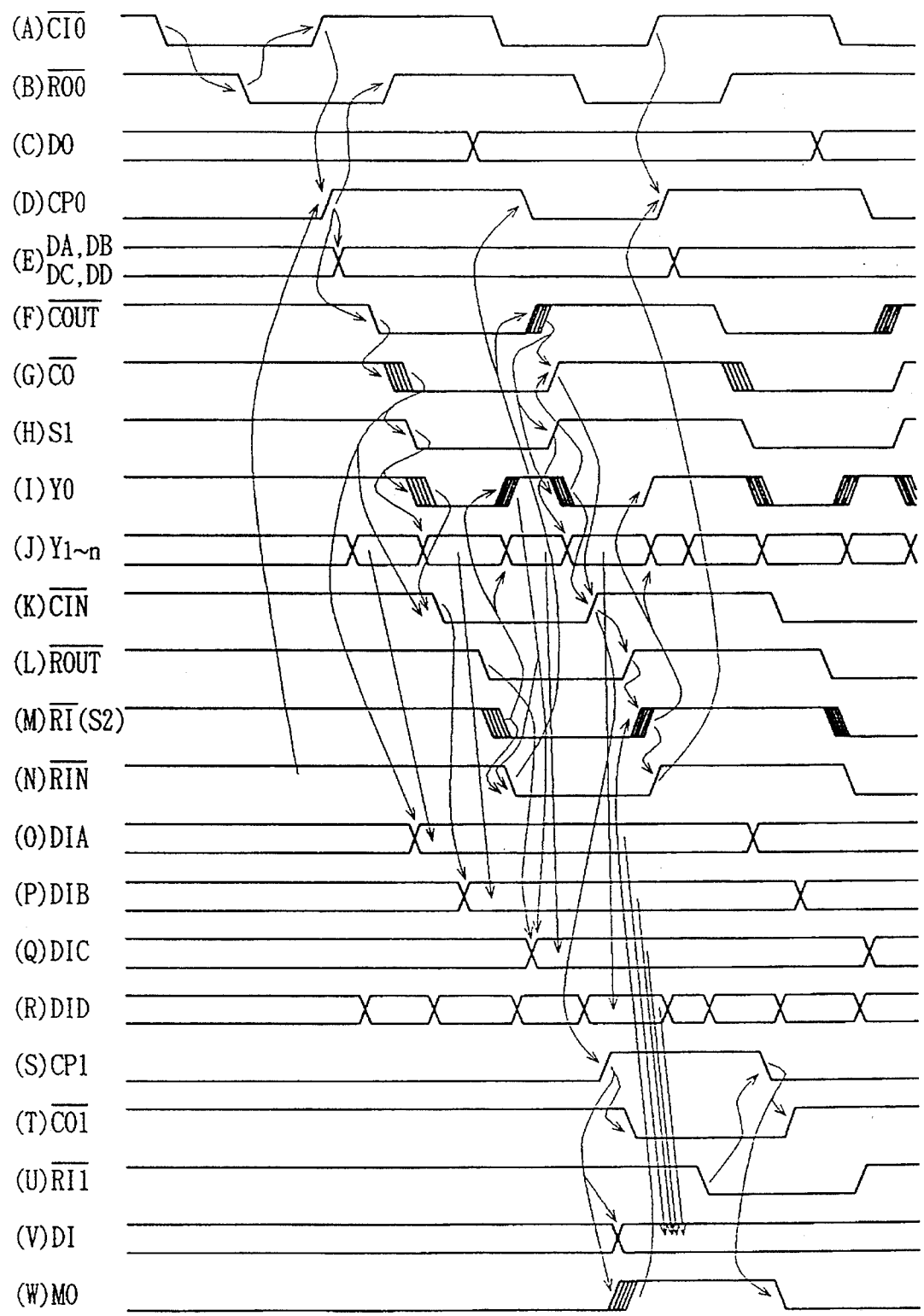
FIG. 35 is a timing chart showing the operation of the interface apparatus in accordance with the fifth embodiment of the present invention.

The timing chart shown in FIG. 35 is approximately the same as the timing chart of the third embodiment shown in FIG. 18. Therefore, in the following, features particular in the fifth embodiment only are described in detail, and features similar to those of the third embodiment are not described in detail. For example, (A) to (D) of FIG. 35 corresponds to (A) to (D) of FIG. 18. FIG. 35 (E) is the same as FIG. 18 (E) except that the number of data groups is increased from two (DA and DB) to 4(DA, DB, DC and DD). FIG. 35 (F) is the same as FIG. 18 (F). Therefore, detailed description thereof are not repeated.

Referring to FIGS. 23 and 27, the transmission control signal generating circuit 272 of transmitting side data transmitter 266 lowers the transmission signal /CO to be applied to receiving side data transmitter from high level to the low level, in response to the fall of the transmission signal /COUT applied from transfer control mechanism 264 from high level to the low level (FIG. 35 (J)). This operation is performed in the following manner.

First, as shown in FIG. 35 (I), it is assumed that the identifier Y0 provided from multiplexer 262 of FIG. 23 is at the high level. Referring to FIG. 27, when/COUT is at the high level, the output of NAND gate 290 is at the high level. When transmission signal /CO is at the high level as shown in FIG. 35 (G), the inputs to NAND gate 294 are both at the high level, and therefore the output therefrom attains to the low level. Here, the state of the flipflop constituted by NAND gates 292 and 294 is stable.

When transmission signal /COUT falls to the low level, the output of NAND gate 294 changes to the high level. The output of NAND gate 290 remains at the high level. Since inputs of NAND gate 292 both changed to the high level, the output of NAND gate 292 changes from the high level to the low level. In this state, the state of the flipflop constituted by gates 292 and 294 becomes stable. More specifically, transmission signal /CO applied to receiving side data transmitter 252 falls from the high level to the low level in response to the fall of transmission signal /COUT from the high level to the low level, as shown in FIG. 35 (G).

Referring to FIG. 26, at this time, the signal S1 output from multiplexer driving signal generating circuit 270 falls from the high level to the low level as shown in FIG. 35 (H). This is performed in the following manner.

Referring to FIG. 26, when both transmission signals /COUT and /CO are at the high level, the output from NAND gate 280 is at the high level. Even if transmission signal /COUT falls from the high level to the low level, the output from NAND gate 280 remains at the high level so long as the transmission signal /CO is at the high level. However, in response to the fall of the transmission signal /CO to the low level as shown in FIG. 35 (G), the signal output from NAND gate 280 falls from the high level to the low level. This is as shown in FIG. 35 (H).

At this time, as shown in FIG. 35 (M), the selection signal S2 applied to multiplexer 262 of FIG. 23 is at the high level.

Therefore, before the fall of the selection signal S1 to the low level, multiplexer 262 selects data A1 to An applied to the first input A and outputs the same as transmission data Y1 to Y2, in accordance with the first row of Table 1. Further, as shown in FIG. 24, multiplexer 262 selects and outputs the logic "1" applied to the first input terminal A0 as the identifier Y0. However, when selection signal S1 falls to the low level as shown in FIG. 5 (H), multiplexer 262 selects and outputs data B1 to Bn applied to the second input B as transmission data Y1 to Yn, in accordance with the second row of Table 1. Multiplexer 262 selects and outputs the logic "0" which is applied to the second input terminal B0 shown in FIG. 24 as the identifier Y0. The change in the values of the identifier Y0 and transmission data Y1 to Yn are as shown in FIGS. 35 (I) and (J).

Referring to FIG. 35 (G), in response to the fall of the transmission signal /CO from the high level to the low level, the following operation is carried out in the receiving side data transmitter 252 (FIG. 29). It should be noted that when transmission signal /CO falls, data A1 to An selected by multiplexer 262 shown in FIG. 23 are applied to inputs of data latch circuits 310, 312, and 314 shown in FIG. 29. Referring to FIG. 39, transmission signal /CO from transmitting side transmission control circuit 266 is applied to transmission signal generating circuit 340 as well as to the negative logic clock terminal of data latch circuit 310. Therefore, in response to the fall of transmission signal /CO, data latch circuit 310 latches data A1 to An, and applies data DIA to the first n bits of input of data latch circuit 320 (FIG. 35(O)). At the same time, data latch circuit 310 latches the identifier (logic "1" or high level) applied from multiplexer 262 and provides the same to detection circuit 318 (see FIG. 35(O)).

Referring to FIGS. 29, 31 and 32, when the identifier Y0 and transmission signal /CO are both at the high level, transmission signal generating circuit 340 outputs a high level transmission signal /CIN to transfer control circuit 952. However, as the identifier Y0 and the transmission signal /CO both fall to the low level as described above, transmission signal generating circuit 340 lowers the transmission signal /CIN to the low level (see FIG. 35 (K)). The transmission signal generating circuit 340 shown in FIG. 32 realizes the above described operation in the following manner.

Referring to FIG. 32, when the identifier Y0 and the transmission signal /CO are both at the high level, outputs of NAND gates 350 and 352 are both at the high level. The outputs of NAND gates 354 and 356 attain to the low level and the high level, respectively. Here the state of the flipflop constituted by NAND gates 354 and 356 is stable. Therefore, transmission signal /CIN output from transmission signal generating circuit 340 is at the high level.

Assume that either one of the identifier Y0 and the transmission signal /CO attains to the low level. At this time, the output of NAND gate 350 still remains at the high level. The output of NAND gate 352 assumes either the low level or high level dependent on which of the identifier Y0 and the transmission signal /CO has attained to the low level. In either case, the output of NAND gate 356 remains at the high level and the output of NAND gate 354 remains at the low level. Therefore, even when either one of the identifier Y0 and the transmission signal /CO attains from the high level to the low level, the transmission signal /CIN output from transmission signal generating circuit 340 remains at the high level.

When both of the identifier Y0 and the transmission signal CO attain to the low level, the outputs of NAND gates 350 and 352 attain to the low level and the high level, respectively. The inputs to NAND gates 354 will be the low level and high level, respectively, resulting in a high level output of the NAND gate 354. Consequently, the inputs to NAND gate 356 are at the high level, and the output attains to the low level. The state of the flipflop constituted by NAND gates 354 and 356 is made stable. Therefore, at the time when the identifier Y0 and the transmission signal /CO both attain to the low level, transmission signal /CIN falls from the high level to the low level. This is shown in FIG. 35 (K).

This transmission signal /CIN is also applied to the clock terminal of the negative logic of data latch circuit 312 as shown in FIG. 29. Therefore, in response to the fall of transmission signals /CIN from high level to the low level, data latch circuit 312 latches transmission data Y1 to Yn (B1 to Bn) as well as the identifier (logic "0" or the low level) applied from transmission side data transmitter 250, and applies the same as data DIB to the second n bits of input of data latch circuit 320. At the same time, the latched identifier Y0 (low level) is applied to detection circuit 318. This is shown in FIGS. 35(J) and (P).

Referring to FIGS. 29 and 35(K) and (L), in response to the fall of the transmission signals /CIN to the low level, transfer control mechanism 952 lowers reception signal /ROUT from the high level to the low level. The reception signal /ROUT is applied to another input of the reception signal generating circuit 344 shown in FIGS. 31 and 34.

Reception signal generating circuit 344 shown in FIG. 34 lowers the reception signal /RI output therefrom from the high level to the low level, in response to the fall of reception signal /ROUT from the high level to the low level (see FIGS. 35 (L) and M)). This is carried out in the following manner in the circuit of FIG. 34.

Following to FIG. 34, the signal MO input from AND gate 322 remains at the low level as long as the latch signal CP1 shown in FIG. 29 is at the low level. If the reception signal /ROUT is at the high level, the output of NAND gate 370 is at the high level. Reception signal /RI, that is, the output of reception signal generating circuit 344 is at the high level. The output of NAND gate 372 is at the high level, the output of NAND gate 374 is at the low level and the state of the flipflop constituted by NAND gates 372 and 374 is stable. Namely, if reception signal /ROUT is at the high level, the flipflop is made stable as described above, and reception signal /RI is also at the high level.

Assume that the reception signal /ROUT changes to the low level. The output of NAND gate 370 remains at the high level, since one input of NAND gate 374 falls to the low level, the output of NAND gate 374 tends to attain to the high level. Consequently, high level signals are applied to all inputs of NAND gate 372, and thus the output of NAND gate 372 is inverted to the low level, so that the flipflop constituted by the NAND gates 372 and 374 is made stable. More specifically, as reception signal /ROUT falls to the low level, the reception signal /RI output from reception signal generating circuit 274 falls to the row level (FIG. 35 (M)).

The reception signal /RI is directly applied to one input of multiplexer 262 shown in FIG. 23 as selection signal S2, by transmitting side transmission control circuit 266. As the selection signal S2 attains to "0" (low level), multiplexer 262 applies data C1 to Cn applied from the third input C to receiving side data transmitter 252 as transmission data Y1 to Yn, in accordance with the third row of Table 1. At this time, multiplexer 262 applies a signal of logic "1" (high level) applied at the third input terminal C0 as the identifier Y0, to receiving side data transmitter 252. The change of the transmission data Y1 to Yn and identifier Y0 are shown in FIGS. 35 (J) and (I), respectively.

Referring to FIGS. 23 and 35 (N), in response to the fall of reception signal /RI from the high level to the low level, transmitting side transmission control circuit 266 lowers the reception signal /RIN applied to transfer control mechanism 264 from the high level to the low level. This lowering of the signal /RIN is carried out by the transmitting side transmission control circuit 266 in the following manner.

Referring to FIG. 25, reception signal /RIN is generated by response signal generating circuit 274 which receives the identifier Y0 and the reception signal /RI.

Referring to FIG. 28, assume that the reception signal /RI from receiving side data transmitter 252 is at the high level and the identifier Y0 is at the low level. It is assumed that the reception signal /RIN is at the high level, as shown in FIG. 35 (N). The output of NAND gate 300 is at the high level. The output of NAND gate 302 is also at the high level. Reception signal /RIN is at the high level as mentioned above, the output of NAND gate 304 is at the high level, the output of NAND gate 306 is at the low level, and the state of the flipflop constituted by NAND gates 304 and 306 is stable.

Assume that the reception signal /RI from receiving side data transmitter 252 falls to the low level. In this case, outputs from NAND gates 300 and 302 do not change, and therefore reception signal /RIN remains at the high level.

Assume that the identifier Y0 rises from the low level to the high level as described above. The output of NAND gate 300 is kept at the high level. However, the output from NAND gate 302 attains to the low level. Since one input attains to the low level, the output of NAND gate 306 attains to the high level, and the output of NAND gate 304 changes to the low level. The state of the flipflop constituted by NAND gates 304 and 306 is thus made stable. More specifically, after the reception signal /RI attains to the low level and the identifier Y0 changes from the low level to the high level, the reception signal /RIN falls from the high level to the low level, as shown in FIG. 35 (N).

In response to the fall of the reception signal /RIN from the high level to the low level, the transfer control mechanism 264 shown in FIG. 23 lowers the latch signal CP0 to be applied to data latch circuit 260 from the high level to the low level (FIG. 35 (D)). Transfer control mechanism 264 also responds to the fall of the reception signal /RIN to the low level and raises the transmission signal /COUT to the transmitting side transmission control circuit 266 from the low level to the high level (FIG. 35 (F)).

In the receiving side data transmitter 252 shown in FIG. 29, the following operation takes place. Referring to FIG. 35 (L), when reception signal /ROUT falls from the high level to the low level and further, as shown in FIG. 35 (I), the identifier Y0 rises to the high level indicating the third data, then the receiving side transmission control circuit 324 applies a latch signal to data latch circuit 314. In response to the latch signal, data latch circuit 314 latches transmission data Y1 to Yn (C1 to Cn) applied from transmitting side data transmitter 250, and applies the same as data DIC to the third n bits of inputs of data latch circuit 320, as shown in FIG. 35 (Q). Data latch circuit 314 also latches the identifier Y0 (high level) transmitted from transmitting side data transmitter 250, and applies the same to detecting circuit 318.

Generation of the latch signal from receiving side transmission control circuit 324 to data latch circuit 314 is carried out in the following manner. Referring to FIG. 31, the latch signal to data latch circuit 314 is generated by latch signal generating circuit 342. The latch signal is generated based on the identifier Y0 and the reception signal /RI from reception signal generating circuit 314.

As described above, reception signal /RI has fallen from the high level to the low level as shown in FIG. 35(M). The identifier Y0 has risen from the low level to the high level as shown in FIG. 35(I). Therefore, the NAND gate 360 of latch signal generating circuit 342 shown in FIG. 33 rises its output from the low level to the high level at the time point when the reception signal /RI falls to the low level and the identifier Y0 rises to the high level. This signal is applied to the clock terminal of data latch circuit 314. The above described relations is as shown in (I), (L), (M) and (Q) of FIG. 35.

Again referring to FIG. 35 (F), as the transfer control mechanism 264 raises the transmission signal /COUT to the high level, transmitting side transmission control circuit 266 shown in FIG. 23 operates in the following manner. First, the transmitting side transmission control circuit 266 raises transmission signal /CO applied to the receiving side data transmitter 252 from the low level to the high level, as shown in FIG. 35 (G). Further, transmitting side transmission control circuit 266 raises selection signal S2 applied to multiplexer 262 from the low level to the high level as shown in FIG. 35 (H). The signal S2 is at the low level. Accordingly, multiplexer 262 (FIG. 23) selects n bits of data (D1 to Dn) applied to the fourth input D and output the same as transmission data Y1 to Yn (FIG. 35 (J)), in accordance with Table 1. As shown in FIG. 24, multiplexer 262 further selects and outputs the logic "0" (low level) applied to the fourth input terminal D0 as the identifier Y0. Namely, the identifier Y0 falls from the high level to the low level (FIG. 35 (I)).

The above described operation of the transmitting side transmission control circuit 266 is carried out in the following manner. Referring to FIG. 25, transmission signal /COUT from transfer control mechanism 264 is applied to one input of transmission control signal generating circuit 272 and to one input of multiplexer driving signal generating circuit 270. The identifier Y0 is applied to the other input of the transmission control signal generating circuit 272.

Referring to FIG. 26, the NAND gate 280 of multiplexer driving signal generating circuit 270 operates in the following manner. Assume that transmission signal /CO from transmission control signal generating circuit 272 is at the low level as shown in FIG. 35 (G), and the transmission signal /COUT rises from the low level to the high level as shown in FIG. 35 (F). In this case, the output of NAND gate 380 rises from the low level to the high level. Therefore, the aforementioned selection signal S1 attains to the high level. Consequently, the above described selection is carried out by the multiplexer 262, and the logic "0" (low level) applied to the input D0 is output as the identifier Y0.

Referring to FIG. 27, when the identifier Y0 changes to the low level and the transmission signal /COUT changes to the high level, respectively, the transmission control signal generating circuit 272 raises the transmission signal /CO output therefrom from the low level to the high level as described in the following.

The output of NAND gate 290 attains to the low level. Therefore, the output of NAND gate 292 tends to attain to the high level. Meanwhile, both inputs to NAND gate 294 changed to the high level. Consequently, the output of NAND gate 294 attains to the high level 1. The state of the flipflop circuit constituted by NAND gates 292 and 294 is fixed at this state. Namely, the transmission control signal generating circuit 272 raises the transmission signal /CO output therefrom from the low level to the high level, as shown in FIG. 35(G).

Referring to FIG. 29, in response to the rise of the transmission signal /CO from the transmitting side transmission control circuit 266 from the low level to the high level and the fall of the identifier Y0 transmitted from the transmitting side data transmitter to the low level, the receiving side transmission control circuit 324 operates in the following manner. First, the receiving side transmission control circuit 324 raises the transmission signal /CIN from the low level to the high level as shown in FIG. 35(K). This is carried out in the following manner.

Referring to FIG. 31, transmission signal /CO and the identifier Y0 are input to transmission signal generating circuit 340.

Referring to FIG. 32, in response to the change of the identifier Y0 to the low level and the change of the transmission signal /CO to the high level, the transmission signal generating circuit 340 raises the transmission signal /CIN output therefrom from the low level to the high level. Assume that the identifier Y0 is at the high level and the transmission signal /CO is at the low level. In this case, the flipflop constituted by the NAND gate 354 and 356 maintain the previous state. In that case, as can be seen from FIGS. 35(G), (I) and (K), the transmission signal CIN is at the low level. Even if the identifier Y0 only attains to the low level, the transmission signal /CIN is kept at the low level. Even when the transmission signal /CO only changes to the high level, the value of the transmission signal /CIN is also kept as it is. The transmission signal /CIN rises from the low level to the high level only when the identifier Y0 changes to the low level and the transmission signal /CO changes to the high level.

Referring to FIGS. 29 and 35(K) and (L), in response to the rise of the transmission signal /CIN to the high level, transfer control mechanism 952 raises the reception signal /ROUT after a prescribed delay. In response to the rise of the transmission signal /CIN, transfer control mechanism raises the latch signal CPI to the data latch circuit 320 of FIG. 29, as shown in FIG. 35(S).

In response to the rise of CP1, data latch circuit 320 latches four data groups DIA, DIB, DIC and DID each including n bits applied to four inputs, and apply these data groups as 4n bits of data DI to the receiving side data terminal equipment 342. As the data DID, data DI to DN from the input D selected by the multiplexer 262 are directly applied. Therefore, 4n bits of data latched in data latch circuit 320 are the copies of data previously latched by data latch circuit 260. By applying 4n bits of data DI output from data latch circuit 320 to the receiving side data terminal equipment 242, transmission of 4n bits of data between data terminal equipments 240 and 242 is completed. This relation is shown in FIGS. 35(S) and (V).

Referring to FIG. 30, to the four inputs of NAND gate 370 of detecting circuit 318, the identifier Y0 which is being transmitted at present from multiplexer 262 (FIG. 23) and identifiers latched in data latch circuits 310, 312, and 314 are applied respectively. When data A0 to An, B0 to Bn and C0 to Cn are latched in data latch circuits 310, 312 and 314, respectively, and when transmission data output from multiplexer 262 are D1 to Dn, then the identifiers input to AND gate 330 will be "0", "1", "0" and "1" in this order from the top to the bottom. Therefore, in this case, and only in this case, the AND gate 330 applies a high level signal to the data latch circuit 320. Otherwise, AND gate 330 always applies a low level signal to data latch circuit 320.

As described above, data latch circuit 320 latches the output of detecting circuit 318 in response to the rise of latch signal CP1 applied from transfer control mechanism 952 and applies this to one input of NAND gate 322. Latch signal CP1 is input to the other input of NAND gate 322. Therefore, the detection signal MO output from NAND gate 322 is as shown in FIG. 35(W). It should be noted that the detection signal MO having the waveform of FIG. 35(W) is obtained only when the detection signal output from data latch circuit 320 is at the high level. Assume that the data transmission is not successful and the output of the detection circuit 318 remains at the low level. If the data is latched by data latch circuit 320, the output of NAND gate 322 is always kept at the low level regardless of the level of CP1. Therefore, it can be determined that the data transmission is not successful if the signal CP1 is at the high level and the detection signal MO is at the low level.

The operations of the receiving side transmission control circuit 324, the transfer control mechanism 952, the transmitting side transmission control circuit 266 and the transfer control mechanism 264 are almost the same as those of the interface apparatus described in the third embodiment. Therefore, detailed description thereof is not repeated.

As described above, by the interface apparatus in accordance with the fifth embodiment, transmission of data of 4n bits between two data terminal equipments can be carried out by using a data transmission path having the width of n+1 bits and two signal lines for transmission control signals, in one cycle of the operation of each data terminal equipment. Therefore, when a transmission path having the same bit line width is used, the amount of data transmission per a unit time can be increased approximately to four times that of the conventional interface apparatus. If the amount of data transfer is kept constant, the necessary data transmission can be done by using a transmission path having the bit width of approximately one fourth.

In this fifth embodiment also, whether or not the data output from multiplexer has been established as correct data is confirmed both in the transmitting side and the receiving side and then the data transmission is carried out. Therefore, the data transmission has high reliability. In addition, whether or not the data applied to data latch circuits 320 of receiving side data transmitter 252 have been correctly set up is detected by detecting circuits 318, and according to the result of detection, it can be determined whether or not the data transmission is correctly carried-out. Therefore, data transmission without any error can be carried out.

[Sixth Embodiment]

In the interface apparatus in accordance with the sixth embodiment, transmission of data of 4n bits between transmitting side data terminal equipment and receiving side data terminal equipment is carried out by using a data transmission path having the width of n bits in accordance with the synchronous transfer system. The feature of the interface apparatus in accordance with the sixth embodiment is that a multiplying circuit is provided in the transmitting side data transmitter to generate a clock signal having the frequency which is an integer multiple of the transmission control signal, which clock signal is used for data transmission with the receiving side data transmitter 384. In receiving side data transmitter 384, the transmission control signal having its frequency multiplied applied from transmitting data transmitter 382 is divided, so that the original transmission control signal is obtained and applied to the receiving side data terminal equipment 242.

Figure 36:
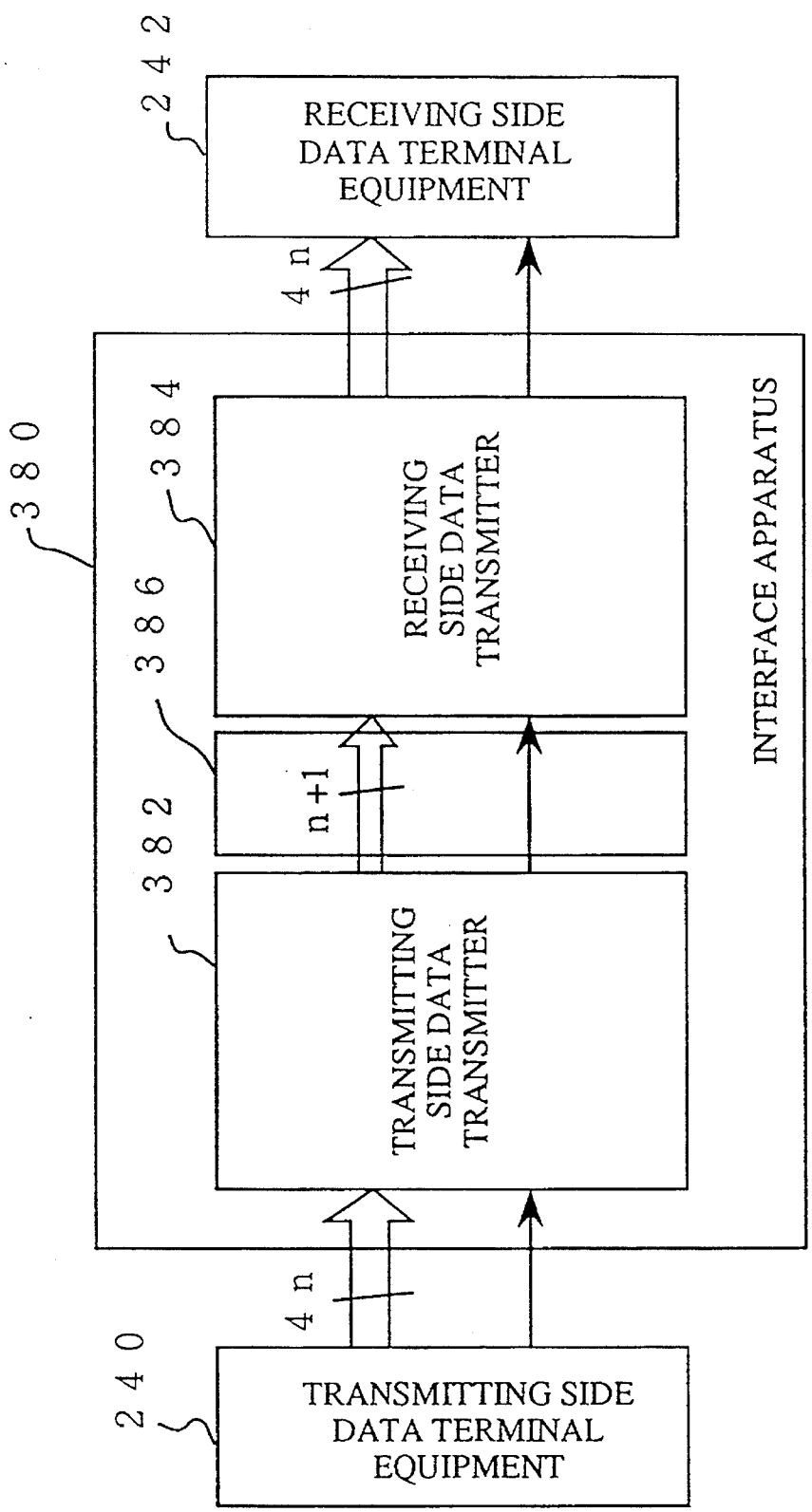
FIG. 36 is a schematic block diagram of the interface apparatus in accordance with the sixth embodiment of the present invention.
Figure 37:
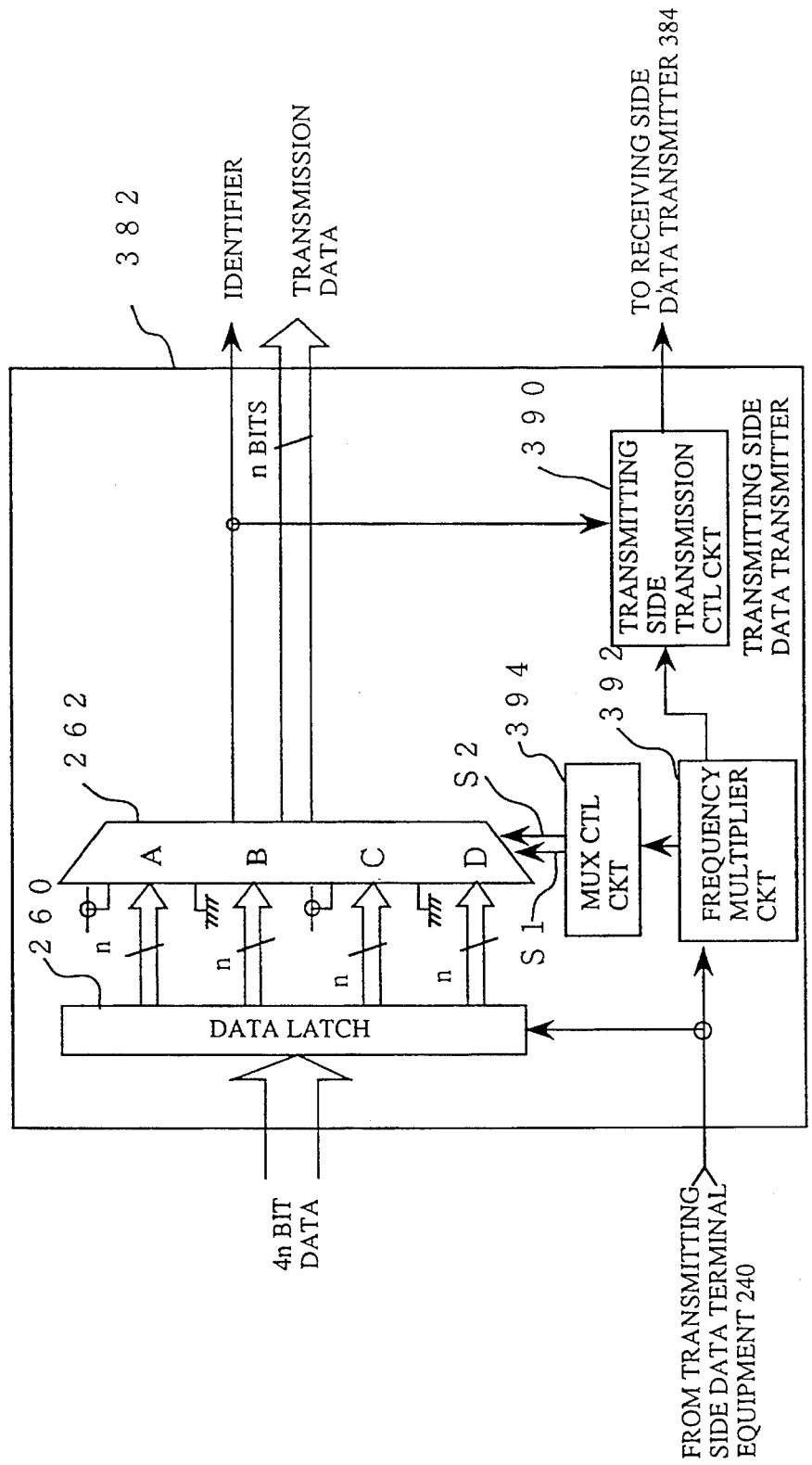
FIG. 37 is a block diagram of the transmitting side data transmitter.
Figure 38:
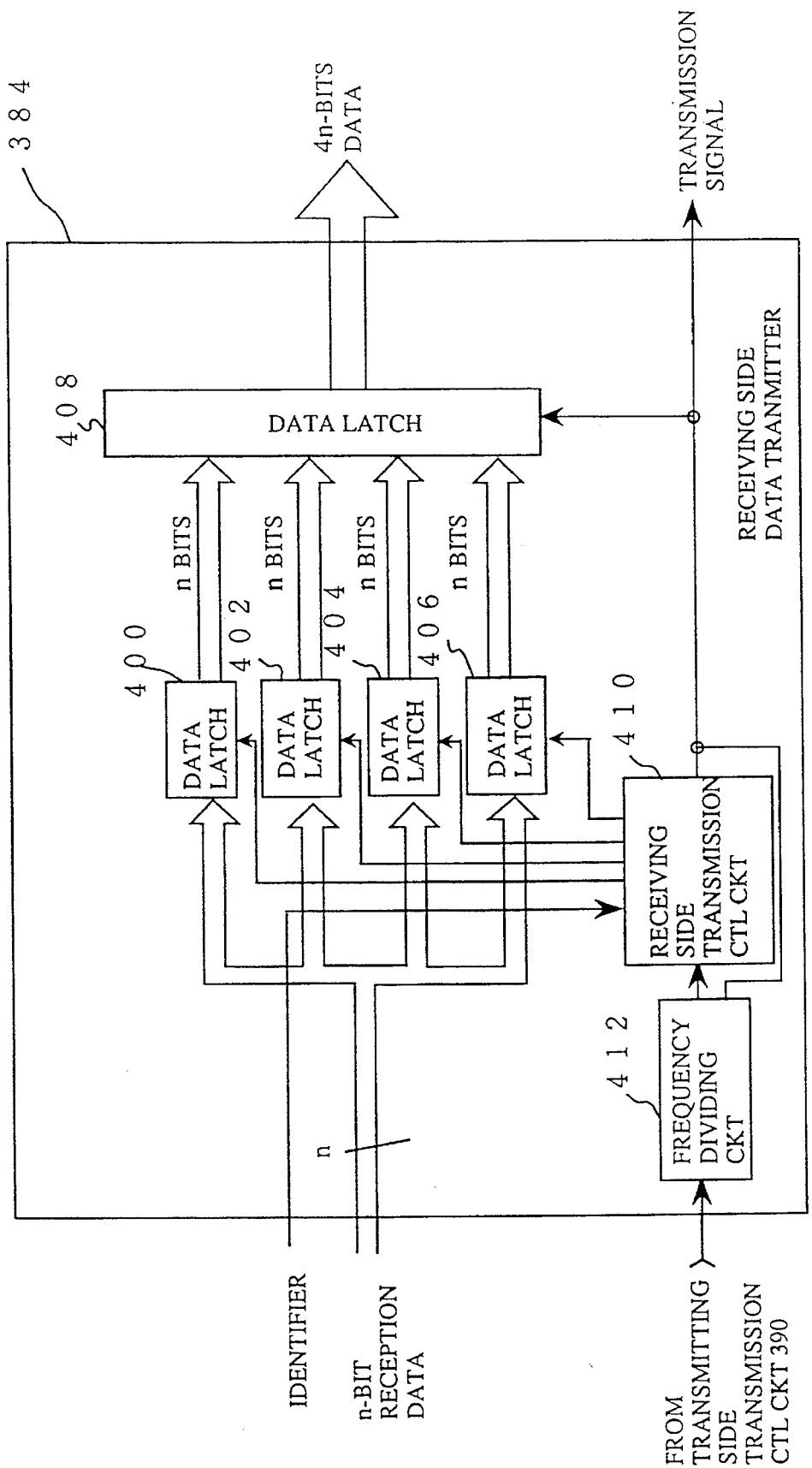
FIG. 38 is a block diagram of the receiving side data transmitter.

FIGS. 36 to 38 are block diagrams showing schematic structure of the interface apparatus in accordance with the sixth embodiment.

Referring to FIG. 36, the interface apparatus 380 in accordance with the sixth embodiment is provided for carry out data transmission of 4n bits of data between transmitting side data terminal equipment 240 and receiving side data terminal equipment 242 in accordance with the synchronous transfer system. The data transmission path used has n bits.

Referring to FIG. 36, interface apparatus 380 includes a transmitting side data transmitter 382, a receiving side data transmitter 384 and a data transmission 386 for connecting these two transmitters 382 and 384. To the transmitting side data transmitter 382, 4n bits of data for transmission and a transmission control signal for synchronous transmission are applied from transmitting side data terminal equipment 240. The transmission control signal is a clock signal having a constant frequency.

The data transmission path 386 includes a data transmission path having the width of n bits and a signal line for the transmission control signal. One end of each of these signal lines is connected to corresponding output terminal of transmitting side data transmitter 382 and the other end of each of these signal lines is connected to corresponding input terminal of receiving side data transmitter 382.

Receiving side data transmitter 384 applies 4n bits of data and a transfer control signal to receiving side data terminal equipment 242.

Referring to FIG. 37, transmitting side data transmitter 382 includes a data latch circuit 260 having the width of 4n bits, a multiplexer 262, a frequency multiplier circuit 392, a transmitting side transmission control circuit 290, and a multiplexer control circuit 394 based on the clock signal having the multiplied frequency output from frequency multiplier circuit 392 for outputting a signal for controlling multiplexer 262. Data latch circuit 260 and multiplexer 262 are the same as the data latch circuit 260 and the multiplexer 262 of the fifth embodiment shown in FIG. 23.

Based on the transmission control signal having its frequency multiplied applied from frequency multiplier circuit 392, multiplexer control circuit 292 generates selection signals 51 and 52 such as those already shown in Table 1 and applies these signals to the control terminals of multiplexer 262. Multiplexer control circuits 394 can be readily formed by using, for example, a counter circuit.

A common frequency multiplier circuit of the clock signal can be used as the frequency multiplier circuit 392. Transmitting side transmission control circuit 390 detects whether or not the data output from multiplexer 262 have been established at proper values based on the identifier output from multiplexer 262 and the transmission control signal applied from frequency multiplier circuit 392, and transmits the transmission control signal to the receiving side data transmitter 384. Transmitting side transmission control circuit 390 can be structured as, for example, transmission control circuit 142 shown in FIG. 11 or transmission signal generating circuit 340 shown in FIG. 32.

Referring to FIG. 38, receiving side data transmitter 384 includes four data latch circuits 400, 402, 404 and 406 each having the width of n bits and having its input connected to the transmission path of n bits of data from transmitting side data transmitter 382, a data latch circuit 408 having the width of 4n bits and four inputs each having the width of n bits connected to the outputs of data latch circuits 400, 402, 404 and 406, respectively, a receiving side transmission control circuit 410 and a frequency dividing circuit 412.

Based on the identifier transmitted from transmitting side data transmitter 382 and the transmission control signal applied from transmitting side transmission control circuit 390, the receiving side transmission control circuit 410 generates a latch signal to be applied to data latch circuits 400, 402, 404 and 406 such that the data selected by multiplexer 262 are stored in corresponding one of the data latch circuits 400, 402, 404 and 406. In accordance with the value of the applied identifier, the receiving side transmission control circuit 410 detects whether or not the data transmitted have established to proper values, and outputs a transmission control signal to dividing circuit 412.

Frequency dividing circuit 412 frequency-divides the transmission control signal, the frequency of which has been multiplied, applied from receiving side transmission control circuit 410 so as to obtain the transmission control signal of the original frequency and applies this signal to the receiving side data terminal equipment 242 (FIG. 36) and the data latch circuit 408 of the succeeding stage.

Referring to FIGS. 36 to 38, the interface apparatus 380 of the sixth embodiment operates in the following manner. The transmitting side data terminal equipment 240 applies collectively the data of 4n bits to data latch circuit 260 of transmitting side data transmitter 382. In response to the rising timing of the transmission control signal applied from transmitting side data terminal equipment 240, data latch circuit 260 latches the 4n bits of data, divide the 4n bits of data into four data groups each having n bits, and applies these groups to four inputs A, B, C and D of multiplexer 262, respectively. Corresponding to the respective inputs A, B, C and D of multiplexer 262, signals having the logic values of "1", "0", "1" and "0" are added as identifiers, respectively.

The frequency multiplier circuit 392 multiplies by two or four, for example, the frequency of the transmission control signal applied from transmitting side data terminal equipment 240 and applies the resulting signal to multiplexer control circuit 394 and transmitting side transmission control circuit 390. Based on the clock signal applied from the multiplier circuit 392, multiplexer control circuit 394 generates a control signal such that four inputs of the multiplexer 262 are selected in this order in one cycle of the transmission control signal, and applies the generated signal to multiplexer 262. In response to the control signal, multiplexer 252 selects and outputs time sequentially the n bits of data at each of the four inputs together with the corresponding identifier in one cycle of the transmission control signal applied from the transmitting side data terminal equipment 240. The identifier data is also applied to the transmitting side transmission control circuit 390.

Transmitting side transmission control circuit 390 confirms whether or not the identifier output from multiplexer 362 changes in the order of high level, low level, high level and low level in one cycle of the original transmission control signal, based on the transmission control signal provided from multiplier circuit 392. When the change of the identifier in the above mentioned order is detected, it applies the transmission control signal to receiving side data transmitter 382 in response to each detection of the change.

Referring to FIG. 38, receiving side transmission control circuit 410 confirms whether or not the applied identifier changes from high level to the low level and further to the high level and again to the low level in the similar manner as the transmitting side transmission control circuit 390. Every time such change is detected, the receiving side transmission control circuit 410 provides a latch signal to the data latch circuit corresponding to the input selected by the multiplexer 262 among the data latch circuits 400, 402, 404 and 406. Thus that one of the data latch circuits 400, 402, 404 and 406 which corresponds to the data transmitted from transmitting side data transmitter 382 latches the data, and applies the data to the corresponding data input having the width of n bits of the data latch circuit 408.

Further, receiving side transmission control circuit 410 applies the transmission control signal to the dividing circuit 412 every time it confirms the aforementioned change of the identifier. The transmission control signal applied at this time is the transmission control signal having its frequency multiplied by the multiplier circuit 392 of FIG. 37.

Dividing circuit 412 divides the transmission control signal having its frequency multiplied such that the multiplexer by the multiplier circuit 392 is canceled, and thus the transmission control signal of the original frequency is generated and output. The transmission control signal output from dividing circuit 412 is applied to data latch circuit 408. By this time, corresponding n bits of data of 4n bits of data have been already stored in each of the data latch circuits 400, 402, 404 and 406, data latch circuit 408 latches these 4n bits of data and applies the data as 4n bits of data DI to receiving side data terminal equipment 212.

Referring to FIG. 39, a transmission control signal having a prescribed frequency(FIG. 39(A)) is applied to frequency multiplier circuit 392 shown in FIG. 37. The transmission control signal (transmission signal) has its frequency doubled by the frequency multiplier circuit 392, and applied to the transmitting side transmission control circuit 390 (FIG. 39(B)). The frequency multiplier circuit 392 also generates a signal by multiplying the frequency of the applied transmission signal by a factor of 4, and applies the resulting signal to multiplexer control circuit 394(FIG. 39(C)). Multiplexer control circuit 394 generates multiplexer control signals S1 and S2 shown in FIG. 37 by counting the number of pulses of this input signal. The transmitting side transfer control circuit 390 shown in FIG. 37 responds to the transmission signal (FIG. 39(B)) which has its frequency doubled and applied from the multiplier circuit 392, and the identifier signal added to each of the n-bit data groups output from multiplexer 262 and, after confirming that the correct data group output is established, provides the transmission signal (transmission control signal) to the receiving side data transmitter 384 (FIG. 39(D)). As described above, in one cycle of the transmission signal input to the multiplier circuit 392, four pulses are input to multiplexer control circuit 394. Therefore, signals S1 and S2, which can assume four value combinations in one cycle of the transmission signal, can be generated by multiplexer control circuit 394.

At this time, multiplexer 262 selects a signal determined in accordance with the table 2 below and provides the same to receiving side data transmitter 384.

TABLE 2

| S1 | S2 | OUTPUT |
|----|----|--------|
| 0  | 0  | A0-An  |
| 1  | 0  | B0-Bn  |
| 0  | 1  | C0-Cn  |
| 1  | 1  | D0-Dn  |

Figure 40:
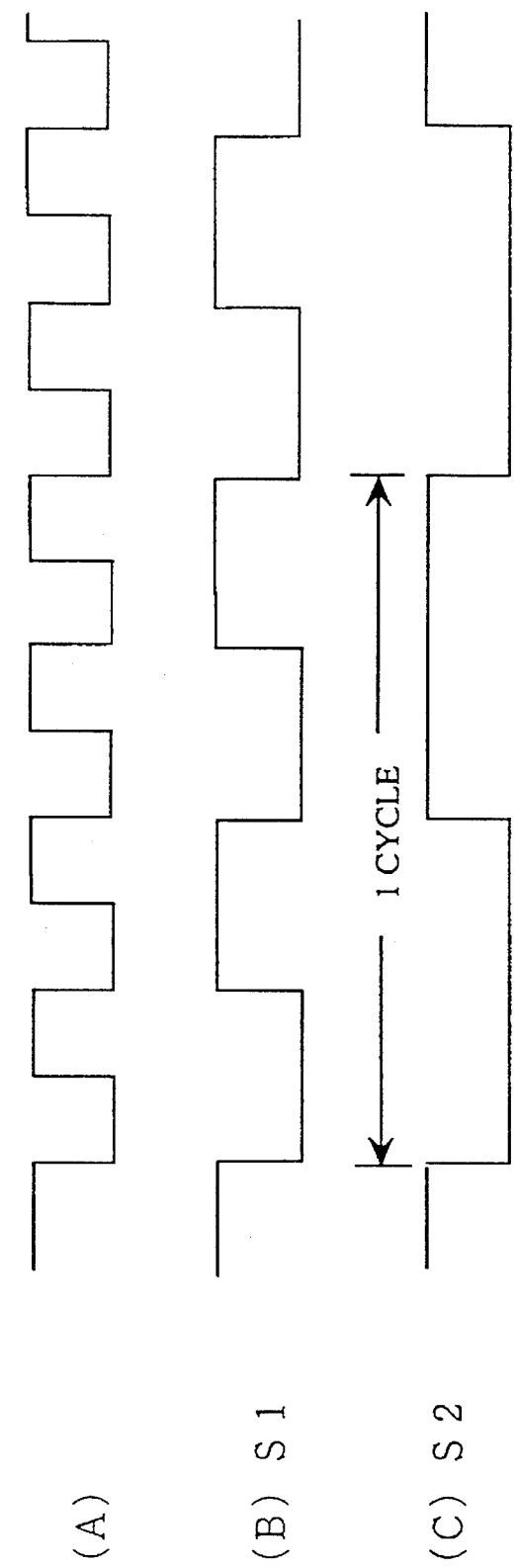
FIG. 40 is a diagram of waveforms showing the operation of the multiplexer control circuit 394.

Multiplexer control circuit 394 generates, from the input signal, signals S1 and S2 in the following manner. FIG. 40(A) shows a signal applied from multiplier circuit 292 to multiplexer control circuit 394. Multiplexer control circuit 394 can generate, by a counter circuit, the signals S1 and S2 shown in FIGS. 40(B) and (C), respectively. If the signals S1 and S2 which each assume "0" or "1" represent a binary number "S1S2", it can assume all the values from 0 to 3 in 1 cycle. Therefore, multiplexer 262 can output all the four inputs once in one cycle of transmission signal when it operates in the manner as shown in Table 2, in accordance with the value determined by the signals S1 and S2.

In the above description, the frequency of the signal applied from multiplier circuit 392 to multiplexer control circuit 394 was four times that of the transmission signal applied to multiplier circuit 392. However, it is not necessary to multiply the frequency of transmission signal by the factor of 4. For example, if multiplexer control circuit 395 includes a counter which counts both the change of state from the high level to the low level and the change from the low level to the high level of the signal, the frequency of the signal applied to multiplexer control circuit 394 may be only the double of the frequency of the original transmission signal, as shown in FIG. 39(B).

Figure 41:
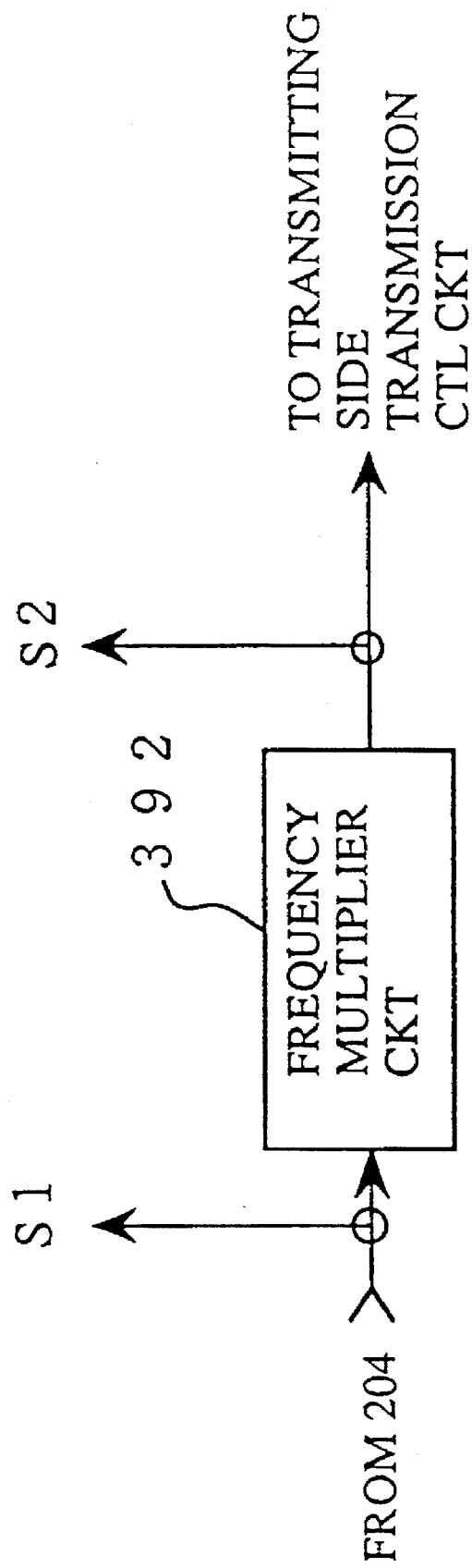
FIG. 41 is a schematic block diagram showing the simplest method of generating the multiplexer control signal using multiplier circuit 392.

The following structure is the simplest form for generating a multiplexer control signal which can assume four values in one cycle of the transmission signal applied to transmitting side data transmitter 382. Referring to FIG. 41, the signal S1 is taken from the input side of multiplier circuit 392, and the signal S2 is taken from the output of multiplier circuit 392. It is assumed that the multiplier circuit 392 provides a signal having a frequency twice that of the frequency of the applied transmission signal.

Figure 42:
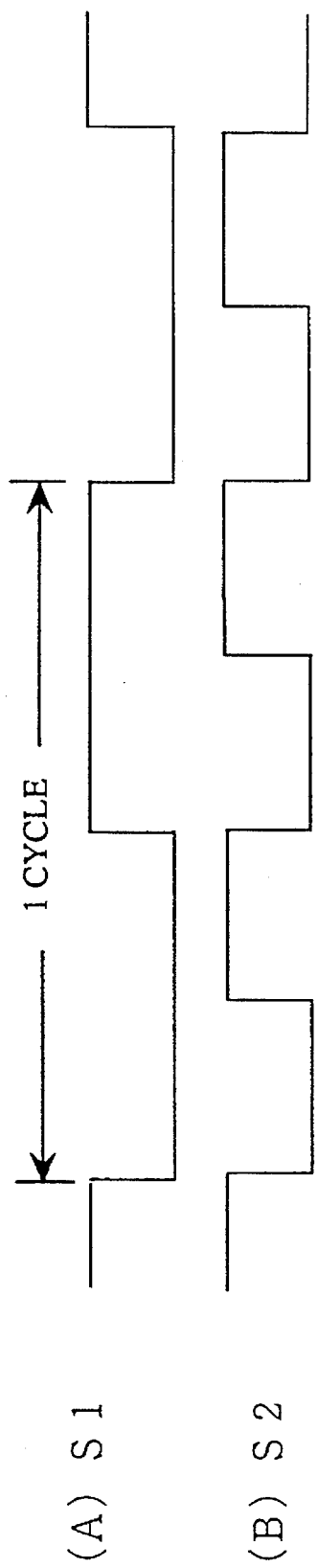
FIG. 42 is a waveform diagram for showing the operation of the frequency multiplier circuit.

Referring to FIG. 42(A), one cycle of the signal S1 is the same as one cycle of the transmission signal. Referring to FIG. 42(B), the signal S2 includes two pulses in one cycle of signal S1. Therefore, by combining the signals S1 and S2, a multiplexer control signal which assumes four values in turn in one cycle of the transmission signal can be obtained. If the signals S1 and S2 change in the manner as shown in FIG. 42, the multiplexer 262 can carry out desired operation if it operates in accordance with Table 3 below.

TABLE 3

| S1 | S2 | OUTPUT |
|----|----|--------|
| 0  | 0  | A0-An  |
| 0  | 1  | B0-Bn  |
| 1  | 0  | C0-Cn  |
| 1  | 1  | D0-Dn  |

Figure 43:
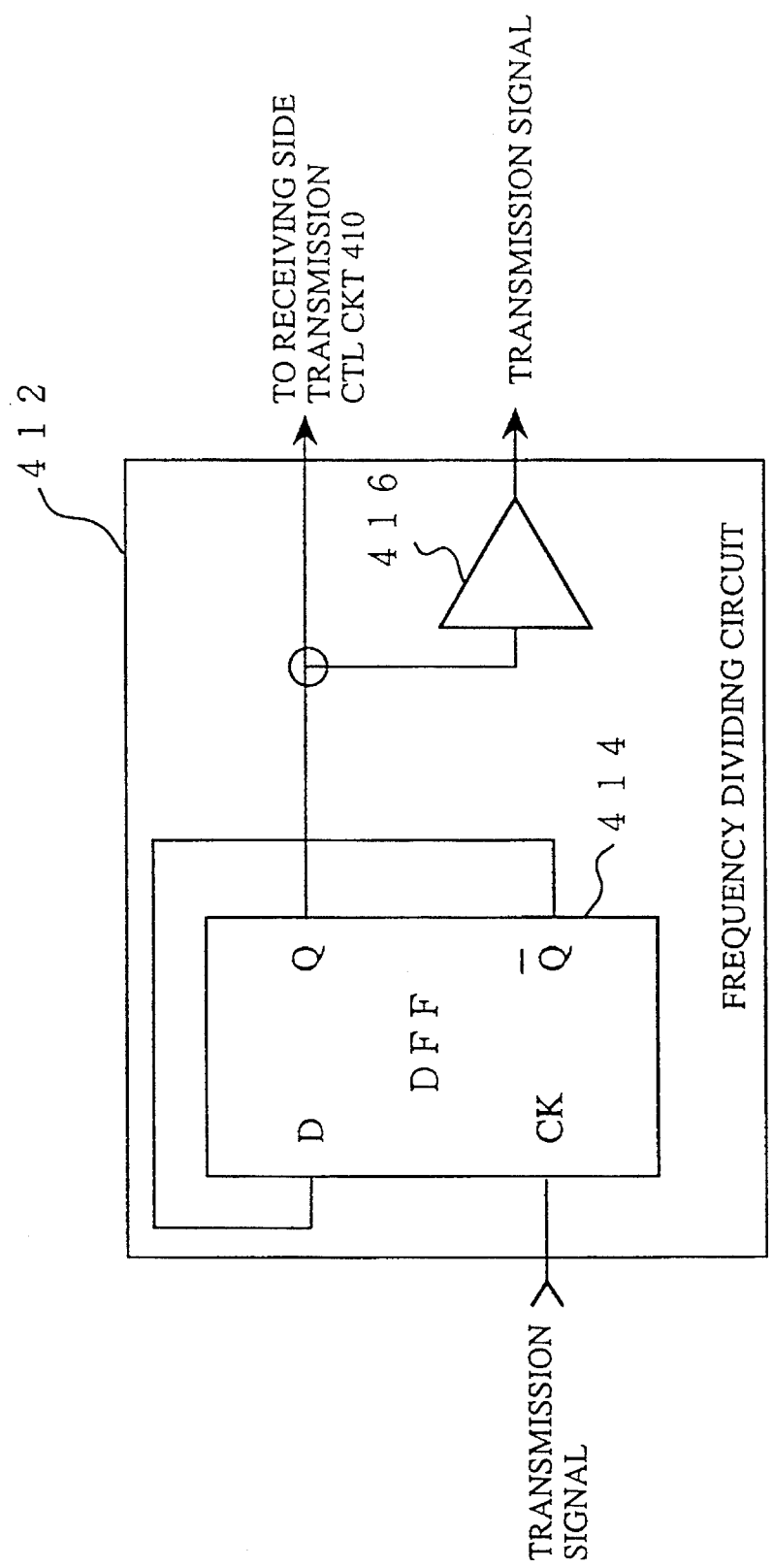
FIG. 43 is a block diagram of the frequency dividing circuit.

The frequency dividing circuit 412 shown in FIG. 38 has such a structure as shown in FIG. 43, for example. Referring to FIG. 43, the frequency dividing circuit 412 includes a D-flipflop 414 and a transmission signal driver 416.

A transmission signal is applied to a clock input of the D-flipflop 414. The /Q output is connected to the D input. The Q output is connected to the receiving side transmission control circuit 410.

The transmission signal driver 416 has its input connected to the Q output of the flipflop 414. The output of driver 416 is a transmission signal to receiving side data terminal equipment 242 (FIG. 36).

By the frequency dividing circuit shown in FIG. 43, the transmission signal having the frequency doubled by the multiplier circuit 392 of FIG. 37 is frequency-divided, and a transmission signal having the original frequency is applied to the receiving side transmission control circuit 410.

Figure 44:
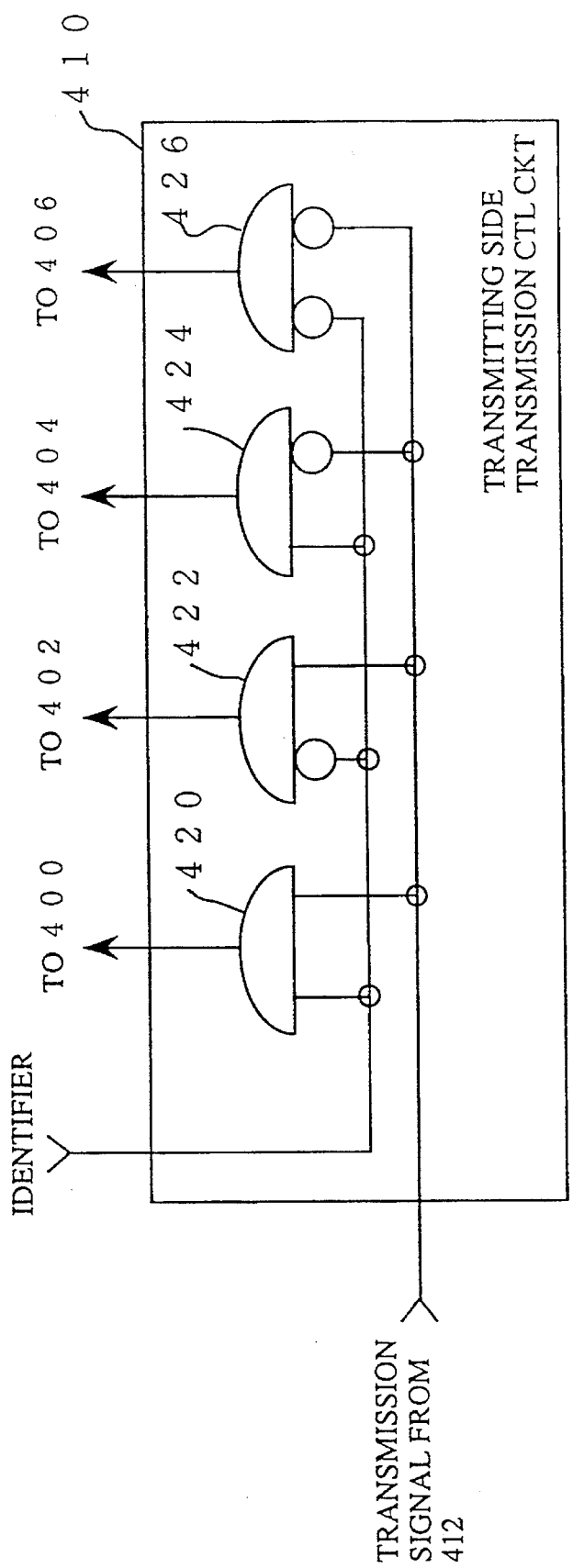
FIG. 44 is a schematic block diagram of the receiving side transmission control circuit 410.

FIG. 44 shows an example of the structure of the receiving side transmission control circuit 410. Referring to FIG. 44, the receiving side transmission control circuit 410 includes four AND gates 420, 422, 424 and 426.

The AND gates 420, 422, 424 and 426 are respectively connected to data latch circuits 400, 402, 404 and 406. An identifier is applied to one input of each of AND gates 420, 422, 424 and 426. The identifier is applied inverted to AND gates 422 and 426. The transmission signal from the dividing circuit 412 is applied to the other input of each of the AND gates 420, 422, 424 and 426. The transmission signal is inverted and applied to AND gates 424 and 426.

By the receiving side transmission control circuit 410 shown in FIG. 44, data latch signals are applied successively to data latch circuits 400, 402, 404 and 406, in accordance with the identifier and the transmission signal. Each data latch signal attains to the high level exclusively from other data latch signals, only once in one cycle of the transmission signal.

As described above, in the interface apparatus of the sixth embodiment, transmission of 4n bits of data between the transmitting side data terminal equipment 240 and the receiving side data terminal equipment 242 is carried out by using the signal line having the width of n bits in one cycle of operation of each of the data terminal equipments 240 and 242. Therefore, in the similar manner as described with reference to the five embodiments above, the amount of data transmission in a unit time can be increased approximately to four times that of the prior art. Since transmission is carried out using an identifier to confirm that the data to be transmitted are the correct data, the data transmission is highly reliable.

[Modification of the Sixth Embodiment]

Some modifications of the sixth embodiment will be described. The first modification is shown in FIGS. 45 to 48.

Figure 45:
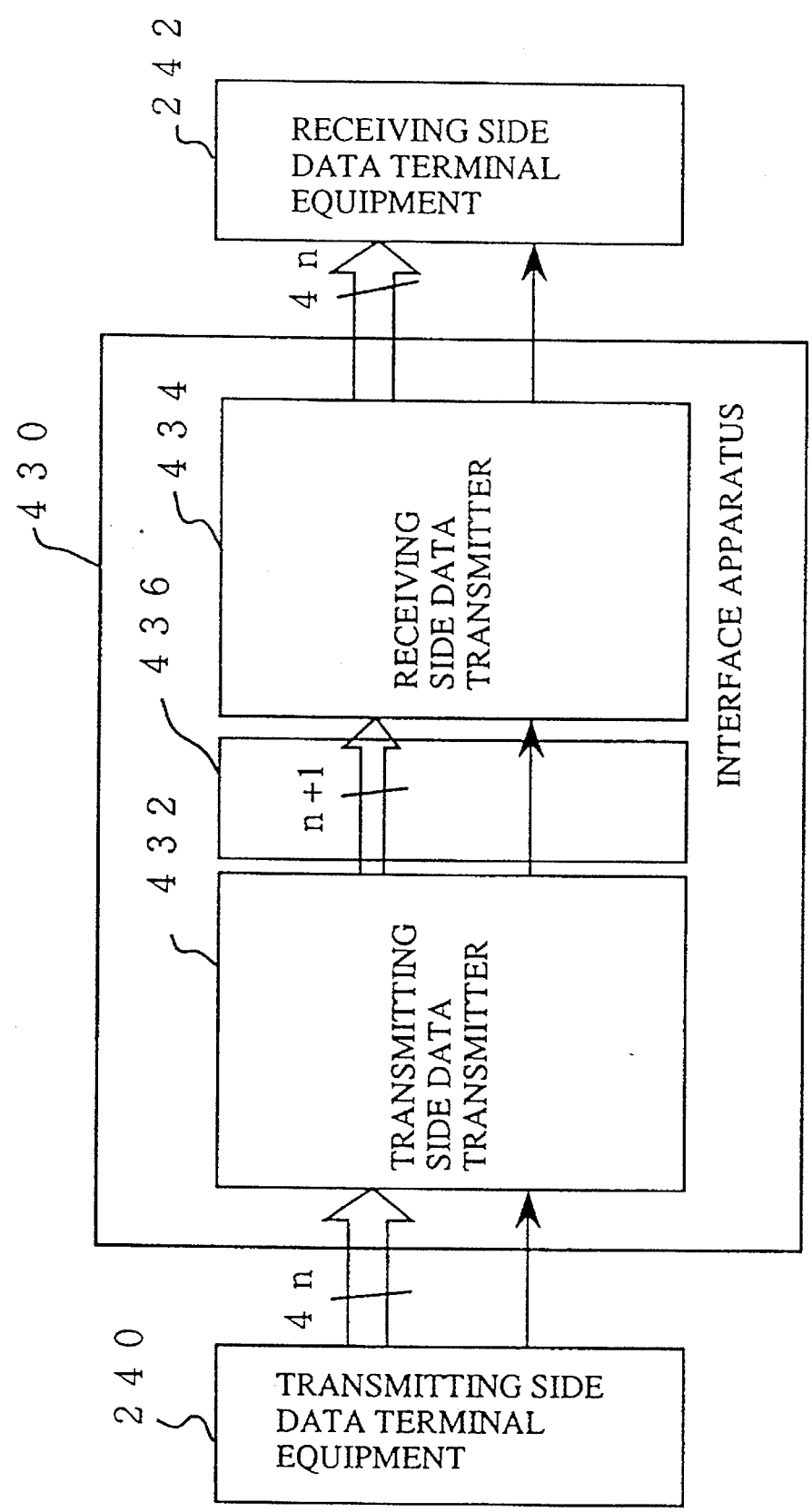
FIG. 45 is a block diagram of the interface apparatus in accordance with the first modification of the sixth embodiment.

Referring to FIG. 45, the interface apparatus 430 of the first modification includes, as in the sixth embodiment shown in FIG. 36, a transmission side data transmitter 432, a receiving side data transmitter 434 and a data transmission path 436. Interface apparatus 430 is also for data transfer between the transmitting side data terminal equipment 240 and the receiving side data terminal equipment 242. The data transmission path used has the width of n bits.

Figure 46:
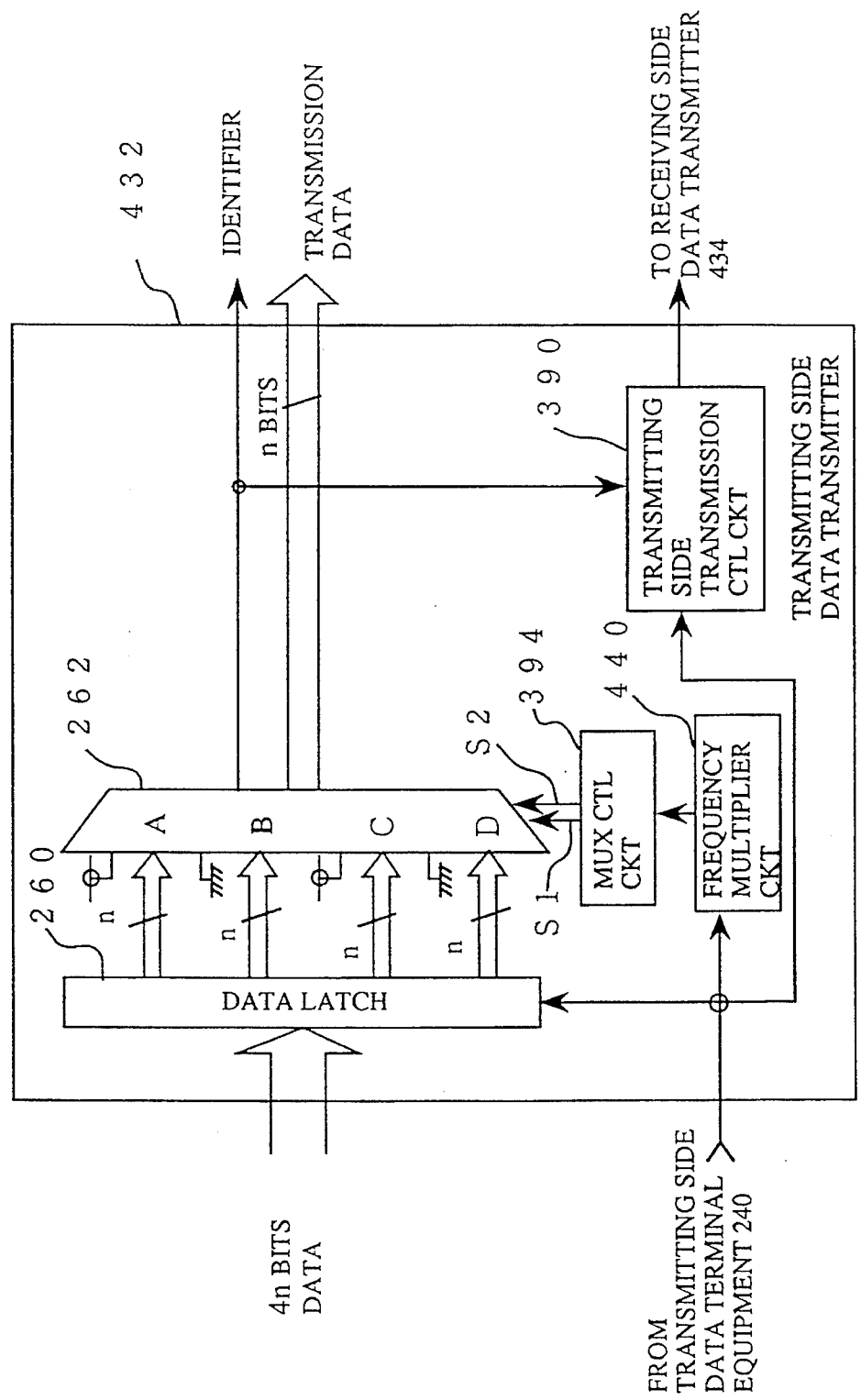
FIG. 46 is a block diagram of the transmitting side data transmitted of the interface apparatus shown in FIG. 45.

Referring to FIG. 46, the structure of the transmitting side data transmitter 432 is approximately the same as the transmitting side data transmitter 382 shown in FIG. 37. The transmitting side data transmitter 432 shown in FIG. 46 differs from the transmitting side data transmitter 382 shown in FIG. 37 in that not the output of multiplier circuit 392 such as shown in FIG. 37 but the transmission signal from the transmitting side data terminal equipment 240 is directly applied to the transmitting side transmission control circuit 390. In the transmitting side data transmitter 43 shown in FIG. 46, instead of the multiplier circuit 392 shown in FIG. 37, a frequency multiplier circuit 440 having only an output to the multiplexer control circuit 394 is used. In FIGS. 37 and 46, corresponding portions are denoted by the same reference characters and same labels. The functions are the same. Therefore, detailed description thereof is not repeated here.

The function of the frequency multiplier circuit 440 is similar to that of the multiplier circuit 392 shown in FIG. 37. However, in this multiplier circuit 440, it is not necessary to provide an output to the transmitting side transmission control circuit 390. The structure of the frequency multiplier circuit 440 differs from the multiplier circuit 390 of FIG. 37 only in this point.

Figure 47:
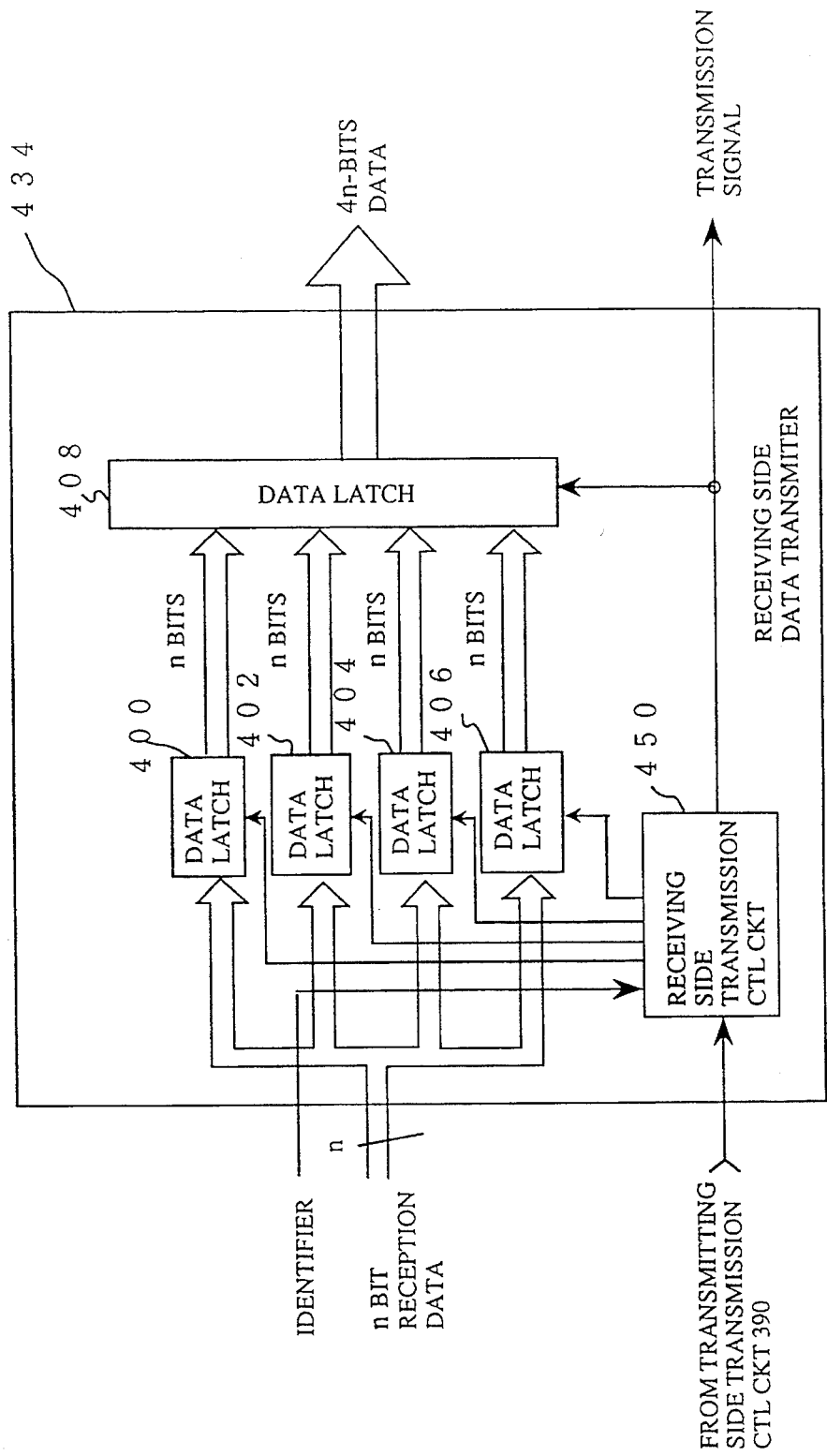
FIG. 47 is a block diagram of the receiving side data transmitter of the interface apparatus shown in FIG. 45.

Referring to FIG. 47, the receiving side data transmitter 436 has approximately the same structure as the receiving side data transmitter 384 of the sixth embodiment shown in FIG. 38 except that there is no dividing circuit 412. Therefore, in the receiving side data transmitter 434, instead of the receiving side transmission control circuit 410 shown in FIG. 38, a receiving side transmission control circuit 450 is used which directly receives the transmission signal from transmitting side transmission control circuit 390. In FIGS. 38 and 47, corresponding portions are denoted by the same reference characters and same labels. The functions are the same. Therefore, detailed description thereof is not repeated here.

Figure 48:
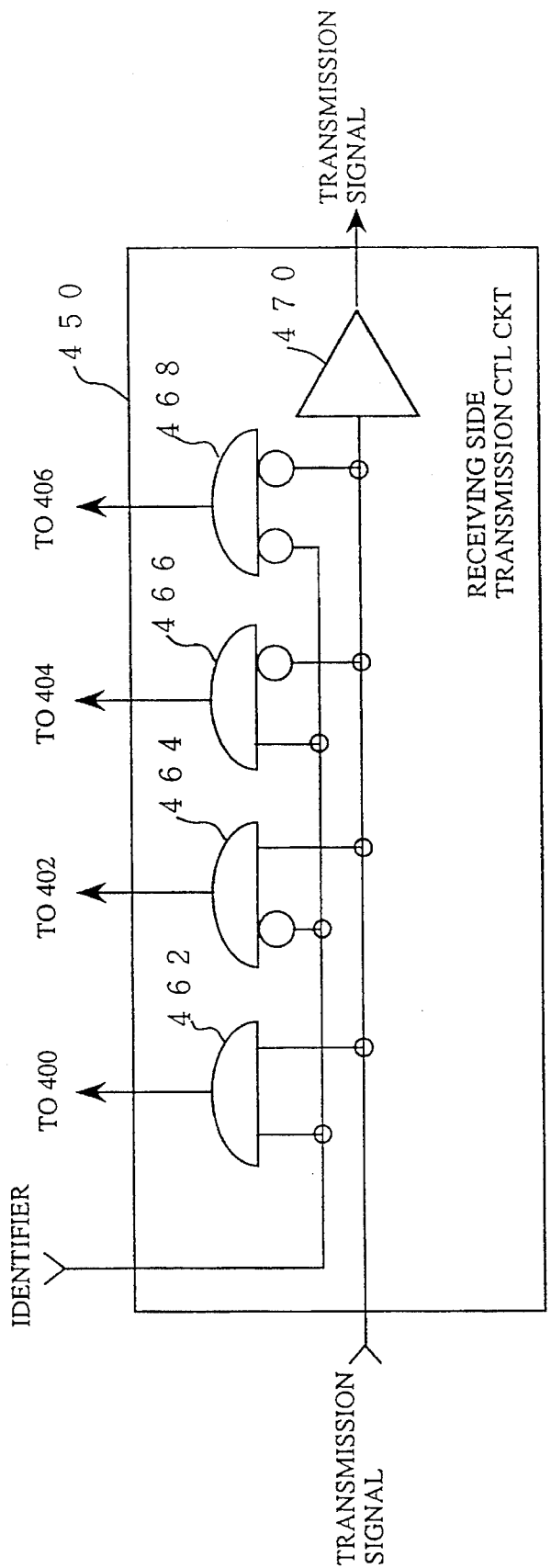
FIG. 48 is a schematic block diagram of the receiving side transmission control circuit.

Referring to FIG. 48, the receiving side transmission control circuit 450 includes 4 AND gates 462, 464, 466 and 468, as well as a transmission signal driver 470.

The AND gates 462, 464, 466 and 468 have their outputs connected to data latch circuits 400, 402, 404 and 406, respectively. To one input of each of the AND gates 462, 464, 466 and 468, the identifier is applied. The identifier applied to the AND gates 464 and 468 is inverted. To the other input of each of the AND gates 462, 464, 466 and 468, the transmission signal from the transmitting side transmission control circuit 390 is applied. The transmission signal applied to the AND gates 466 and 468 is inverted.

The transmission signal from the transmitting side transmission control circuit 390 is applied to the transmission signal driver 470. Driver 470 outputs the applied transmission signal after a delay. The delay time is to ensure a margin for the data setup output from the data latch circuits 400, 402, 404 and 406 when the data latch circuit 408 of the receiving side data transmitter latches the data.

In this modification, the frequency of the transmission signal transmitted from the transmitting side data transmitter 432 to the receiving side data transmitter 434 is the same as the transmission signal applied from the transmitting side data terminal equipment 240. Therefore, it is not necessary to employ complicated technique to transfer the transmission signal between the transmitting side data transmitter 432 and the receiving side data transmitter 434, and therefore the circuitry can be fabricated relatively easily. Since the dividing circuit is not necessary in the receiving side data transmitter 434, the structure of the receiving side data transmitter 434 can be made simple.

[Second Modification of the Sixth Embodiment]

Figure 49:
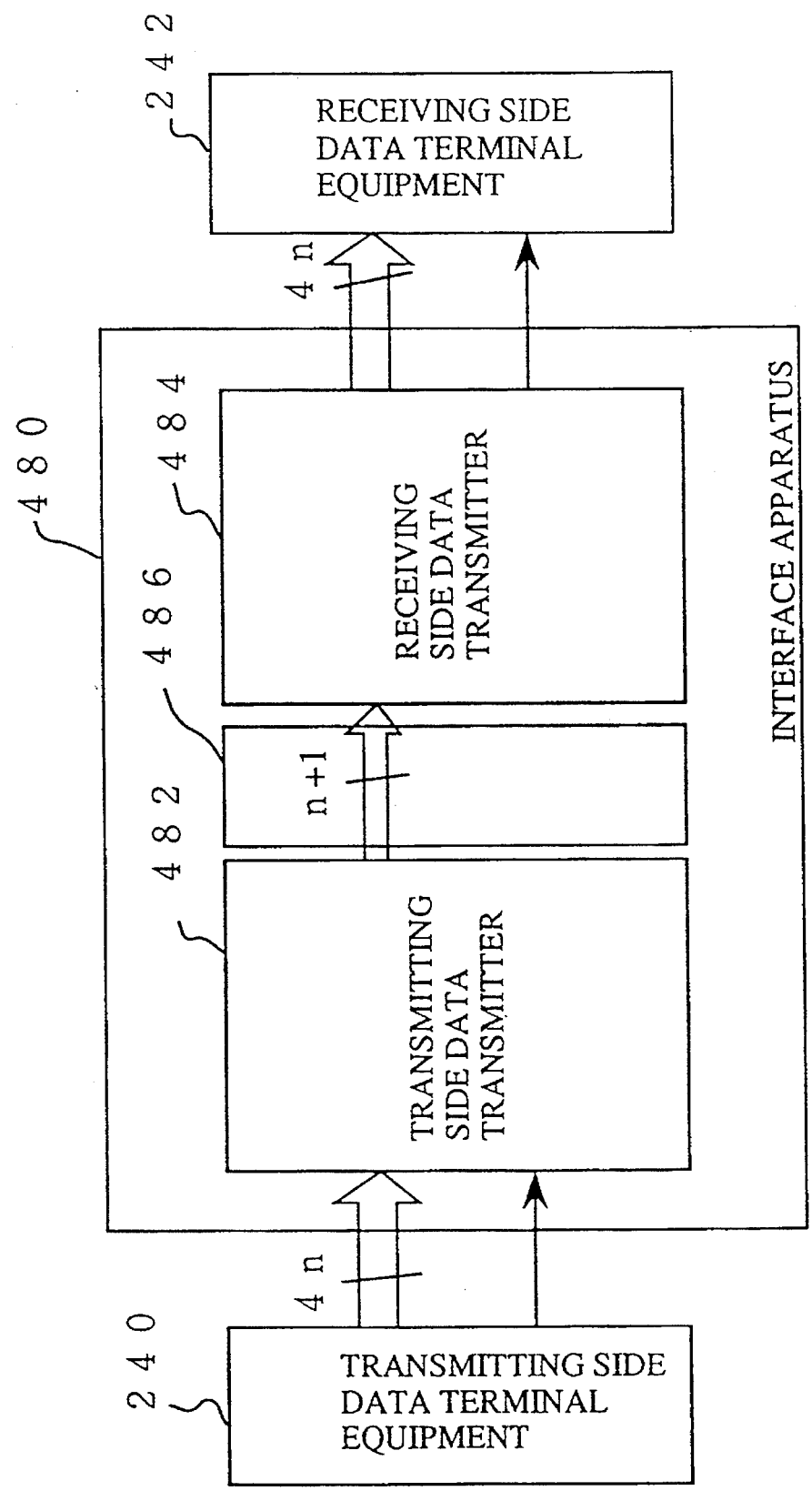
FIG. 49 is a block diagram of the second modification of the sixth embodiment.

FIGS. 49 to 52 show a second modification of the interface apparatus in accordance with the sixth embodiment. Referring to FIG. 49, the interface apparatus 480 of this modification is connected between the transmitting side data terminal equipment 240 and the receiving side data terminal equipment 242. The interface apparatus 480 includes a transmitting side data transmitter 482, a receiving side data transmitter 484 and a transmission path 486. The interface apparatus 480 is characterized in that the data line included in the transmission path 486 has the width of n+1 bits and that the signal line for the transmission control signal is not necessary.

Figure 50:
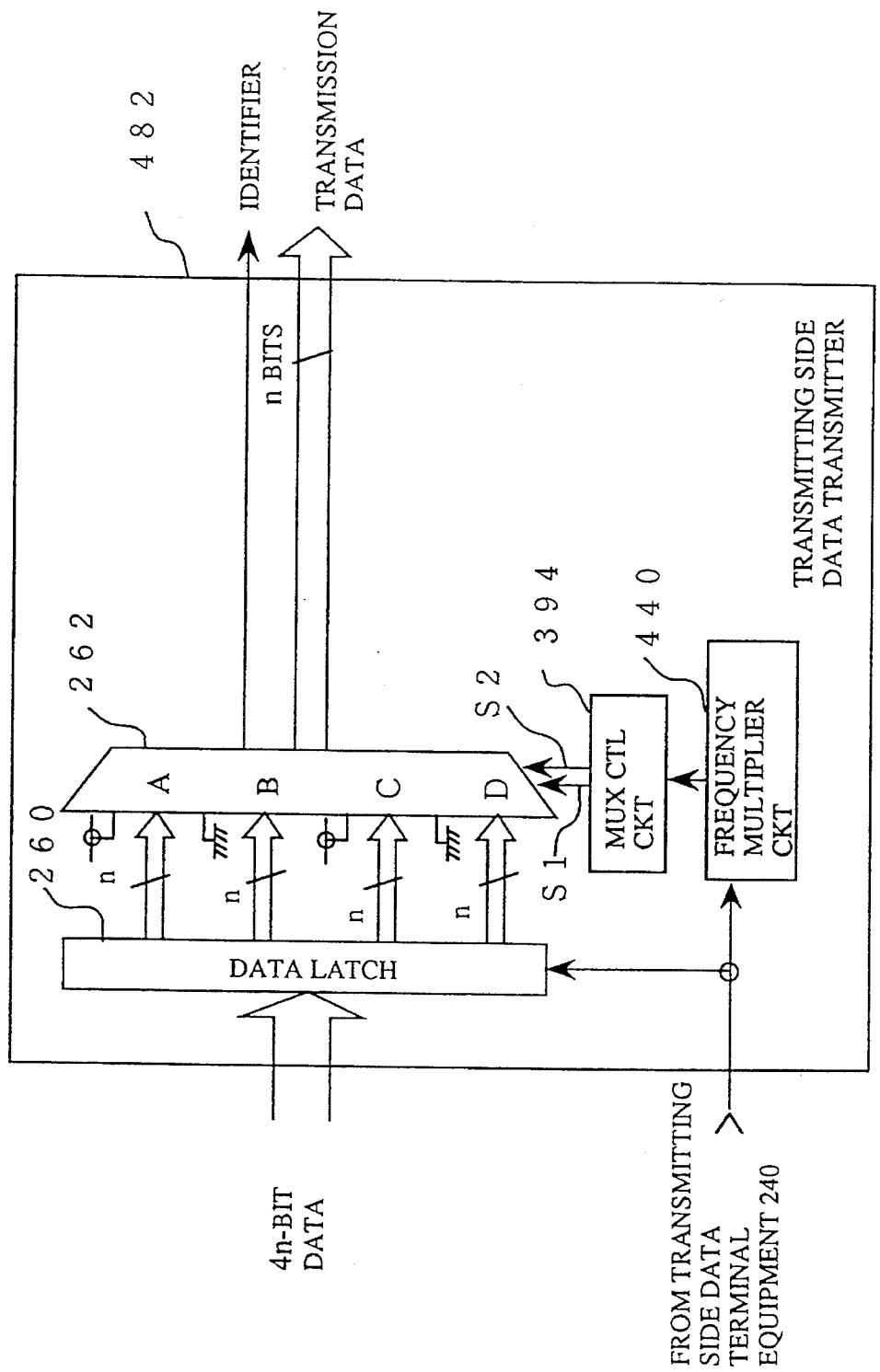
FIG. 50 is a block diagram of the transmitting side data transmitter of the interface apparatus shown in FIG. 49.

Referring to FIG. 50, the transmitting side data transmitter 482 is similar to the transmitting side data transmitter 382 of the sixth embodiment shown in FIG. 37, but it is simplified. More specifically, the transmitting side data transmitter 482 shown in FIG. 50 does not include the transmitting side transmission control circuit 390 shown in FIG. 37. Therefore, the multiplier circuit used in the transmitting side data transmitter 482 is the same as the multiplier circuit 440 (FIG. 46) used in the first modification of the sixth embodiment. In FIGS. 50, 46 and 37, corresponding portions are denoted by the same reference characters and same labels. Functions are the same. Therefore, detailed description thereof is not repeated here.

Figure 51:
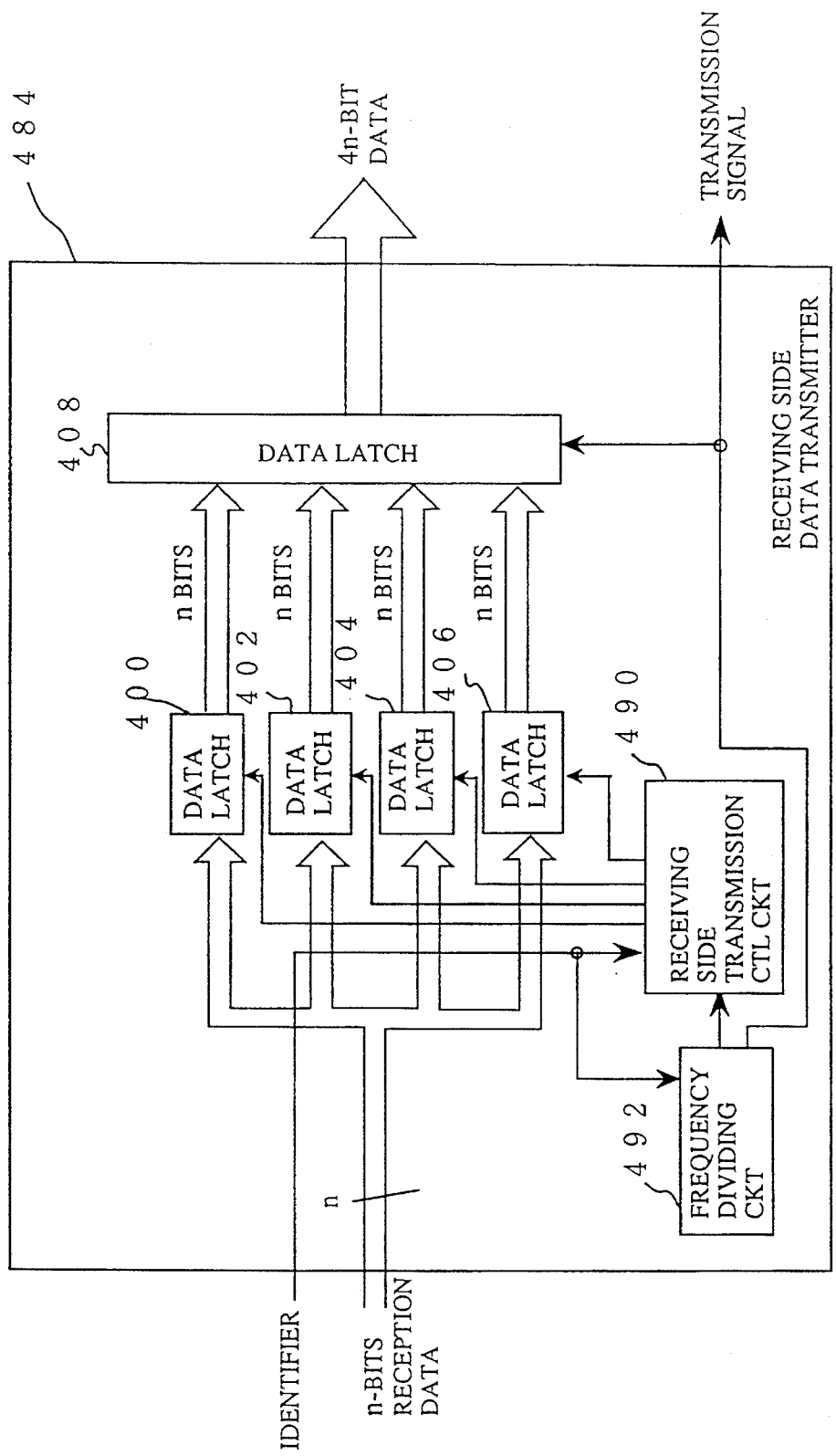
FIG. 51 is a block diagram of the receiving side data transmitter of the interface apparatus shown in FIG. 49.

Referring to FIG. 51, the receiving side data transmitter 484 of the second modification of the sixth embodiment has approximately the same structure as the receiving side data transmitter 384 of the sixth embodiment shown in FIG. 38. What is different is that the receiving side data transmitter 484 includes, instead of the dividing circuit 412 of FIG. 38, a dividing circuit 492 which has an input to which the identifier is applied. The output of the dividing circuit 492 is connected to the receiving side transmission control circuit 492, as is the output of the dividing circuit 412 of FIG. 38. The dividing circuit 492 also provides the transmission signal. In FIGS. 38 and 51, corresponding portions are denoted by the same reference characters and the same labels. Functions are the same. Therefore, detailed description thereof is not repeated here. The receiving side transmission control circuit 490 used in the receiving side data transmitter 484 of FIG. 51 has a structure which is little different from the receiving side transmission control circuit 410 shown in FIG. 38, as will be described later.

Figure 52:
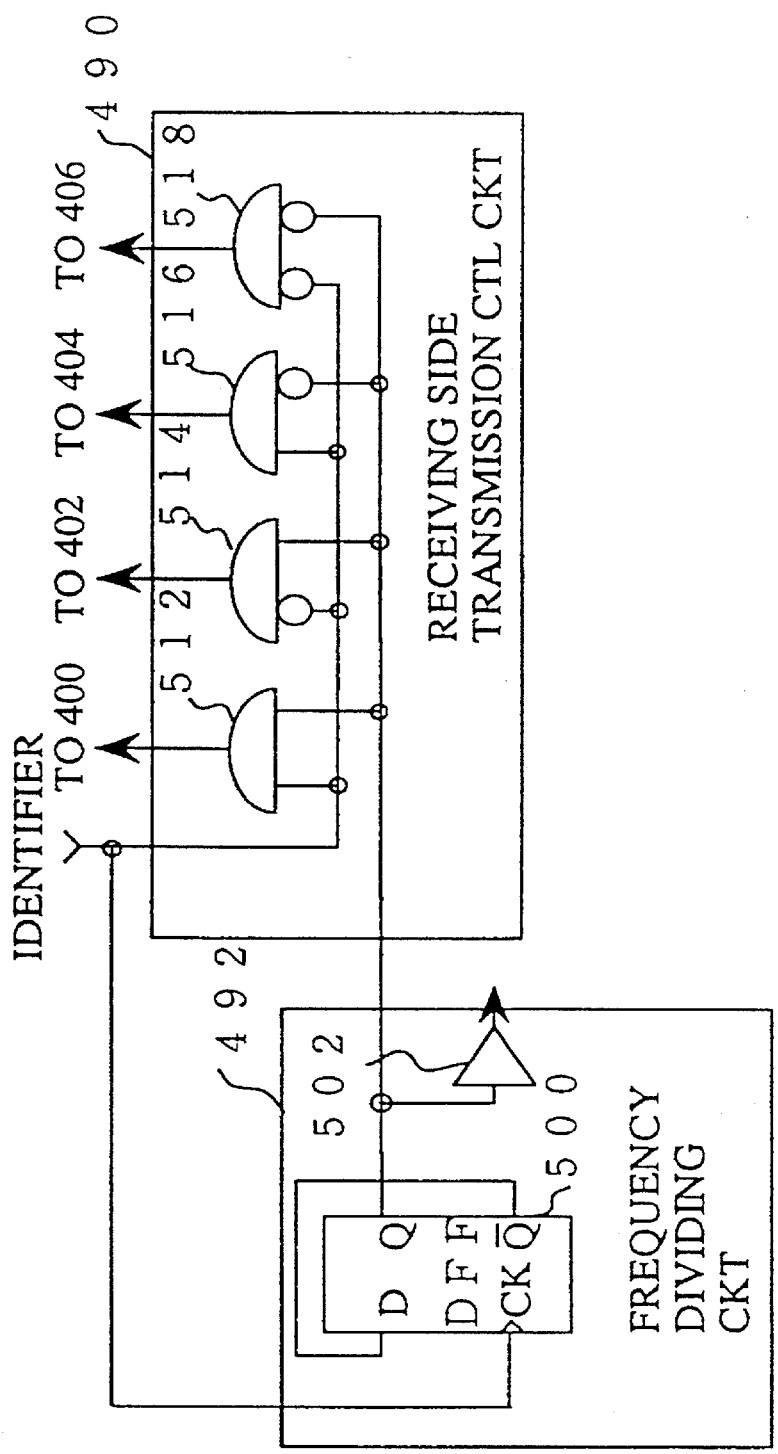
FIG. 52 is a schematic block diagram of the dividing circuit and the receiving side transmission control circuit shown in FIG. 51.

Referring to FIG. 52, the dividing circuit 492 includes a D-flipflop 500 and a transmission signal driver 502. The identifier is applied to the clock input of D-flipflop 502. The /Q output of the D-flipflop is connected to the D input. The Q output is connected to the input of the receiving side transmission control circuit 490. The input of the transmission signal driver 502 is connected to the Q output of D-flipflop 500. The driver 502 provides the transmission signal.

As described above, when transmission is carried out normally, the identifier assumes "high" and "low" alternately, two times each. Therefore, the identifier can be regarded as a clock signal having the frequency double that of the original transmission signal. By dividing the identifier signal by the dividing circuit 492, a transmission signal having the frequency of the original transmission signal can be obtained. In the receiving side transmission control circuit 490, data latch signal for respective data latch circuits 400, 402, 402 and 406 is provided in accordance with the original identifier and the transmission signal.

The driver 502 is for providing margin of the data latch timing of the data latch circuit 408 shown in FIG. 51.

The receiving side data transmission control circuit 490 includes AND gates 512, 514, 516 and 518.

The output of the AND gates 512, 514, 516 and 518 are respectively connected to data latch circuits 400, 402, 404 and 406. The identifier is applied to one input of each of the AND gates 512, 514, 516 and 518. The identifier is applied inverted to the AND gates 514 and 518. To the other input of each of the AND gates 512, 514, 516 and 518, the output of the dividing circuit 492 is applied. The output of the dividing circuit 492 is applied inverted to the AND gates 516 and 518.

In the second modification, instead of the transmission signal from the transmitting side data transmitter 382 to the receiving side data transmitter 384 of the sixth embodiment, the transmission signal is regenerated by the receiving side data transmitter 484 by using the identifier signal. Therefore, the signal line for the transmission control signal is not necessary.

Two modifications of the sixth embodiment have been described. However, it is readily understood that the modifications to the sixth embodiment are not limited to these two. Further, modifications similar to the above described modifications of the sixth embodiment may be made to other embodiments. It should be understood that such modifications are included in the scope and spirit of the present invention as defined by the claims.

As described above, according to the embodiments of the present invention, the amount of data transmitted in a unit time between circuits or devices having data processing function can be sufficiently increased without inviting substantial degradation of data processing capability of these circuits or devices, increase in size of the entire system incorporating these circuits or devices, or special design or process technique for the interface apparatus provided between these circuits or devices. Therefore, a data transmitter which operates at high speed with high reliability and advantageous for making smaller the system, which makes lower the power consumption and the cost can be implemented.

According to another embodiment of the interface apparatus in accordance with the present invention, data transmission is carried out after it is confirmed by the transmitting side or receiving side or both whether or not the data to be transmitted have been established. Therefore, the amount of data transmission per unit time can be increased while maintaining the reliability of data.

According to another embodiment of the interface apparatus in accordance with the present invention, whether or not the data transmission to data latch circuits 162 and 320 are carried out properly is detected, and transmission control is carried out in accordance with the result of detection. If the correct data are not stored in data latch circuits 162 and 320, the transmission control can be switched, for example, to error processing, and therefore reliability of data transmission can be improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An interface apparatus for transferring data having a first width of a plurality of bits output at one time from a first data processing apparatus, the interface apparatus using a transmission path having a second width of smaller number of bits than said first width of bits, and for applying the data being transferred to a second data processing apparatus in its entire first width at one time; receiving a first data transmission control signal for controlling data transmission from said first data processing apparatus; said first data transmission control signal alternately assuming a first value and a second value, said interface apparatus comprising:

a data transmitter, whose input has the first width of bits, responsive to said first transmission control signal, for receiving at one time said data being transmitted from said first data processing apparatus for dividing the same into a plurality of data groups each having the second width of bits, and for successively outputting each of the plurality of data groups as well as outputting a second transmission control signal, the data groups being output in a period corresponding to two successive transitions of said first transmission control signal from said second value to said first value;

said second transmission control signal changing with a prescribed delay from said first transmission control signal and assuming alternately the first value and the second value; and a data receiver, whose output has the first width of bits and is connected to the second data processing apparatus, responsive to said second transmission control signal for receiving said plurality of data groups output from the data transmitter, for reconstructing said data being transferred from the first data processing apparatus back into data having the first width of bits, and for supplying a now-reconstructed data being transferred to said second data processing apparatus collectively at every corresponding period of two transitions of said second control signal, the now-reconstructed data being supplied together with a third transmission control signal indicative of a timing for data supply to said second data processing apparatus;

said third transmission control signal assuming a first value indicative of a request for data reception, and a second value indicative that data is being transmitted;

the interface apparatus operating relative to timing signals determined as a function of at least one timing signal from the first data processing apparatus;

the at least one timing signal including the first data transmission control signal;

wherein said first transmission control signal is a clock signal having a prescribed period; and wherein said transmitter includes:

dividing means, responsive to said clock signal, for receiving at one time said data being transferred having the first width of bits from said first data processing apparatus, and for dividing the data being transferred into said plurality of data groups each having the second width of bits; and selecting means for successively selecting and outputting one by one said plurality of data groups from said dividing means per said one period, and for outputting said second transmission control signal as a timing signal for controlling the timing of said selections;

wherein said dividing means includes:

holding means having an input whose bit width is equal to said first width of bits and having outputs corresponding to said plurality of data groups each holding means output having the second width to bits, responsive to said clock signal, for holding data at said input and for providing, from its said outputs to said selecting means a prescribed portion of data held therein as said plurality of data groups;

wherein said selecting means includes:

timing signal generating means, receiving said clock signal, for generating said timing signal based on said clock signal;

selection signal generating means, receiving said timing signal, for generating selection signals which can assume all of said plurality of different values in one period of said clock signal; and multiplexer means, having inputs commensurate with and connected to outputs of said holding means and an output having the second width of bits connected to said receiver, responsive to said selection signal, for successively selecting information at any of said plurality of inputs and outputting the same to said receiver.

2. The interface apparatus according to claim 1, wherein said timing signal generating means includes frequency multiplier means for outputting said timing signal having a frequency obtained by multiplying the frequency of said clock signal.

3. The interface apparatus according to claim 2, wherein said plurality of data groups is an even number.

4. The interface apparatus according to claim 3, wherein said plurality of data groups is a power of two.

5. The interface apparatus according to claim 4, wherein said plurality of data groups is 4.

6. The interface apparatus according to claim 5, wherein said frequency multiplier means includes means for multiplying the frequency of said clock signal by a factor of 4 for generating said timing signal; and said selecting signal generating means includes counter means for counting a number of pulses of said timing signal corresponding to said plurality of data groups, and for outputting said selection signal based on a result of counting.

7. The interface apparatus according to claim 5, wherein said frequency multiplier means includes means for generating said timing signal by multiplying the frequency of said clock signal by a factor of 2; and said selection signal generating means includes counter means for counting level transitions of said timing signal corresponding to said plurality of data groups and for outputting said selection signal based on the result of counting.

8. An interface apparatus for transferring data having a first width of a plurality of bits output at one time from a first data processing apparatus, the interface apparatus using a transmission path having a second width of smaller number of bits than said first width of bits, and for applying the data being transferred to a second data processing apparatus in its entire first width at one time, receiving a first data transmission control signal for controlling data transmission from said first data processing apparatus, said first data transmission control signal alternately assuming a first value and a second value, said interface apparatus comprising:

a data transmitter, whose input has the first width of bits, responsive to said first transmission control signal, for receiving at one time said data being transmitted from said first data processing apparatus, for dividing the same into a plurality of data groups each having the second width of bits, and for successively outputting each of the plurality of data groups as well as outputting a second transmission control signal, the data groups being output in a period corresponding to two successive transitions of said first transmission control signal from said second value to said first value;

said second transmission control signal changing with a prescribed delay from said first transmission control signal and assuming alternately the first value and the second value; and a data receiver, whose output has the first width of bits and is connected to the second data processing apparatus, responsive to said second transmission control signal receiving said plurality of data groups output from the data transmitter, for reconstructing said data being transferred from the first data processing apparatus back into data having the first width of bits, and for supplying a now-reconstructed data being transferred to said second data processing apparatus collectively at every corresponding period of two transitions of said second control signal, the now-reconstructed data being supplied together with a third transmission control signal indicative of a timing for data supply to said second data processing apparatus;

said third transmission control signal assuming a first value indicative of a request for data reception, and a second value indicative that data is being transmitted;

the interface apparatus operating relative to timing signals determined as a function of at least one timing signal from the first data processing apparatus;

the at least one timing signal including the first data transmission control signal;

said first reception signal being applied from said second data processing apparatus to said receiver in response to said third transmission control signal and assuming a first or a second state indicating whether or not said second data processing apparatus is ready for receiving data;

wherein said receiver includes:

means, responsive to said second transmission control signal and said first reception control signal, for generating a second reception control signal, said second reception control signal assuming a first or a second value indicating whether or not said receiver is ready, for receiving successive ones of said plurality of data groups; and wherein said transmitter includes:

transmission control means, responsive to said first transmission control signal and second reception control signal, for generating:

said second transmission control signal, a third reception control signal assuming a first or a second value indicating whether or not said transmitter is at a data reception permitted state, a first timing signal defining timing for a taking in of the data being transferred, the data being transferred having the width of said first width of bits, from said first data processing apparatus, and a second timing signal defining timing for a partitioning of the data being transferred into said plurality of data groups in a period corresponding to a period of said transition of said first transmission control signal;

dividing means, responsive to said first timing signal, for receiving said data having the first width of bits from said first data processing apparatus at one time, and for dividing the same into said plurality of data groups each having the second width of bits; and selecting means, responsive to said second timing signal, for successively selecting one by one the plurality of data groups, the data groups being divided by said dividing means according to said second timing signal, and for outputting the same to said receiver.

9. The interface apparatus according to claim 8, wherein said dividing means includes holding means, having an input whose bit width is equal to said first width of bits and having outputs corresponding to said plurality of data groups each holding means output having the second width of bits, responsive to said first timing signal, for holding data at said input and for applying, from its said outputs, a prescribed portion of data held therein as said plurality of data groups to said selecting means.

10. The interface apparatus according to claim 9, wherein said selecting means includes multiplexer means, having inputs corresponding and connected to the outputs of said holding means and an output having the second width of bits connected to said receivers responsive to said second timing signal, for selecting information at any of its inputs as its output.

11. The interface apparatus according to claim 10, wherein said plurality of data groups is an even number.

12. The interface apparatus according to claim 11, wherein said plurality of data groups is a power of two.

13. The interface apparatus according to claim 12, wherein said plurality of data groups is 2.

14. The interface apparatus according to claim 13, wherein said transmission control means includes:
  a transfer control device for outputting said third reception control signal in response to said first transmission control signal, said first timing signal being generated in response to either one of a transition of said first transmission control signal to said first value or a transition of said second reception control signal to said first value whichever occurs last, said second transmission control signal being generated in response to said first timing signal; and
  means for applying said second reception control signal as said second timing signal to said selecting means;
said holding means includes:
  a data latch circuit, having an input having the first width of bits and a first and a second output each having the second width of bits, for latching data applied to its said input in response to a transition of said first timing signal, and for outputting higher order and lower order data, the higher and lower data having an aggregate bit width equal to said first width of bits, each of the higher order and lower order data having the second width of bits, to its said first and second output, respectively; and
said selection means includes:
  a multiplexer, having first and second inputs commensurate with and connected to said first and second outputs of said data latch circuit, respectively, and an output having the second width of bits connected to said receiver, responsive to a transition of said second timing signal between said first value and said second value for selecting and for outputting data on either its said first or second input depending on a direction of said transition.

15. The interface apparatus according to claim 12, wherein said plurality of data groups is 4.

16. The interface apparatus according to claim 15, wherein said transmission control means includes:
  a transfer control device for outputting said third reception control signal in response to said first transmission control signal, said first timing signal responsively being generated to either one of a transition of said first transmission control signal to said first value and a transition of said second reception control signal to the first condition whichever occurs last, and said second transmission control signal being generated in response to said first timing signal, respectively; and
  second timing signal generating means, responsive to said first transmission control signal and said second reception control signal, for generating and for applying said second timing signal assuming first, second, third and fourth conditions, to said selecting means;
said holding means includes:
  a data latch circuit, having an input having the first width of bits and first, second, third and fourth outputs, each output having the second width of bits, for latching data at said input in response to a transition of said first timing signal, and
  for outputting highest order, second highest order, third highest order and the lowest order data, having together an aggregate bit width equal to said first width of bits, each order of data having the second width of bits, to said first, second, third and fourth outputs of the data latch circuit; and
said selecting means includes:
  a multiplexer, having first, second, third and fourth inputs corresponding and connected, respectively, to said first, second, third and fourth outputs of said data latch circuit and having an output having the second width of bits connected to said receivers, for selecting and outputting data on any of said first, second, third and fourth inputs depending on which of said first, second, third and fourth values said second timing signal assumes.

17. The interface apparatus according to claim 16, wherein said second timing signal generating means includes means for outputting a higher 1 bit of said second timing signal in response to said second transmission control signal, and means for outputting a lower 1 bit of said second timing signal in response to said second reception control signal.

18. An interface apparatus for transferring data having a first width of a plurality of bits output at one time from a first data processing apparatus, the interface apparatus using a transmission path having a second width of smaller number of bits than said first width of bits, and for applying the data being transferred to a second data processing apparatus in its entire first width at one time, receiving a first data transmission control signal for controlling data transmission from said first data processing apparatus, said first data transmission control signal alternately assuming a first value and a second value, said interface apparatus comprising:

a data transmitter, whose input has the first width of bits, responsive to said first transmission control signal, for receiving at one time said data being transmitted from said first data processing apparatus, for dividing the same into a plurality of data groups each having the second width of bits, and for successively outputting each of the plurality of data groups as well as outputting a second transmission control signal, the data groups being output in a period corresponding to two successive transitions of said first transmission control signal from said second value to said first value;

said second transmission control signal changing with a prescribed delay from said first transmission control signal and assuming alternately the first value and the second value; and a data receiver, whose output has the first width of bits and is connected to the second data processing apparatus, responsive to said second transmission control signal, for receiving said plurality of data groups output from the data transmitter, for reconstructing said data being transferred from the first data processing apparatus back into data having the first width of bits, and for supplying a now-reconstructed data being transferred to said second data processing apparatus collectively at every corresponding period of two transitions of said second control signal, the now-reconstructed data being supplied together with a third transmission control signal indicative of a timing for data supply to said second data processing apparatus;

said third transmission control signal assuming a first value indicative of a request for data reception, and a second value indicative that data is being transmitted;

the interface apparatus operating relative to timing signals determined as a function of at least one timing signal from the first data processing apparatus;

the at least one timing signal including the first data transmission control signal;

wherein said first transmission control signal is a clock signal having a prescribed period; and wherein said transmitter includes:
dividing means, responsive to said clock signal, for receiving at one time said data being transferred having the first width of bits from said first data processing apparatus, and for dividing the data being transferred into said plurality of data groups each having the second width of bits; and selecting means for successively selecting and outputting one by one said plurality of data groups from said dividing means per said one period, and for outputting said second transmission control signal as a timing signal for controlling the timing of said selection;

wherein said dividing means includes:
holding means having an output whose bit width is equal to said first width of bits and having outputs corresponding to said plurality of data groups each holding means output having the second width of bits responsive to said clock signal, for holding data at said input and for providing, from its said outputs to said selecting means, a prescribed portion of data held therein as said plurality of data groups;

wherein each of said data groups includes an identifier signal, the identifier signals assuming values different from each other in any two data groups selected successively by said selecting means;

wherein said selecting means includes;
timing signal generating means, receiving said clock signal, for generating said timing signal based on said clock signal; and multiplexer means, having inputs commensurate with and connected to the outputs of said holding means and an output having the second width of bits, responsive to said timing signal, for successively selecting information at any of said plurality of inputs and for outputting the same to said receiver; and wherein said transmitter further includes:
identifier signal detecting means, connected to said multiplexer means, for detecting whether said identifier signal has a value indicative of the data group to be selected by said multiplexer means, and for providing a detection signal; and second transmission control signal generating means, responsive to said detection signal and said clock signal, for outputting said second transmission control signal.

19. The interface apparatus according to claim 18, wherein said plurality of data group is an even number.

20. The interface apparatus according to claim 19, wherein said plurality of data groups is a power of two.

21. The interface apparatus according to claim 20, wherein said plurality of data groups is 2.

22. The interface apparatus according to claim 21, wherein said timing signal generating means includes
means for applying said clock signal received therein to said multiplexer means; and said multiplexer means includes
a first input to which a first data group is input,
a second input to which a second data group is input, and
a multiplexer responsive to a level transition of said clock signal for selectively outputting the data at said first input or the data at said second input.

23. An interface apparatus for transferring data having a first width of a plurality of bits output at one time from a first data processing apparatus, the interface apparatus using a transmission path having a second width of smaller number of bits than said first width of bits, and for applying the data being transferred to a second data processing apparatus in its entire first width at one time, receiving a first data transmission control signal for controlling data transmission from said first data processing apparatus, said first data transmission control signal alternately assuming a first value and a second value, said interface apparatus comprising:

a data transmitter, whose input has the first width of bits, responsive to said first transmission control signal, for receiving at one time said data being transmitted from said first data processing apparatus for dividing the same into a plurality of data groups each having the second width of bits, and for successively outputting each of the plurality of data groups as well as outputting a second transmission control signal, the data groups being output in a period corresponding to two successive transitions of said first transmission control signal from said second value to said first value;

said second transmission control signal changing with a prescribed delay from said first transmission control signal and assuming alternately the first value and the second value; and a data receiver, whose output has the first width of bits and is connected to the second data processing apparatus, responsive to said second transmission control signal, for receiving said plurality of data groups output from the data transmitter, for reconstructing said data being transferred from the first data processing apparatus back into data having the first width of bits, and for supplying a now-reconstructed data being transferred to said second data processing apparatus collectively at every corresponding period of two transitions of said second control signal, the now-reconstructed data being applied together with a third transmission control signal indicative of a timing for data supply to said second data processing apparatus;

said third transmission control signal assuming a first value indicative of a request for data reception and a second value indicative that data is being transmitted;

the interface apparatus operating relative to timing signals determined as a function of at least one timing signal from the first data processing apparatus;

the at least one timing signal including the first data transmission control signal;

wherein said first transmission control signal is a clock signal having a prescribed period; and wherein said transmitter includes:
  dividing means, responsive to said clock signal, for receiving at one time said data being transferred having the first width of bits from said first data processing apparatus, and for dividing the data being transferred into said plurality of data groups each having the second width of bits; and
  selecting means for successively selecting and outputting one by one said plurality of data groups from said dividing means per said one period, and for outputting said second transmission control signal as a timing signal for controlling the timing of said selection;

wherein said dividing means includes:
  holding means having an input whose bit width is equal to said first width of bits and having outputs corresponding to said plurality of data groups each holding means output having the second width of bits, responsive to said clock signal, for holding data at said input and for providing from its said outputs to said selecting means a prescribed portion of data held therein as said plurality of data groups;

wherein said selecting means includes:
  timing signal generating means, responsive to said clock signal, for generating said timing signal;
  selection signal generating means, responsive to said timing signal, for generating a selecting signal which can assume all of the plurality of different values in one period of said clock signal;
  identifier signal adding means for adding one of a predetermined plurality of identifier signals to each data group,
    the identifier signals being selected such that two identifier signals added to any two of successively selected data groups are not equal to each other; and
  multiplexer means having inputs corresponding in number to said plurality of data groups, each input having a third width of bits wider than said second width of bits by a number of bits of said identifier signal, outputs of the multiplexer means being connected respectively to the outputs of said holding means and to an output of said identifier signal adding means, and having an output having the second width of bits, responsive to said selection signal, for time divisionally multiplexing said plurality of data groups; and wherein said transmitter further includes:
  identifier signal detecting means, connected to and output of said multiplexer means applying said identifier signal, for detecting whether said identifier signal has a value indicative of the data group to be selected by said multiplexer means, and for providing a detection output, and
  second transmission control signal generating means, connected to the output of said timing signal generating means, responsive to said timing signal and said detection output, for outputting said second transmission control signal.

24. The interface apparatus according to claim 23, wherein said timing signal generating means includes
  frequency multiplier means for outputting said timing signal having a frequency obtained by multiplying a frequency of said clock signal.

25. The interface apparatus according to claim 24, wherein
  said plurality of data groups is an even number.

26. The interface apparatus according to claim 25, wherein
  said plurality of data groups is a power of two.

27. The interface apparatus according to claim 26, wherein
  said plurality of data group is 4.

28. The interface apparatus according to claim 27, wherein
  said frequency multiplier means includes
    means for generating said timing signal by multiplying the frequency of said clock signal by a factor of 4; and
  said selection signal generating means includes counter means for modulo 4 counting a number of pulses of said timing signal to modules of 4 and outputting said selection signal based on the result of counting.

29. The interface apparatus according to claim 27 wherein
  said frequency multiplier means includes means for generating said timing signal by multiplying the frequency of said clock signal by a factor of 2; and
  said selection signal generating means includes
    counter means for modulo 4 counting level transition of said timing signal to modules of 4 and outputting said selection signal based on the result of counting.

30. An interface apparatus for transferring data having a first width of a plurality of bits output at one time from a first data processing apparatus, the interface apparatus using a transmission path having a second width of smaller number of bits than said first width of bits, and for applying the data being transferred to a second data processing apparatus in its entire first width at one time, receiving a first data transmission control signal for controlling data transmission from said first data processing apparatus, said first data transmission control signal alternately assuming a first value and a second value, said interface apparatus comprising:
  a data transmitter, whose input has the first width of bits, responsive to said first transmission control signal, for receiving at one time said data being transmitted from said first data processing apparatus, for dividing the same into a plurality of data groups each having the second width of bits, and for successively outputting each of the plurality of data groups as well as outputting a second transmission control signal, the data groups being output in a period corresponding to two successive transitions of said first transmission control signal from said second value to said first value;

said second transmission control signal changing with a prescribed delay from said first transmission control signal and assuming alternately the first value and the second value; and a data receiver, whose output has the first width of bits and is connected to the second data processing apparatus responsive to said second transmission control signal, for receiving said plurality of data groups output from the data transmitter, for reconstructing said data being transferred from the first data processing apparatus back into data having the first width of bits, and for supplying a now-reconstructed data being transferred to said second data processing apparatus collectively at every corresponding period of two transitions of said second control signal, the now-reconstructed data being applied together with a third transmission control signal indicative of a timing for data supply to said second data processing apparatus;

said third transmission control signal assuming a first value indicative of a request for data reception, and a second value indicative that data is being transmitted;

the interface apparatus operating relative to timing signals determined as a function of at least one timing signal from the first data processing apparatus;

the at least one timing signal including the first data transmission control signal;

wherein said first transmission control signal is a clock signal having a prescribed period; and wherein said transmitter includes:
  dividing means, responsive to said clock signal, for receiving at one time said data being transferred having the first width of bits from said first data processing apparatus, and for dividing the data being transferred into said plurality of data groups each having the second width of bits; and
  selecting means for successively selecting and outputting one by one said plurality of data groups from said dividing means per said one period, and for outputting said second transmission control signal as a timing signal for controlling the timing of said selection;

the interface operating further in response to a first reception control signal, the first reception control signal being applied from said second data processing apparatus to said receiver in response to said third transmission control signal, and the first reception control signal assuming a first or a second value respectively indicating whether said second data processing apparatus is ready for reception of data from said data input;

wherein said receiver includes:
  means, responsive to said second transmission control signal and said first reception control signal for generating a second reception control signal, said second reception control signal assuming a first or a second value respectively indicating whether said receiver is ready, for receiving successive one of said data groups;

wherein said transmitter includes:
  transmission control means, responsive to said first transmission control signal and second reception control signal, for generating:
    said second transmission control signal,
    a third reception control signal assuming a first or a second value respectively indicating whether said transmitter is at a state permitting data reception,
    a first timing signal defining timing for taking in the data having the first width of bits applied from said first data processing apparatus, and
    second timing signal defining timing for partitioning of the data being transferred into said second plurality of data groups in a period corresponding to a period of said transition of said first transmission control signal;
  dividing means, responsive to said first timing signal, for receiving the data having the first width of bits at one time from said first data processing means, and for dividing the same into said plurality of data groups each having the second width of bits;
  identifier signal adding means for adding one of a predetermined plurality of identifier signals to each data group, values of said identifier signals being selected such that values of identifiers applied to any successively selected two of said data groups are not equal to each other; and
  selection means, having inputs corresponding in number to the plurality of data groups, each input having a third width of bits wider than said second width of bits by a bit number bits of said identifier signal, inputs of the selection means being connected respectively to the outputs of said holding means and to an output of said identifier signal adding means, and having an output having the second width of bits, responsive to said second timing signal, for selecting and outputting said plurality of data groups successively one by one according to timing defined by said second timing signal; and
  wherein said transfer control means operates further in response to said identifier signal output from said selecting means.

31. The interface apparatus according to claim 30, wherein
said dividing means includes:
  holding means, having an input having the first width of bits and being connected to said first data processing apparatus, and having outputs corresponding in number to the plurality of data groups, each of its outputs having the second width of bits, responsive to said first timing signal for holding data at said input and applying a predetermined portion of said held data as said second plurality of data groups, from said second plurality of outputs.

32. The interface apparatus according to claim 31, wherein
said selection means includes
  multiplexer means, having inputs commensurate with and connected to said outputs of said holding means and to an output of said identifier signal adding means, and having an output having the second width of bits, responsive to said second timing signal, for successively and time-divisionally multiplexing said plurality of data according to timing defined by said second timing signal.

33. The interface apparatus according to claim 32, wherein said plurality of data group is an even number.

34. The interface apparatus according to claim 33, wherein said plurality of data group is a power of two.

35. The interface apparatus according to claim 34, wherein said plurality of data group is 2.

36. The interface apparatus according to claim 35 wherein said transmission control means includes:
- a transfer control device for outputting said third reception control signal in response to said first transmission control signal, for outputting said first timing signal in response to either one of a transition of said first transmission control signal to said first value and a transition of said second reception control signal to said first value whichever occurs last, and for outputting a fourth transmission control signal in response to said first timing signal, respectively;
- means for applying said second reception control signal as said second timing signal to said selection means; and
- second transmission control signal generating means, responsive to said fourth transmission control signal and said identifier signal, for generating said second transmission control signal and for applying the same to said receiver;

said holding means includes:
- a data latch circuit, having an input having the first width of bits and having first and second outputs, each of the first and second outputs having the second width of bits, for latching, in response to a transition of said first timing signal to said first value, information applied at said input, and for outputting higher order and lower order data each having the second width of bits to said first and second outputs, respectively;

said multiplexer means includes:
- a multiplexer, having first and second inputs, each of its inputs having the second width of bits respectively connected to the first and second outputs of the data latch circuit and of said identifier signal adding means, and having an output having the second width of bits, responsive to a transition of said second timing signal between said first value and said second value, for selecting and for outputting data either at said first or second input dependent on the direction of said transition.

37. The interface apparatus according to claim 34, wherein said plurality of data groups is 4.

38. The interface apparatus according to claim 37, wherein said transmission control means includes:
- a transfer control device for outputting said third reception control signal in response to said first transmission control signal, for outputting said first timing signal in response to either one of a transition of said first transmission control signal to said first value and a transition of said reception control signal to said first value whichever occurs last, and for outputting a fourth transmission control signal in response to said first timing signal, respectively; and
- second timing signal generating means, responsive to said fourth transmission control signal and said second reception control signal for generating said second timing signal assuming first, second, third and fourth values and applying the same to said selection means;

said holding means includes:
- a data latch circuit, having an input having the first width of bits and first, second, third and fourth outputs each having the second width of bits, for latching, in response to the transition of said first timing signal to said first value, information applied at its said input, and outputting a highest order, a second highest order, a third highest order and a lowest order data each of the second width of bits to said first, second, third and fourth outputs, respectively; and said selecting means includes:
- identifier signal adding means for adding one of a predetermined plurality of identifier signals to each data group,
- the identifier signals being selected such that the identifiers added to any successively selected two of said data groups are not equal to each other; and
- a multiplexer having first, second, third and fourth inputs, each of its inputs having a third width of bits wider than the second width of bits by a number of bits of said indicator signal, respectively connected to said first, second, third, and fourth outputs of said data latch circuit, and having an output having the second width of bits, for selecting and for outputting data on any of said first, second third, and fourth inputs, dependent on which of the first, second, third and fourth conditions said second timing signal assumes.

39. The interface apparatus according to claim 38, wherein said second timing signal generating means includes
- means for outputting a higher 1 bit of said second timing signal in response to said second transmission control signal, and
- means for outputting a lower 1 bit of said timing signal in response to said second reception control signal.

40. An interface apparatus for transferring data having a first width of a plurality of bits output at one time from a first data processing apparatus, the interface apparatus using a transmission path having a second width of smaller number of bits than said first width of bits, and for applying the data being transferred to a second data processing apparatus in its entire first width at one time, receiving a first data transmission control signal for controlling data transmission from said first data processing apparatus, said first data transmission control signal alternately assuming a first value and a second value, said interface apparatus comprising:

a data transmitter, whose input has the first width of bits, responsive to said first transmission control signal, for receiving at one time said data being transmitted from said first data processing apparatus, for dividing the same into a plurality of data groups each having the second width of bits, and for successively outputting each of the plurality of data groups as well as outputting a second transmission control signal, the data groups being output in a period corresponding to two successive transitions of said first transmission control signal from said second value to said first value;

said second transmission control signal changing with a prescribed delay from said first transmission control signal and assuming alternately the first value and the second value; and a data receiver, whose output has the first width of bits and is connected to the second data processing apparatus, responsive to said second transmission control signal, for receiving said plurality of data groups output from the data transmitter, for reconstructing said data being transferred from the first data processing apparatus back into data having the first width of bits, and for supplying a now-reconstructed data being transferred to said second data processing apparatus collectively at every corresponding period of two transitions of said second control signal, the now-reconstructed data being supplied together with a third transmission control signal indicative of a timing for data supply to said second data processing apparatus;

said third transmission control signal assuming a first value indicative of a request for data reception, and a second value indicative that data is being transmitted;

the interface apparatus operating relative to timing signals determined as a function of at least one timing signal from the first data processing apparatus;

the at least one timing signal including the first data transmission control signal;

wherein said receiver includes:

reconstructing means, responsive to said second transmission control signal, for successively receiving said plurality of data groups in a reconstruction period and for reconstructing the same to provide a now-reconstructed data being transferred having the first width of bits;

integrating means, having an input of the first width of bits connected to an output of said reconstructing means, responsive to said second transmission control signal, for integrating the data groups into data of the first width of bits, and for applying the same to said second data processing apparatus at every said reconstruction period;

transmission control means, responsive to said second transmission control signal, for generating said third transmission control signal, and for applying the same to said second data processing apparatus; and timing signal means for generating a timing signal defining a second plurality of timings per 1 reconstruction period, and for generating an integrating timing signal for defining, once in one reconstruction period, timing for said integrating means to integrate the plurality of data groups into said reconstructed data being transferred.

41. The interface apparatus according to claim 40, wherein, said first transmission control signal is a clock signal having a predetermined period, and said second transmission control signal also has the same period as said clock signal.

42. The interface apparatus according to claim 41, wherein said reconstructing means includes:

a plurality of data group holding means, each including an input commonly connected to said transmitter through said transmission path and an output having the second width of bits connected to the input of said integrating means, each responsive to said timing signal, each for holding the data at said input and for applying the same to the input of said integrating means, the timing of holding data by said data group holding means being different from each other.

43. The interface apparatus according to claim 42, wherein said integrating means includes:

holding means having an output having the first width of bits connected to said second data processing apparatus and inputs corresponding in number to said plurality of data groups, each of its inputs being connected to the output of a corresponding one of said data group holding means, responsive to said integrating timing signal, for collectively holding data at said inputs and for outputting the same to said second data processing apparatus, said holding means and said data group holding means being associated in an order of said data groups being transmitted from said transmitter.

44. The interface apparatus according to claim 43, wherein said plurality of data groups is an even number.

45. The interface apparatus according to claim 44, wherein said plurality of data groups is a power of two.

46. The interface apparatus according to claim 45, wherein said plurality of data groups is 2.

47. The interface apparatus according to claim 46, wherein said transmission control means includes:

means for applying said second transmission control signal received and said second transmission control signal which has been inverted to said group holding means as said timing signals, respectively, and transmission control signal delaying means for delaying said received second transmission control signal after a predetermined delay and for outputting the same as said third transmission control signal and said integrating timing signal; and each said second plurality of data group holding means includes:

first and second data latch circuits, each latch circuit having an input commonly connected to said transmission path, each being responsive to a level transition of said second transmission control signal to opposite directions, each for latching the data at said input.

48. The interface apparatus according to claim 46, wherein said timing signal generating means includes means for counting a number of pulses of said second transmission control signal received, and for generating first, second, third and fourth timing signals defining mutually different timings based on a result of counting; and each said data group holding means includes first, second, third and fourth data latch circuits, each latch circuit having an input commonly connected to said transmission path, and responsive to said first, second, third and fourth timing signals, for latching a data group at an input, respectively.

49. The interface apparatus according to claim 40, wherein said first transmission control signal is a clock signal having a prescribed period; and said second transmission control signal has a frequency obtained as a function of the period of said clock signal.

50. The interface apparatus according to claim 49, wherein said transmission control means includes:

timing signal generating means, responsive to said second transmission control signal, for generating said timing signals defining mutually different timings in one said reconstruction period, and for outputting said second transmission control signal as a fourth transmission control signal after a prescribed delay; and dividing means for dividing said fourth transmission control signal and for generating said integrating timing signal having a same frequency as that of said first transmission control signal.

51. The interface apparatus according to claim 50, wherein said reconstructing means, includes:

data group holding means corresponding to each of said plurality of data group, respectively, each having an input commonly connected to said transmitter through said transmission path and an output having the second width of bits connected to the input of said integrating means, responsive to one of said timing signals, each for holding data at said input and for applying the same to the input of said integrating means, said timing signals to which said data group holding means respond being different from each other.

52. The interface apparatus according to claim 51, wherein said integrating means includes:

holding means, having an output having the first width of bits connected to said second data processing apparatus and having inputs commensurate with and connected to the outputs of said data group holding means, respectively, responsive to said integrating timing signal, for collectively holding information on its inputs and outputting the same to said second data processing apparatus, said inputs of said holding means and said data group holding means being associated in advance in accordance with an order of said data groups being transmitted from said transmitter.

53. The interface apparatus according to claim 52, wherein said plurality of data group is an even number.

54. The interface apparatus according to claim 53, wherein said plurality of data groups is a power of two.

55. The interface apparatus according to claim 54, wherein said plurality of data groups is 4.

56. The interface apparatus according to claim 49, wherein an identifier signal is input to said receiver through said transmission path, added to each of said data groups or is present in each of said data groups, the identifier signal being selected in advance such that the value thereof differs in data groups transmitted successively, and wherein said transmission control means operates further in response to said identifier signal.

57. The interface apparatus according to claim 56, wherein said transmission control means includes:

timing signal generating means, responsive to said second transmission control signal and said identifier signal, for generating said second plurality of timing signals defining timings mutually different in one said reconstruction period, and for outputting said second transmission control signal as a fourth transmission control signal in response to a change of the value of said identifier signal; and dividing means for dividing said fourth transmission control signal and for generating said integrating timing signal having the same frequency as that of said first transmission control signal.

58. The interface apparatus according to claim 40, wherein said transmission control means operates further in response to a first reception control signal, the first reception control signal being applied from said second data processing apparatus in response to said third transmission control signal ad assuming a first or second value indicating whether or not said second data processing apparatus is ready for the reception of data from a data input, respectively.

59. The interface apparatus according to claim 58, wherein said transmission control means includes:

a transfer control device, responsive to said second transmission control signal and said first reception control signal, for generating said third transmission control signal and a second reception control signal, and for applying the same to said second data processing apparatus and said transmitter, respectively, and for generating an integrating timing signal for defining, once in one reconstruction period of said transition, timing of integration of said plurality of data groups back into the data being transferred by said integrating means, said second reception control signal assuming first or a second value indicating whether said receiver is at a state permitting data reception; and timing signal generating means, responsive to said second transmission control signal, for generating a timing signal defining said second plurality of timings per one period of said transition.

60. The interface apparatus according to claim 59, wherein said reconstructing means includes:

a plurality of data group transmitting means of said plurality of data groups, each having an input commonly connected to said transmitter through said transmission path and an output connected to a part of said input of said integrating means, for transmitting those of said plurality of data groups which have been associated in advance to said input of said integrating means by the time of generation of said integrating timing signal, and for maintaining the same until the generation of said integrating timing signal.

61. The interface apparatus according to claim 60, wherein the first of said data group transmitting means includes:

an interconnection, having the second width of bits, and having one end connected to said transmission path and the other end connected to the input of said integrating means, for applying a last data group transmitted through said transmission path said integrating means; and remaining ones of said data group transmitting means each including data group holding means, having an input of the second width of bits connected to said transmission path and an output having the second width of bits connected to the input of said integrating means, responsive to a predetermined one of said timings defined by said timing signal, for holding information applied at said input and applying the same to the input of said integrating means, timings of holding corresponding data by said data group holding means being mutually different.

62. The interface apparatus according to claim 61, wherein said integrating means includes:

holding means, having an output of the first width of bits connected to said second data processing apparatus and inputs corresponding to a number of the plurality of data groups, each input connected to the output of a corresponding one of said data group transmitting means, responsive to said integrating timing signal, for collectively holding information applied at said inputs and outputting the same to said data second data processing apparatus, said inputs of said holding means and said plurality of data groups being associated in advance in accordance with an order of said data groups being transmitted from said transmitter.

63. The interface apparatus according to claim 62, wherein said plurality of data groups is an even number.

64. The interface apparatus according to claim 63, wherein said plurality of data groups is a power of two.

65. The interface apparatus according to claim 64, wherein said plurality of data group is 2.

66. The interface apparatus according to claim 65, wherein said plurality of said data group transmitting means includes first data group holding means: and said timing signal generating means includes means for inverting said second transmission control signal received, and for applying the same as said timing signal to said first data group holding means.

67. The interface apparatus according to claim 66, wherein said first data group holding means includes a data latch circuit, having an input connected to said transmission path, responsive to a level transition in a predetermined direction of said second transmission control signal, for latching data at said input.

68. The interface apparatus according to claim 58, wherein said transmission control means includes:

a transfer control device, responsive to said first reception control signal, for generating said third transmission control signal and for applying the same to said second data processing apparatus, for generating an integrating timing signal defining, once per one reconstruction period, of said transition the timing of integration of said data groups into the reconstructed data being transferred, and for generating an internal reception control signal indicating whether said second data processing apparatus is at a state permitting data reception; and timing signal generating means, responsive to said second transmission control signal and said internal reception control signal, for generating a fourth plurality of timing signals defining mutually different timings in one reconstruction period of said transition, said fourth plurality being smaller than said second plurality by one, for generating a second reception control signal indicating whether said receiver is ready for reception and for outputting the same to said transmitter, for generating an internal transmission control signal indicating whether said receiver is receiving data and for applying the same to said transfer control device; wherein said transfer control device operates further in response to said internal transmission control signal.

69. The interface apparatus according to claim 68, wherein said reconstructing means includes:

a plurality of data group transmitting means corresponding to each of said plurality of data groups, respectively each including an input commonly connected to said transmitter through said transmission path and an output connected to a part of said input of said integrating means, for transmitting those of said plurality of data groups which are associated in advance, to said input of said integrating means by a time of generation of said integrating timing signal, and for maintaining the same until the generation of said integrating timing signal.

70. The interface apparatus according to claim 69, wherein a first of said data group transmitting means includes:

an interconnection having the second width of bits, having one end connected to said transmission path and the other end connected to the input of said integrating means, for applying the last data group transmitted through said transmission path to said integrating means;

remaining ones of said data group transmitting means each including data group holding means, having an input having the second width of bits connected to said transmission path and having an output the second width of bits connected to the input of said integrating means, responsive to a predetermined one of said fourth plurality of timings defined by said timing signal, for holding information applied at said input and for applying the same to the input of said integrating means, and for holding the corresponding data of said data group holding means being mutually different.

71. The interface apparatus according to claim 70, wherein said integrating means includes:

holding means, having an output having the first width of bits connected to said second data processing apparatus and having inputs corresponding in number to said plurality of data groups, each input being connected to the output of a corresponding one of said data group transmitting means, responsive to said integrating timing signal, for collectively holding data at its said inputs and outputting the same to said second data processing apparatus, said inputs of said holding means and said plurality of data group transmitting means being associated in advance in accordance with an order of said data groups being transmitted from said transmitter.

72. The interface apparatus according to claim 71, wherein said plurality of data groups, is an even number.

73. The interface apparatus according to claim 72, wherein said plurality of data groups is a power of two.

74. The interface apparatus according to claim 73, wherein said plurality of data groups is 4.

75. The interface apparatus according to claim 74, wherein said second plurality of data group transmitting means includes first, second and third said data group holding means, and said timing signal generating means includes means, responsive to said second transmission control signal and said internal reception control signal, for generating first, second and third said timing signals defining mutually different timings, and for applying the same to said first, second, and third data group holding means, respectively.

76. The interface apparatus according to claim 71, wherein an identifier signal is input to said receiver through said transmission path in addition to each of said data groups or is present in each of said data groups, the identifier signal being selected in advance such that the values thereof differ in data groups transmitted successively; and wherein said transmission control means operates further in response to said identifier signal.

77. The interface apparatus according to claim 76, wherein said reconstructing means includes
a plurality of data group holding means corresponding to each of said plurality of data groups, respectively, each including an input commonly connected to said transmitter through said transmission path and an output having the second width of bits connected to the input of said integrated means, responsive to a predetermined one of said second plurality of timings defined by said timing signal, for holding data at said input and for applying the same to the input of said integrating means,
the timings for holding the corresponding data by said data group holding means being mutually different.

78. The interface apparatus according to claim 77, wherein said integrating means includes:
holding means including an output having the first width of bits connected to said second data processing apparatus and inputs corresponding in number to said plurality of data groups, each input being connected to the output of a corresponding one of said data group holding means, responsive to said integrating timing signal, for collectively holding information applied at said plurality of inputs and outputting the same to said second data processing apparatus,
said plurality of inputs of said holding means and said plurality of data group holding means being associated in advance in accordance with order of said data groups being transmitted from said transmitter.

79. The interface apparatus according to claim 78, wherein said plurality of data groups is an even number.

80. The interface apparatus according to claim 79, wherein said plurality of data groups is a power of two.

81. The interface apparatus according to claim 80, wherein said plurality of data groups is 4.

82. The interface apparatus according to claim 81, wherein said transmission control means includes:
means, responsive to a change of said identifier signal, for applying said second transmission control signal received and said second transmission control signal which has been inverted to said data group holding means as said timing signals, respectively, and for outputting an internal transmission control signal provided by delaying said second transmission control signal received; and
transmission control signal delaying means for delaying said internal transmission control signal received therein after a predetermined delay and for outputting the same as said third transmission control signal and said integrating timing signal;

said plurality of data group holding means includes:
first and second data latch circuits, each having its input commonly connected to said transmission path, each responsive to level transition of said second transmission control signal in opposite directions each for latching data at its said input, respectively.

83. An interface apparatus for transferring data having a first width of a plurality of bits output at one time from a first data processing apparatus, the interface apparatus using a transmission path having a second width of smaller number of bits than said first width of bits, and for applying the data being transferred to a second data processing apparatus in its entire first width at one time, receiving a first data transmission control signal for controlling data transmission from said first data processing apparatus, said first data transmission control signal alternately assuming a first value and a second value, said interface apparatus comprising:

a data transmitter, whose input has the first width of bits, responsive to said first transmission control signal, for receiving at one time said data being transmitted from said first data processing apparatus, for dividing the same into a plurality of data groups each having the second width of bits, and for well as outputting a second transmission control signal, the data groups being output in a period corresponding to two successive transitions of said first transmission control signal from said second value to said first value;

said second transmission control signal changing with a prescribed delay from said first transmission control signal and assuming alternately the first value and the second value; and a data receiver, whose output has the first width of bits and is connected to the second data processing apparatus, responsive to said second transmission control signal, for receiving said plurality of data groups output from the data transmitter, for reconstructing said data being transferred from the first data procsessing apparatus back into data having the first width of bits, and for supplying a now-reconstructed data being transferred to said second data processing apparatus collectively at every corresponding period of two transitions of said second control signal, the now-reconstructed data being supplied together with a third transmission control signal indicative of a timing for data supply to said second data processing apparatus;

said third transmission control signal assuming a first value indicative of a request for data reception, and a second value indicative that data is being transmitted;

the interface apparatus operating relative to timing signals determined as a function of at least one timing signal from the first data processing apparatus, the at least one timing signal including the first data transmission control signal;

wherein said first transmission control signal is a clock signal having a prescribed period; and wherein said transmitter includes:
dividing means, responsive to said clock signal, for receiving at one time said data being transferred having the first width of bits from said first data processing apparatus, and for dividing the data being transferred into said plurality of data groups each having the second width of bits; and selecting means for successively selecting and outputting one by one said plurality of data groups from said dividing means per said one period, and for outputting said second transmission control signal as a timing signal for controlling the timing of said selection;

wherein said transmission control signal operates further in response to the first reception control signal and the identifier signal;

wherein said first reception control signal being applied from said second data processing apparatus to said receiver in response to said third transmission control means and assuming a first or a second value indicating whether said second data processing apparatus is ready for data reception from said data input, respectively; and wherein said identifier signal, being transmitted through said transmission path, being added to each of said data groups or being included in each of said data groups, and being selected in advance such that values thereof are different in any two data groups transmitted successively.

84. The interface apparatus according to claim 83, wherein said transmission control means includes:
a transfer control device for generating said third transmission control signal and the second reception control signal in response to said second transmission control signal and said first reception control signal, for applying the same to said second data processing apparatus and said transmitters, respectively, and for generating an integrating timing signal for defining once in one period of said transition a timing of integration of then-reconstructed data by said integrating means, said second reception control signal assuming a first or a second value indicating whether said receiver is at a state permitting data reception, respectively; and timing signal generating means, responsive to said second transmission control signal and to a change of the value of said identifier signal, for generating a timing signal defining said second plurality of timings in one period of said transition.

85. The interface apparatus according to claim 84, further including identifier signal confirming means for confirming whether the identifier signals transmitted together with respective ones of said data groups are all correct, and for generating a detection signal indicating whether an error is detected; wherein said transmission control means operates further in response to said detection signal.

86. The interface apparatus according to claim 85, wherein said identifier signal confirming means includes:
means for reconstructing said identifier signal, having an input commonly connected to said transmitter through said transmission path for receiving the identifier signal to be added to each of said second plurality of data groups, and for rearranging the same in a predetermined order for reconstructing;

coincidence detecting means for detecting whether the arrangement of said identifier signal reconstructed by said reconstructing means coincides with a predetermined arrangement of values, and for outputting said detection signal.

87. The interface apparatus according to claim 86, wherein said transmission control means further includes means, responsive to said detection signal assuming a value indicative of a detection of error in the identifier signal, for suppressing output of said second reception control signal provided from said transfer control mechanism.

88. The interface apparatus according to claim 83, wherein said transmission control means includes:
a transfer control device, responsive to said first reception control signal, for generating said third transmission control signal, for applying the same to said second data processing apparatus, for generating an integrating timing signal for defining once in one period of said transition a timing of integration of said then-constructed data by said integrating means, and for generating an internal reception control signal indicating whether said second data processing apparatus is at a state permitting reception; and timing signal generating means, responsive to said second transmission control signal and said internal reception control signal, for generating a fourth plurality of timing signals for defining mutually different timings in one period of said transition,
said fourth plurality being smaller than said second plurality by one, and for generating a second reception control signal indicating whether said receiver is ready for data reception and for outputting the same to said transmitter, and for outputting said second transmission control signal as an internal transmission control signal after a prescribed delay to said transfer control device; wherein said transfer control means operates further in response to said internal transmission control signal.

89. The interface apparatus according to claim 88, further comprising:

an identifier signal confirming means for confirming whether all the identifier signals transmitted together with respective ones of said data groups are correct, and for generating a detection signal indicating whether an error is detected; wherein said timing signal generating means operates further in response to said detection signal.

90. The interface apparatus according to claim 89, wherein said identifier signal confirming means includes:

means for reconstructing said identifier signal, having an input connected to said transmitter through said transmission path, for receiving the identifier signal to be added to each of said second plurality of data groups, and for rearranging the same in a predetermined order for reconstruction; and coincidence detecting means for detecting whether the arrangement of said identifier signal reconstructed by said reconstructing means coincides with a predetermined arrangement of values, and for outputting said detection signal.

91. The interface apparatus according to claim 90, wherein said timing signal generating means includes means, responsive to said second transmission control signal and to a change of said identifier signal transmitted through said transmission path, for generating said internal transmission control signal, and means, responsive to said internal reception control signal and said detecting signal, for outputting, only when said detection signal assumes a value indicative of the correctness of the identifier signal, said internal reception control signal provided from said transfer control device as said second reception control signal.

\* \* \* \* \*